US006245983B1

(12) United States Patent
Ishiguro

(10) Patent No.: US 6,245,983 B1
(45) Date of Patent: Jun. 12, 2001

(54) PERFORMANCE TRAINING APPARATUS, AND RECORDING MEDIUMS WHICH PRESTORE A PERFORMANCE TRAINING PROGRAM

(75) Inventor: Shiro Ishiguro, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/526,335

(22) Filed: Mar. 15, 2000

(30) Foreign Application Priority Data

Mar. 19, 1999 (JP) ................................... 11-074735
Mar. 25, 1999 (JP) ................................... 11-081679

(51) Int. Cl.$^7$ .............................. G09B 15/02; G10H 7/00
(52) U.S. Cl. ...................... 84/477 R; 84/470 R; 84/478; 84/609; 84/649
(58) Field of Search ..................... 84/600–601, 604–606, 84/609–612, 634–636, 649–652, 666–668, 470 R, 477 R, 478, DIG. 6

(56) References Cited

U.S. PATENT DOCUMENTS

| 3,744,366 | 7/1973 | Del Castillo . |
| 3,885,490 | 5/1975 | Gullickson . |
| 3,958,487 | 5/1976 | Goldman . |
| 4,040,324 | 8/1977 | Green . |
| 4,307,645 | 12/1981 | Rauchi . |
| 4,314,499 | 2/1982 | Olsen . |
| 4,331,062 | 5/1982 | Rogers . |
| 4,366,741 | 1/1983 | Titus . |
| 4,437,378 | 3/1984 | Ishida et al. . |
| 5,286,909 | * 2/1994 | Shibukawa .............................. 84/609 |
| 5,656,789 | * 8/1997 | Nakada et al. ...................... 84/477 R |
| 5,827,988 | * 10/1998 | Wachi ..................................... 84/609 |
| 6,025,550 | * 2/2000 | Kato .................................. 84/470 R |

* cited by examiner

Primary Examiner—Robert E. Nappi
Assistant Examiner—Marlon T. Fletcher
(74) Attorney, Agent, or Firm—Frishauf, Holtz, Goodman, Langer & Chick, P.C.

(57) ABSTRACT

A performance training apparatus reads out a plurality of items of melody data each including a part, outputs all the plurality of items of melody data excluding an item of melody data including a particular part with a delay of a predetermined time compared to the item of melody data including a particular part. A light emitting element provided for each of operation elements of a keyboard is turned on to progress of performance of the item of melody data including a particular melody part for guiding operation of a corresponding operation element. All the delayed items of melody data each including a different melody part excluding an item of melody data including a particular melody part are fed along with performance data produced by the performer's performance to an external sound source to produce a musical sound. In other words, the performer can beforehand recognize an operation element to be operated, and production of a musical sound produced by the performer's performance is synchronized with production of musical sounds produced by melody data including other parts.

22 Claims, 47 Drawing Sheets

| CHANNEL | MIDI DATA |
|---|---|
| 1 | MELODY PART DATA |
| 2 | DRUM PART DATA |
| 3 | BASS PART DATA |
| 4 | CHORD 1 PART DATA |
| 5 | CHORD 2 PART DATA |
| 6 | CHORD 3 PART DATA |
|  |  |

PERFORMANCE TRAINING APPARATUS, AND RECORDING MEDIUMS WHICH PRESTORE A PERFORMANCE TRAINING PROGRAM

TECHNICAL FIELD

The present invention relates to performance training apparatus and recording mediums, which prestore a performance-training program.

BACKGROUND ART

Conventionally, performance training apparatus are known which have a so-called navigation function to cause a performer to beforehand recognize an operation element to be operated (i.e., a key to be depressed) for performance. For example, an electronic keyboard instrument having such navigation function includes a plurality of light emitting elements such as LEDs provided in correspondence to a plurality of keys of the keyboard. As a melody is progresses, a light emitting element for a key to be depressed based on event data for a predetermined part (generally, a melody part) of the melody is turned on or off. By using such function, even when the performer is unfamiliar with the performance of the melody, the performer can perform the melody by sequentially depressing keys corresponding to sequentially turned-on light emitting elements.

However, in the conventional performance training apparatus, melodies used for performance training are limited to ones prepared in the performance training apparatus, and it is desired that the performer can use any melody for training purposes.

Especially, in recent years many melody data of a SMF (Standard MIDI File) type are available on the network. It is desired that the melody data can be used for performance training.

However, there is a problem in use of those melody data of the SMF type as they are. Melody data is generally composed of a plurality of parts, a particular one of which is used for turning on/off of the light emitting element in the performance training apparatus, and other parts are fed for accompaniment use to a sound source. Thus, a light emitting element is turned on when a timing when a corresponding key is depressed has come and musical sounds of other parts are generated synchronously with the timing. However, the performer inevitably recognizes that the light emitting element has been turn on and then depresses the corresponding key. Thus, the performer's performance is delayed inevitably compared to the performance of the parts. Thus, synchronization cannot be achieved. As just described above, even when general melody data is used as it is for performance training, it is impossible to cause the performer to beforehand recognize a key to be depressed.

Conventional performance training apparatus are arranged to stop the progress of the melody from the time when a light emitting element corresponding to the key to be depressed is turned on to the time when the performer depresses that key. If melody data of the general SMF type is used as it is, however, the melody would progress irrespective of whether correct key depression is performed, and the performer cannot follow up the melody.

Further, even when the timing of turning on a light emitting element is advanced earlier in order to cause the performer to beforehand recognize the corresponding key to be depressed, the performer cannot now recognize which is a correct timing of key depression.

DISCLOSURE OF THE INVENTION

It is therefore an object of the present invention to provide a performance training apparatus by which the performer is capable of beforehand recognizing an operation element to be operated manually (i.e., a key to be depressed) for performance, using melody data used generally for performing the melody for performance training purposes.

According to one aspect of the present invention, there is provided a performance training apparatus comprising: a plurality of operation elements for performance each operated for specifying a different pitch; a plurality of light emitting means each provided for a respective one of the plurality of operation elements; melody data feeding means for sequentially feeding a plurality of items of event data each comprising a melody part and a note-on/off command for production/muting of a musical sound of a pitch; delay means for delaying all the plurality of items of event data fed by said melody data feeding means excluding one of the plurality of items of event data including a particular melody part by a predetermined time compared to the item of event data including the particular part; light emission control means for controlling the turning on/off of a one of the plurality of light emitting means provided for that of the plurality of operation elements which specifies the same pitch as the event data including the particular melody part fed by the melody data feeding means does, in accordance with the production/muting of the musical sound based on the item of event data including the particular melody part; event data producing means for producing an item of event data including the particular melody part for performance which commands the production and muting of the musical sound of the pitch based on operation of the operation element; and output means for outputting the item of event data including the particular melody part produced by the event data producing means and all the plurality of items of event data delayed by the predetermined time by the delay means excluding the item of event data including the particular melody part.

According to this arrangement, since part data of melody data other than its particular part data to specify an operation element or key are sent to the sound source with a delay of a predetermined time compared to the particular part data, the performer can recognize the operation element to be operated key to be depressed) the predetermined time earlier than the performance of the other parts, and hence the performer's performance of the particular part is prevented from being delayed compared to the performance of the other parts.

Another aspect of the present invention, there is also provided a performance training system which comprises a performance control device for sending melody data for performance training and a performance device for receiving the melody data, for indicating the operation element or key to be operated or depressed to the performer, and for performing the melody.

Thus, there is provided a performance training system comprising: a) a performance control device which comprises: melody data feeding means for sequentially feeding a plurality of items of event data each including a melody part and a specific item for commanding generation/muting of a musical sound of a pitch; first transmitting means for transmitting a respective one of the plurality of items of event data fed by said melody data feeding means; and delay means for delaying timings of transmitting all the plurality of items of event data other than an item of event data including a particular melody part by the first transmitting means by a predetermined time compared to the timing of transmitting the item of event data including a particular melody part; and b) a performance device comprising: first receiving means for receiving an item of event data from said first transmitting means; a plurality of operation elements for performance each operated for specifying a different pitch; a plurality of light emitting means each provided for a respective one of the plurality of operation elements; light emission control means for controlling the turning on/off of a one of said plurality of light emitting means provided for that of the plurality of operation elements which specifies the same pitch as the event data including the particular melody part received and fed by said first receiving means does, in accordance with the production/muting of the musical sound based on the item of event data including the particular melody part; event data producing means for producing an item of event data including the particular melody part for performance which commands the production and muting of the musical sound of the pitch based on operation of the operation element; and output means for outputting the item of event data including the particular melody part produced by the event data producing means and all the plurality of items of event data received by the first receiving means excluding the item of event data including the particular melody part.

According to this arrangement, since the performance control device is separated from the performance device, the place where the melody data is gotten is separated from the place where the melody is performed.

Further, it is an object of the present invention to provide a performance control apparatus which converts received melody data to performance training data, and which feeds the performance training data to an electronic musical instrument having a conventional navigation function.

According to still another aspect of the present invention, there is provided a performance control apparatus comprising: means for reading from storage means which prestores a plurality of items of event data each including a melody part and a command to produce/mute a musical sound, and a corresponding plurality of items of timing data each indicative of a timing of starting to process a respective one of the plurality of items of event data one of the plurality of items of event data based on a corresponding one of the plurality of items of time data; transmitting means for transmitting an item of event data including a melody part read by said reading means; and delay means for delaying timings of transmitting all the plurality of items of event data other than an item of event data including a particular melody part by said transmitting means by a predetermined time compared to the timing of transmitting the item of event data including a particular melody part.

According to this arrangement, performance training is achieved, using musical data obtained externally, in the electronic musical instrument having the conventional navigation function.

It is also an object of the present invention to allow even a performer who cannot smoothly follow up the performance speed of the melody to receive effective performance training in the performance control apparatus.

According to a further aspect of the present invention, there is also provided a performance control apparatus comprising: means for reading from storage means which prestores a plurality of items of event data each including a melody part and a command to produce/mute a musical sound, and a corresponding plurality of items of timing data each indicative of a timing of starting to process a respective one of the plurality of items of event data one of the plurality of items of event data based on a corresponding one of the plurality of items of time data; transmitting means for transmitting an item of event data including a melody part read by said reading means; delay means for delaying timings of transmitting all the plurality of items of event data other than an item of event data including a particular melody part by said transmitting means by a predetermined time compared to the timing of transmitting the item of event data including a particular melody part; receiving means for receiving the event data externally, determining means for determining whether the item of event data received by the receiving means is event data for commanding production of a musical sound; and read control means, responsive to the reading means having read the item of event data including the particular part, for stopping the reading operation of said reading means, and responsive to the determining means determining that the item of event data received by said receiving means is event data for commanding production of a musical sound, for reopening the reading operation of the reading means.

According to this arrangement, since the progress of the melody is stopped until the performer effects correct key depression, even the performer who cannot smoothly follow up the performance speed of the melody can receive effective performance training.

The present invention also provides a computer readable program involving the respective processes performed by the system or devices mentioned above.

BEST MODE FOR CARRYING OUT THE INVENTION

Figure 1:
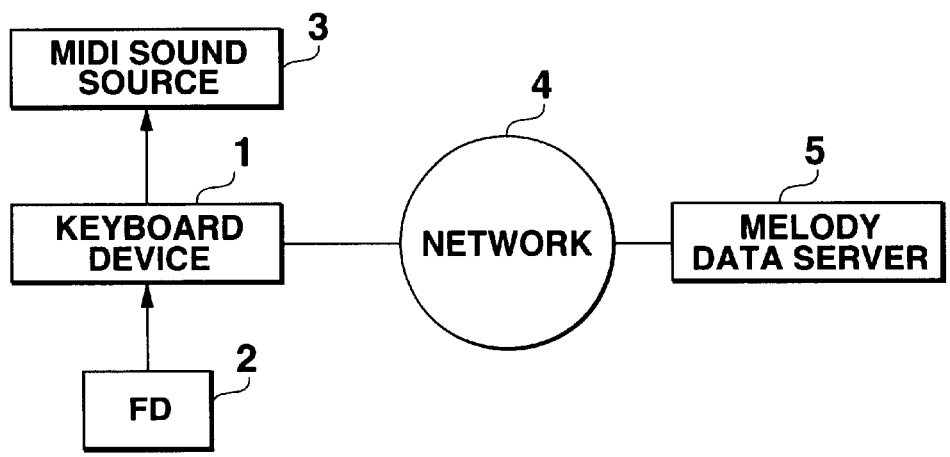
FIG. 1 illustrates the composition of a system as a first embodiment of the present invention.

A first and a second embodiment of melody performance training apparatus according to the present invention will be described next with reference to the accompanying drawings. FIG. 1 illustrates the composition of a system which includes a keyboard device 1, as the first embodiment. The keyboard device 1 drives an FD (floppy disk) 2 as storage means which stores melody data to provide MIDI data to a MIDI sound source 3. The melody data is received from a melody data sever 5 via a network (telecommunication lines) 4 of the internet. The melody data server 5 prestores a plurality of melody data which each contain event data and time data. The event data includes pitch data indicative of an operation element or key to be operated or depressed and velocity data indicative of the intensity of a produced musical sound or the muting of the musical sound. The time data indicates a timing of starting to produce the musical sound.

Figure 2:
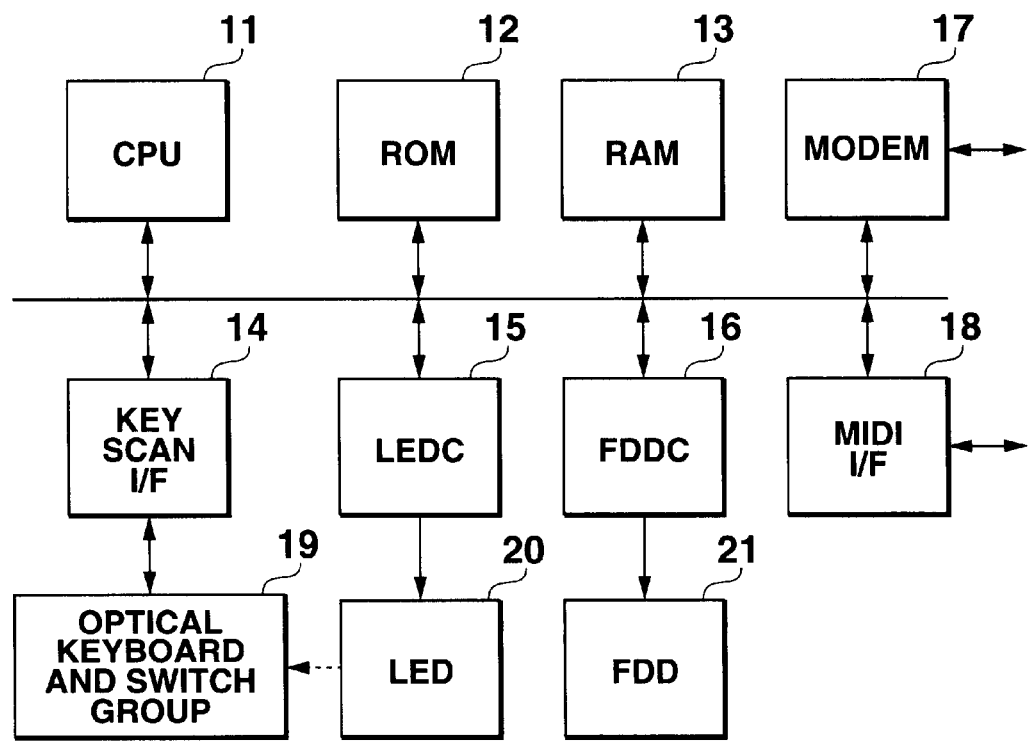
FIG. 2 is a block diagram of a keyboard device of the embodiment.

FIG. 2 is a block diagram of the keyboard device. A CPU 11 of the keyboard device is connected via a system bus to a ROM 12, a RAM 13, a key scan interface 14, a LEDC (LED controller) 15, a FDDC (floppy disk driver controller) 16, a modem 17, and a MIDI interface 18.

The ROM 12 contains a melody performance-training program executed by the CPU 11. The RAM 13 temporarily stores various data processed by the CPU 11. The key scan interface 14 is connected to an assembly of optical operation elements (i.e., or keys) and switches 19 to scan the operational state of the assembly 19 and provides a corresponding signal to the CPU 11. The LEDC 15 controls the turning on and off of an LED 20, which includes a pair of red and green light emitting diodes, provided in each key. The FDDC 16 controls an FDD (floppy disk drive) 21.

The modem 17 as communication control means includes a network control unit (NCU) (not shown) which controls connection of the modem to the telecommunication line or network 4, and receives and demodulates melody data from the melody data sever 5 in accordance with a reception commanding from the CPU 11. The FDDC 16 and FDD 21 record the received melody data in the floppy disk 2. The MIDI interface 18 delivers to the MIDI sound source 3 the MIDI data created by the CPU 11.

Figures 3A, 3B:
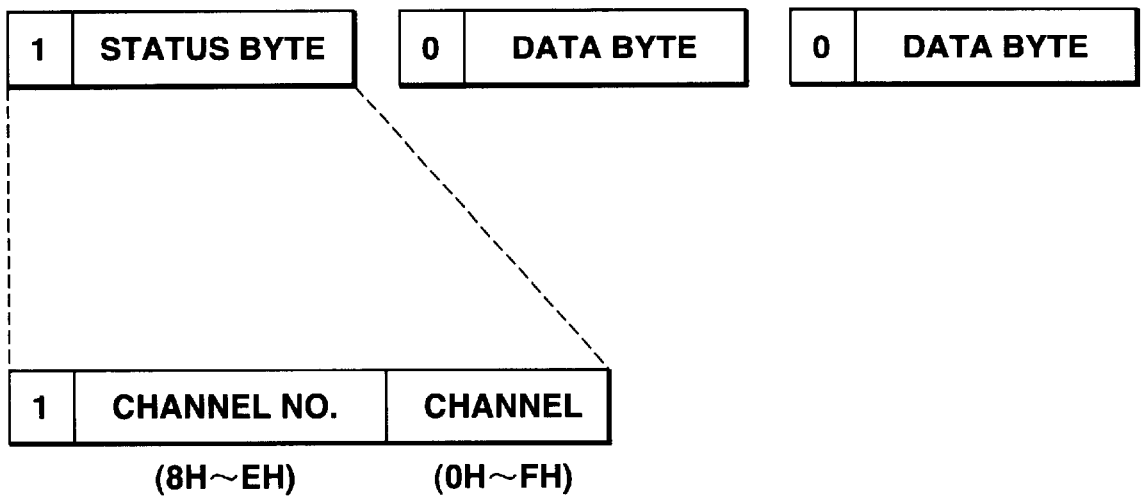
FIGS. 3A and B illustrate a format of MIDI data and the composition of the MIDI data for each channel, respectively.

FIG. 3A shows a format of MIDI data, which is composed of a one-byte status byte (head bit=1) and a one- or two-byte data byte (head bit=0) and is used as a channel message or a system message depending on an object of its use. The status byte is composed of three bits representing the contents of a message and four bits representing a channel number n. For example, "000", "001", and "100" represent "note off" data, "note on" data, and a program change command which involves a change of a tone quality of a melody concerned, respectively.

As shown in FIG. 3B, a plurality of parts of melody data, for example, a melody part, a drum part, a base part and three kinds of code parts are each specified for a respective one of channels. In the navigation function, the user as a part for performance guidance generally specifies a channel for a melody part.

Figure 4:
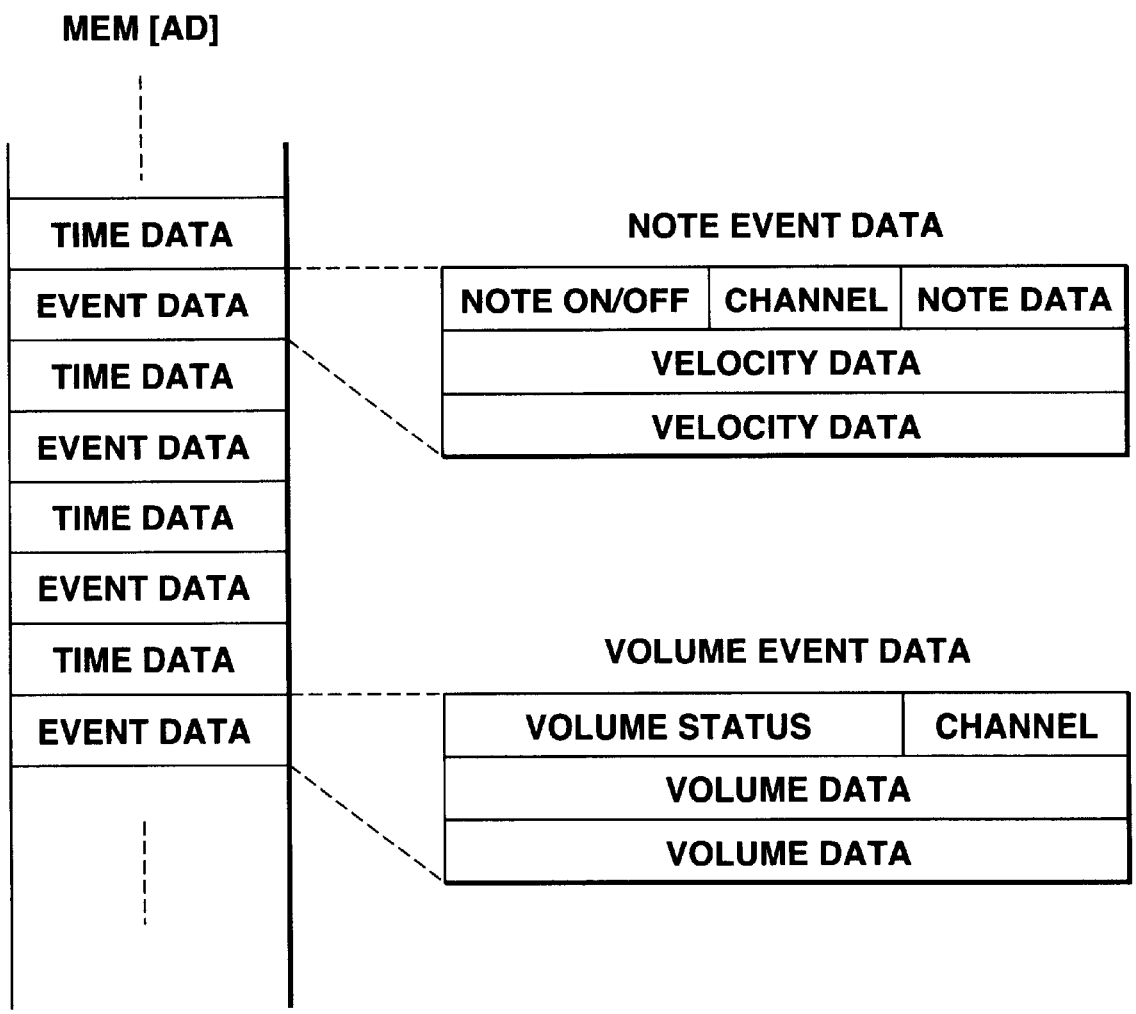
FIG. 4 illustrates a format of melody data of the MIDI data.

As shown in FIG. 4, the melody part, which is composed of alternately, arranged time data and event data is stored in memory. The event data includes, for example, a one-byte status byte of note event data, which is composed of note on or off data, a channel number and note data, and two bytes of velocity data. Volume event data of the event data includes one byte of a status byte which in turn includes volume status data indicative of being volume data and channel number data, and two bytes of volume data. Each of such MIDI data represented in a byte unit is specified by an address AD. An end address of the MIDI data contains END data.

The operation of the performance training apparatus of the first embodiment will be described based on a flowchart of a program executed by the CPU 11.

Figure 5:
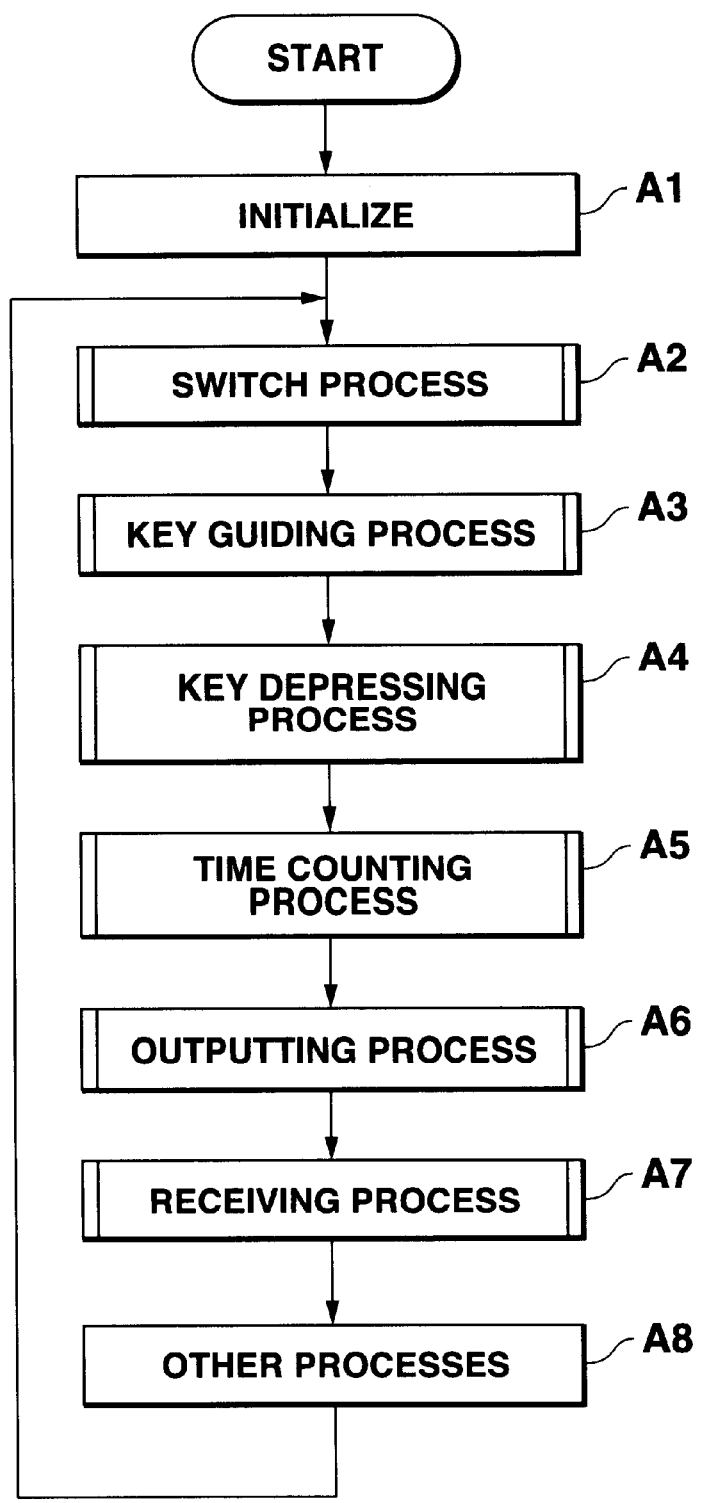
FIG. 5 is a flowchart of a program executed by a CPU of FIG. 2.

FIG. 5 shows a main flow of a looping operation which repeats after a predetermined initializing process (step A1) a switch process (step A2), a key guiding process (step A3), a key depressing process (step A4), a time counting process (step A5), an outputting process (step A6), a receiving process (step A7), and other processes (step A8).

Figure 6:
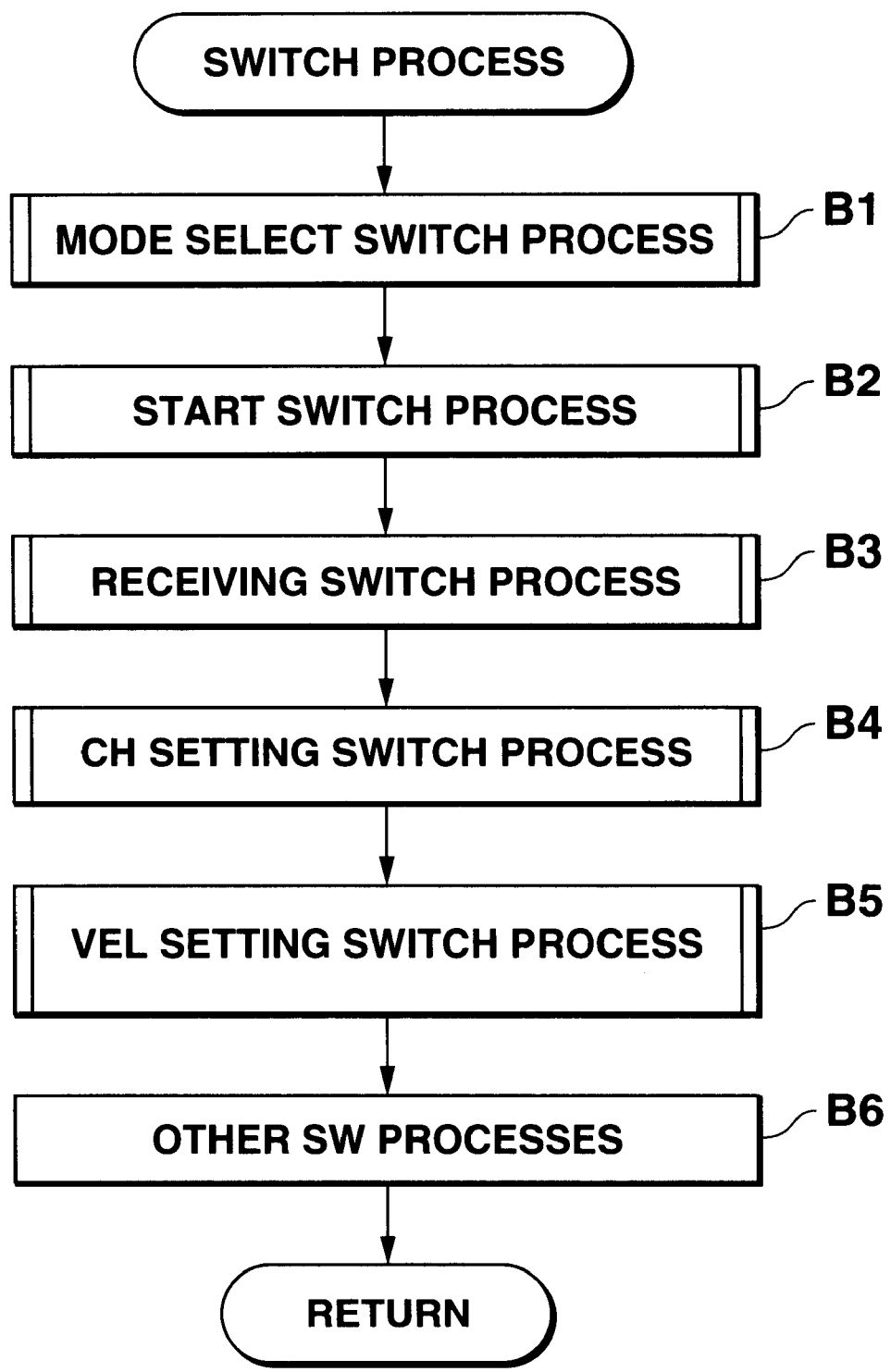
FIG. 6 is a flowchart of a switch process as a part of the flow of FIG. 5.

FIG. 6 is a flowchart of the switch process (step A2) in the main flow of FIG. 5. In this step, the CPU 11 scans the switch group of FIG. 2, and effects a mode select switch process (step B1), a start switch process (step B2), a receiving switch process (step B3), a channel setting switch process (step B4), a velocity setting switch process (step B5) and other switch processes(step B6) and then returns its control to the main flow of FIG. 5.

Figure 7:
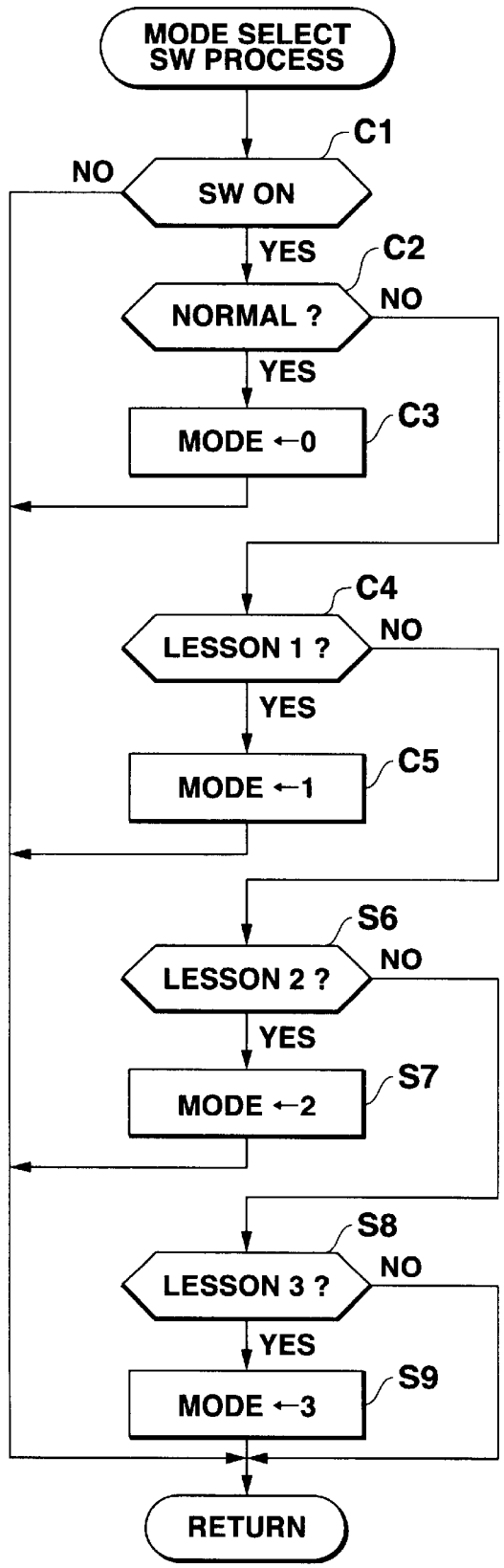
FIG. 7 is a flowchart of a mode select switch process as a part of the switch process of FIG. 6.

FIG. 7 shows a flowchart of the mode select switch process (step B1) of FIG. 6. In this process, the CPU 11 determines whether any one of the mode select switches which include a normal switch, a lesson 1 switch, a lesson 2 switch and a lesson 3 switch is turned on (step C1). If otherwise, the CPU 11 terminates this process. If any one of the switches is turned on, the CPU 11 effects a process corresponding to the mode select switch.

The CPU 11 then determines whether the normal switch has been turned on (step C2). If it has been turned on, the CPU 11 sets a mode register MODE to "0" (step C3). Then, the CPU 11 determines whether the lesson 1 switch is turned on (step C4). If it is turned on, the CPU 11 sets the mode register MODE to "1" (step C5). The CPU 11 then determines whether the lesson 2 switch is turned on (step C6). If it is turned on, the CPU 11 sets the mode register MODE to "2" (step C7). The CPU 11 then determines whether the lesson 3 switch is turned on (step C8). If it is turned on, the CPU 11 then sets the mode register MODE to "3" (step C9).

When the mode register MODE is "0", a general normal performance mode is set in which a musical sound is produced only by a performance at the keyboard. The values "1"–"3" of the mode register MODE each indicate a performance mode of the navigation function which guides the performance of melody data in a floppy disk. More particularly, the value "1" of the mode register MODE indicates an "ANY key" mode in which a musical sound of melody data is produced when any key is depressed irrespective of note data (representing a pitch) of the melody data. The value "2" of the mode register MODE indicates a performance mode in which a musical sound is produced when a (light emitting) key corresponding to the note data of melody data is depressed correctly. The value "3" of the mode register MODE indicates a mode in which melody data is read automatically irrespective of the performance and in which a musical sound of the melody data is produced when a corresponding guided key is depressed When a value corresponding to each of the mode select switches is set in the mode register MODE, the CPU 11 terminates this process and then returns its control to the switch process of FIG. 6.

Figure 8:
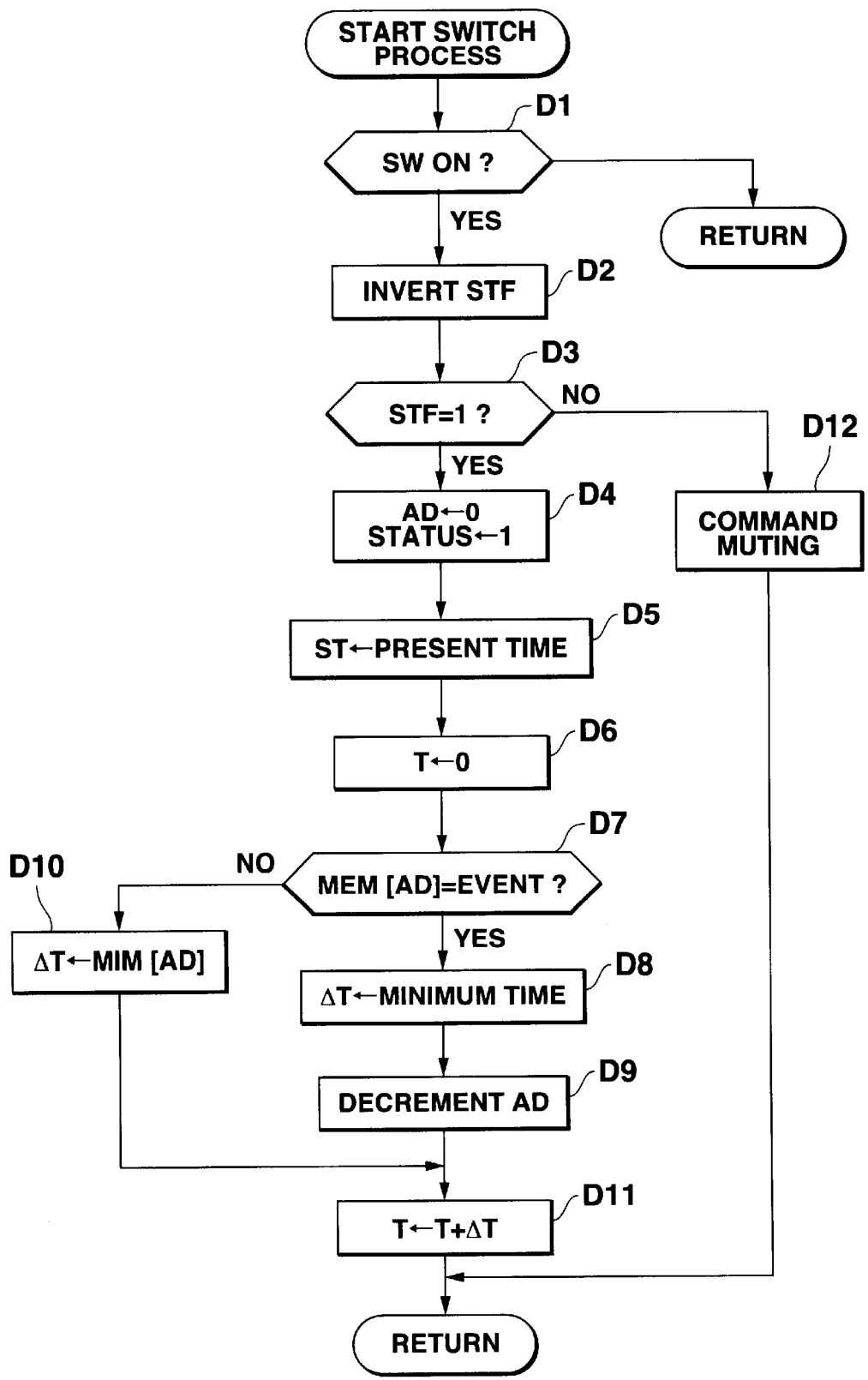
FIG. 8 is a flowchart of a start switch process as a part of the switch process of FIG. 6.

FIG. 8 is a flowchart indicative of the start switch process (step B2) as a part of the switch process of FIG. 6. In this process, the CPU 11 determines whether the start switch is turned on (step D1). If otherwise, the CPU 11 terminates this process. If it has been turned on, the CPU 11 inverts a start flag STF (step D2), and then determines whether the STF is "1" (step D3).

If the start flag STF is "1", the CPU 11 then sets an address register AD to "0" or a head address of the melody data, and a register STATUS to "1" (step D4). The value of the register STATUS is set in the key depressing process to be described later. When the value of the register STATUS is "1", it is meant that a timing of depressing a key is coincident with a timing of starting to produce a musical sound of the melody data concerned. When the value of the register STATUS is "2", it is meant that no key is depressed even after the timing of starting to produce a musical sound of the melody data has passed or that the timing of depressing the key is delayed. When the value of the register STATUS is "3", it is meant that the key has been depressed before the timing of starting to produce a musical sound of the melody data comes or that the timing of depressing the key was too early.

After step D4, the CPU 11 stores data representing the present time in a register ST (step D5), and then sets "0" in a time register T (step D6). The CPU 11 then determines whether data MEM [AD] at an address AD (=0) for a melody data storage area of the RAM 13 is event data or whether the head of the melody data is event data or time data (step D7). If it is, the CPU 11 sets a minimum time contained in the MIDI data in a register ΔT (step D8), decrements the value of the address AD by "1" (step D9). This decrementing step is required for the key guiding process to be described later. When the head of the melody data is not event data, but time data in step D7, the CPU 11 sets the time data in the register ΔT (step D10).

After decrementing the address AD in step D9, or setting time data in the register ΔT in step D10, the CPU 11 adds the value of the register ΔT to the value of the time register T for updating purposes (step D11). When the start flag STF is 0 in step D3, the CPU 11 commands all the channels to mute the musical sounds (step D12). After step D11 or D12, the CPU 11 terminates this process, and then returns its control to the switch process of FIG. 6.

Figure 9:
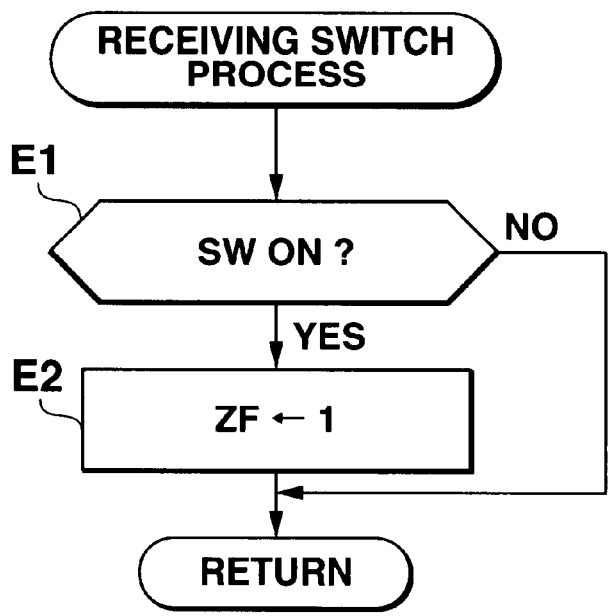
FIG. 9 is a flowchart of a reception switch process as a part of the switch process of FIG. 6.

FIG. 9 shows a flowchart of the receiving switch process (step B3) as a part of the switch process. In this process, the CPU 11 determines whether the reception switch has been turned on (step E1). If otherwise, the CPU 11 terminates this process. If it is turned on, the CPU 11 sets a reception flag ZF to "1" (step E2), terminates this process and then returns its control to the switch step of FIG. 6.

Figure 10:
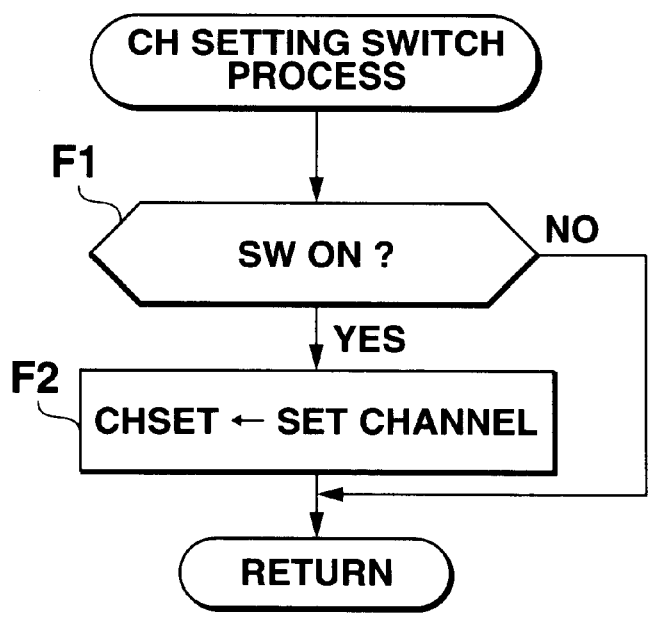
FIG. 10 is a flowchart of a channel setting switch process as a part of the switch process of FIG. 6.

FIG. 10 shows a flow of the channel setting switch process (step B4) as a part of the switch process. In this process, the CPU 11 sets a channel (for example, a melody channel) specified for guiding key depression. In this case, the CPU 11 determines whether a channel setting switch and a channel number switch have been turned on (step F1). If they are, the CPU 11 stores a channel number of the set channel in a channel set register CHSET (step F2). Then or when the switch is not turned on in step F1, the CPU 11 terminates this flow and returns its control to the switch process of FIG. 6.

Figure 11:
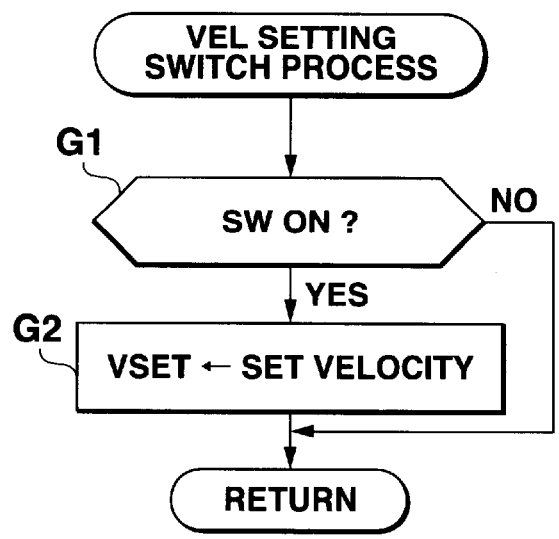
FIG. 11 is a flowchart of a velocity setting process as a part of the switch process of FIG. 6.

FIG. 11 shows a flow of the VEL setting switch process (step B5) of the switch process. In this process, the CPU 11 sets the conditions of a color of light emitted from an LED corresponding to a key to be depressed in a guide A process to be described later. Then CPU 11 determines whether a velocity setting switch and a set velocity value switch have been turned on (step Gi). If they have, the CPU 11 sets the velocity value in a set velocity register VSET (step G2). Then or when none of the switches is turned on in step Gi, the CPU 11 terminates this flow and returns its control to the flow of the FIG. 6 switch process.

Figure 12:
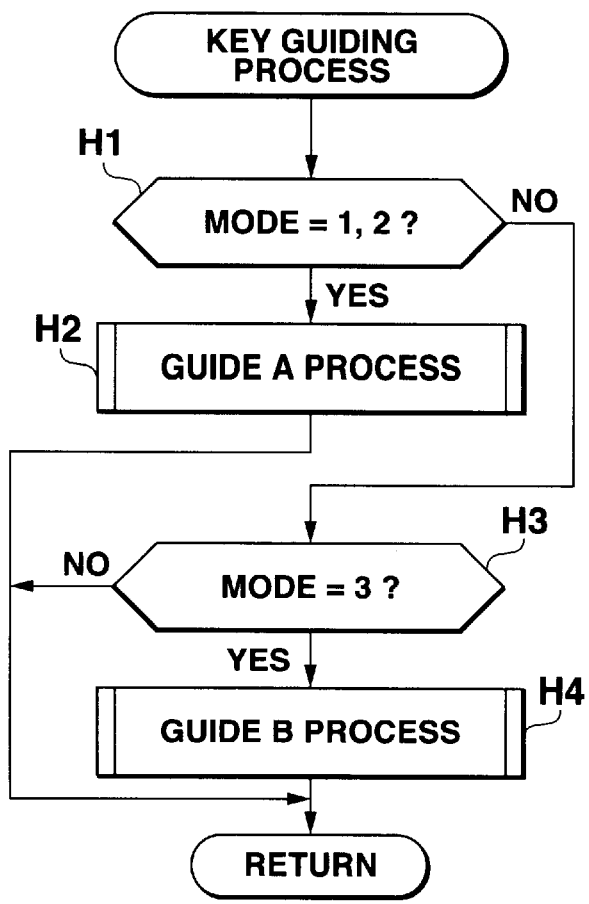
FIG. 12 is a flowchart of a key guiding process as a part of the flowchart of FIG. 5.

FIG. 12 shows a flowchart of the key guiding process (step A3) in the main flow of FIG. 5. In this process, the CPU 11 effects the key guiding depending on a value of the mode register MODE, in which the CPU 11 determines whether the value of the mode register MODE is 1 or 2 (step H1). If it is, the CPU 11 executes the guide A process (step H2). If the value of the mode register MODE is neither 1 nor 2, the CPU 11 determines whether the value of the mode register MODE is 3 (step H3). If it is, the CPU 11 executes a guide B process (step H4). After the guide process A or B, the CPU 11 terminates this process and returns its control to the main flow of FIG. 5.

FIGS. 13–16 show a flowchart of the guide A process (step H2) of FIG. 12, in which the CPU 11 determines whether the start flag STF is 1 (step J1). If it is 0, which indicates that the performance is at a stop, the CPU 11 terminates this process. If the start flag STF is 1, which indicates starting the performance, the CPU 11 determines whether the value of the register STATUS is 2 (step J2).

When the value of the register STATUS is not 2 in step J2, the CPU 11 compares the present time and the sum of the time values in the registers ST and T or the timing when the musical sound is started to be produced (step J3). If the present time has not reached the timing, the CPU 11 then terminates this process and returns to the main flow of FIG. 5.

When the present time has reached the timing when the musical sound is started to be produced, the CPU 11 increments the value of the address register AD (step J4). Then, the CPU 11 determines whether the value of the address register AD is END (step G5). If otherwise, the CPU 11 determines whether MIDI or data MEM [AD] at the address AD is time data (step J6). If it is, the CPU 11 determines whether the value of the register STATUS is 3, which means that the timing when a key concerned is depressed is too early compared to the timing when the related musical sound starts to be produced (step J7). If the value of the register STATUS is 3, the CPU 11 sets a minimum time contained in the MIDI data in the register ΔT (step J8). If the value of the register STATUS is 1 or if the timing when the key is depressed coincides with the timing when the musical sound starts to be produced, the CPU 11 sets proper time data of MEM [AD] in the register ΔT (step J9). After step J8 or J9, the CPU 11 adds the value of the time register T to the value of the register ΔT, terminates this process and then returns its control to the key guiding process of FIG. 12.

When the MEM [AD] is END in step J5, which indicates the end of the melody data, the CPU 11 resets the start flag STF to 0 (step J1), terminates this process, and then returns its control to the key guide process of FIG. 12.

Figure 14:
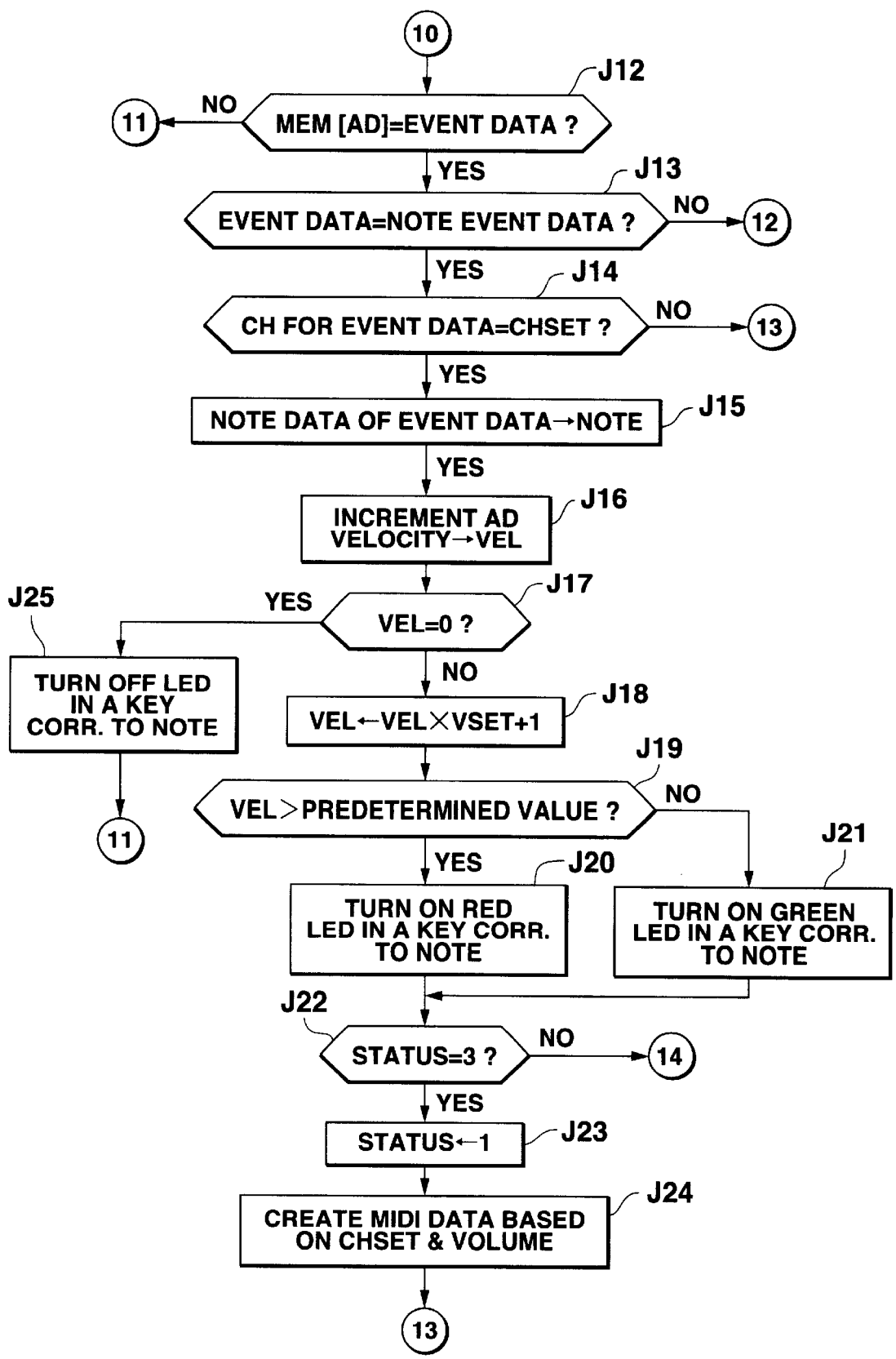
FIG. 14 is a flowchart of another parts of the guide A process continuing from FIG. 13.

When data MEM [AD] is not time data in step J6, the CPU 11 determines whether the MEM [AD] is event data in the flow of FIG. 14 (step J12). If it is, the CPU 11 determines whether the event data is note event data (step J13). If it is, the CPU 11 determines whether channel data of the event data and channel data for the key depressions stored in the register CHSET are the same (J14). If they are, the CPU 11 sets note data of the event data in a register NOTE (step J15).

Then, the address AD is incremented to store velocity data in the register VEL (step J16). Then, the CPU 11 determines whether the data in the register VEL is 0 (step J17). If otherwise, or when the note data stored in the NOTE is note-on data, the CPU 11 multiplies the velocity data in the register VEL by the data in the register VSET, and adds 1 to the resulting data (step J18). The data in the register VSET is set already to a desired value by the user in the VEL setting switch process of FIG. 11 or to a default value. It is conceivable that the user can set the data in the register VSET to 0. In this case, as the result of the above calculation, the data in the register VEL would be 0 and hence note-off data. In order to avoid such undesirable situation, the CPU 11 adds 1 to the velocity data in the register VEL to set the minimum value of the velocity data in the VEL to 1.

The CPU 11 then determines whether the velocity data in the register VEL is larger than a predetermined value (step J19). If it is, the CPU 11 turns on a red-light emitting LED in a key corresponding to data in the register NOTE (step J20). If the velocity data in the register VEL is smaller than the predetermined value, the CPU 11 turns on a green-light emitting LED in a key corresponding to data in the register NOTE (step J21). Then, the CPU 11 determines whether the value of the register STATUS is 3 (step J22). If it is, the CPU 11 changes the value of the register STATUS to 1 (step J23). Then, the CPU 11 creates MIDI data based on the data in the registers CHSET and VOLUME (step J24).

When the velocity data in the register VEL is 0 in step J17 or when the note data stored in the register NOTE is note-off data, the CPU 11 turns off a LED in a key corresponding to the register NOTE (step J25). Then or when the data MEM [AD] is not event data in step J12, the CPU 11 shifts its control to step J4 of FIG. 13 to increment the address AD.

Figure 15:
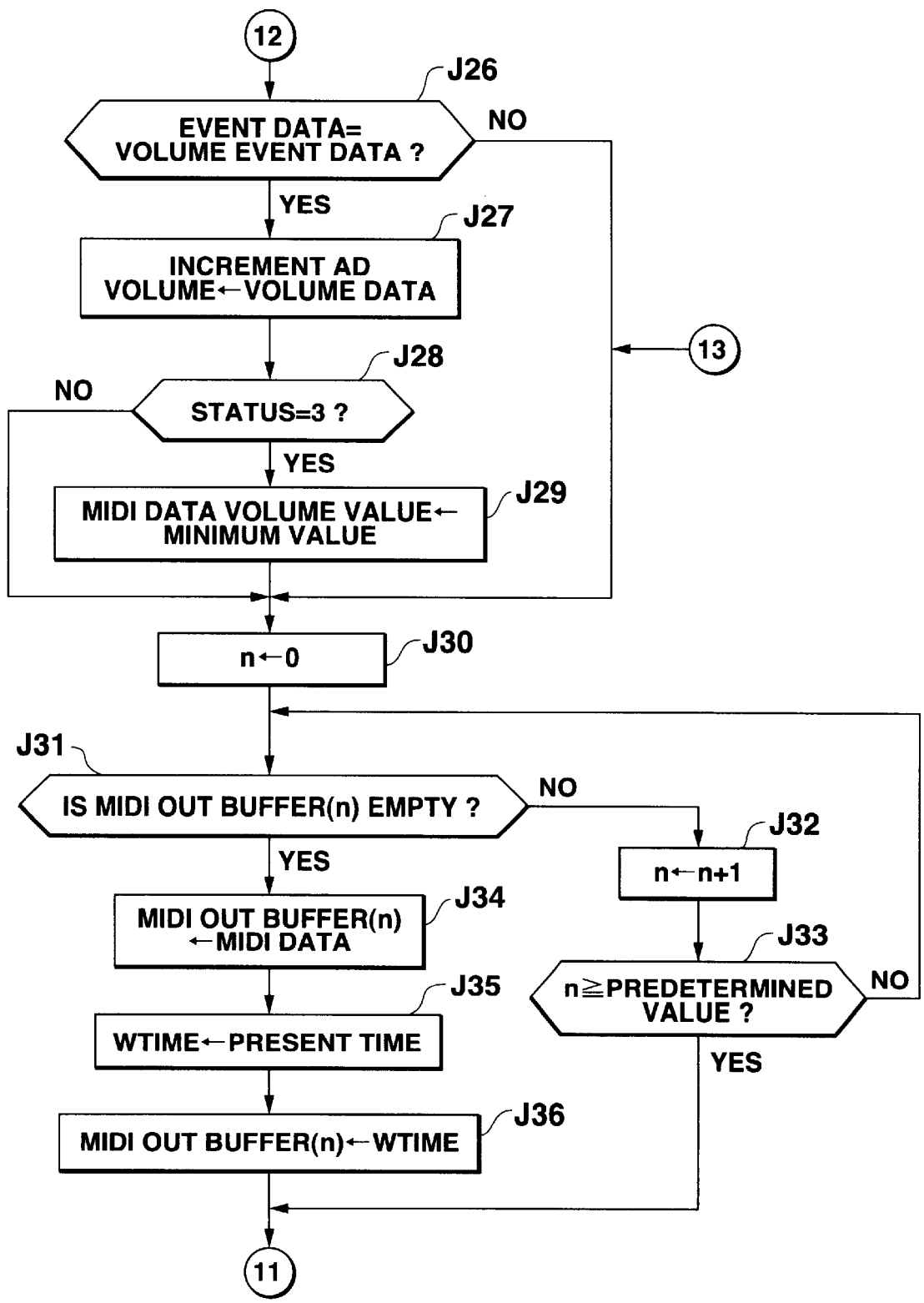
FIG. 15 is a flowchart of the remaining parts of the guide A process continuing from FIG. 14.

When the event data is not note-event data in step J13 of FIG. 14, the CPU 11 determines whether the event data is volume event data in the flow of FIG. 15 (step J26). If it is, the CPU 11 increments the address AD and stores the volume data in the register VOLUME (step J27).

Then, the CPU 11 determines whether the value in the register STATUS is 3 (step J28). If it is, which means that the key depression timing was too earlier than the musical-sound start timing. In this case, the CPU 11 changes the volume value of the MIDI data to a minimum value (step J29). Then or when the value in the register STATUS is not 3 in step J28 or when the channel for the event data and the channel for the CHSET are not the same in step J14 of FIG. 14, the CPU 11 sets the pointer n for the MIDI buffer to 0 (step J30), and then increments n while effecting the following looping process:

The CPU 11 determines whether the MIDI OUT buffer area (n) is empty (step J31). If otherwise, the CPU 11 increments n (step J32). The CPU 11 then determines whether n has exceeded a predetermined value (step J33). If otherwise, the CPU 11 searches for an empty MIDI OUT buffer area (n) in step J31. If an empty MIDI OUT buffer area (n) is obtained, the CPU 11 stores the MIDI data in the empty MIDI OUT buffer area (n) (step J34), the present time data in the register WTIME (step J35), and then, the present time data in the WTIME in the MIDI OUT buffer area (n) (step J36). Then or when n has exceeded the predetermined value in step J33, the CPU 11 shifts its control to step J4 in FIG. 13 to increment the address AD.

Figure 16:
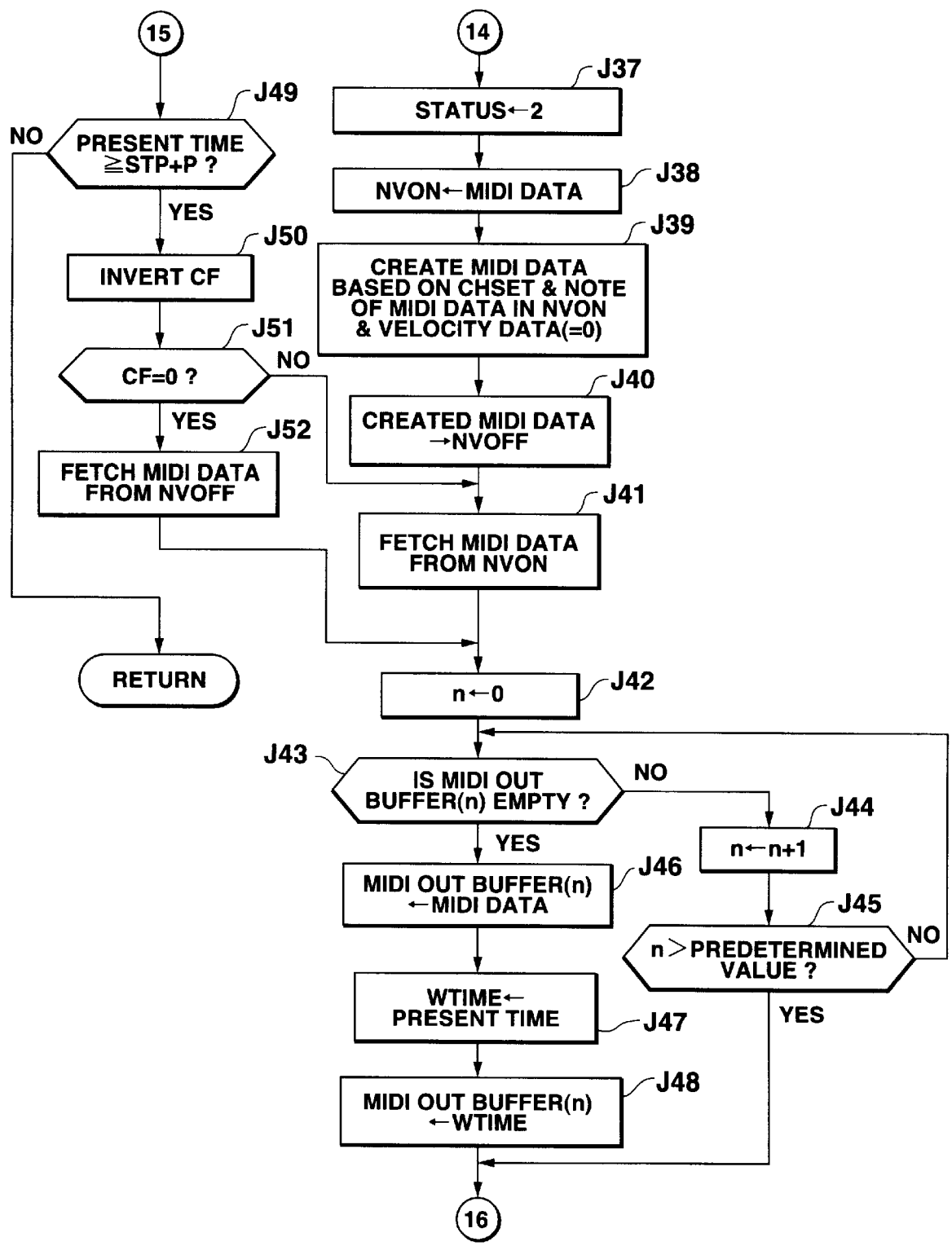
FIG. 16 is a flowchart of a part of the guide A process continuing from FIGS. 13 and 14.

When the value in the register STATUS is not 3 but 1 in step J22 of FIG. 14, the CPU 11 changes the value in the register STATUS to 2 in the flow of FIG. 16 (step J38). That is, after turning on the LED in the key corresponding to the NOTE to guide the corresponding key depression in step J20 or J21 of FIG. 14, the CPU 11 changes the value in the register STATUS from 1 to 2 to stop reading melody data until the key concerned is depressed.

Then, the CPU 11 sets the MIDI data in a register NVON (step J38) and then creates MIDI data based on the CHSET and NOTE data of the MIDI data in the register NVON and the MIDI velocity data whose value is changed 0 (step J39). Then, the CPU 11 stores the obtained MIDI data in the register NVOFF (step J40), fetches the MIDI data from the register NVON (step J41), and sets the pointer n representing the MIDI OUT buffer to 0 (step J42). Then, the CPU 11 increments n while effecting the following looping process:

The CPU 11 determines whether the MIDI OUT buffer area (n) is empty (step J43). If otherwise, the CPU 11 increments n (step J44). The CPU 11 then determines whether n has exceeded the predetermined value (step J45). If otherwise, the CPU 11 searches for an empty MIDI OUT buffer area (n) in step J43. If an empty MIDI OUT buffer area (n) is obtained, the CPU 11 stores the MIDI data in the empty MIDI OUT buffer area (n) (step J46), the present time data in the register WTIME (step J47), and then the present time data in the WTIME in the MIDI OUT buffer area (n) (step J48).

Figure 13:
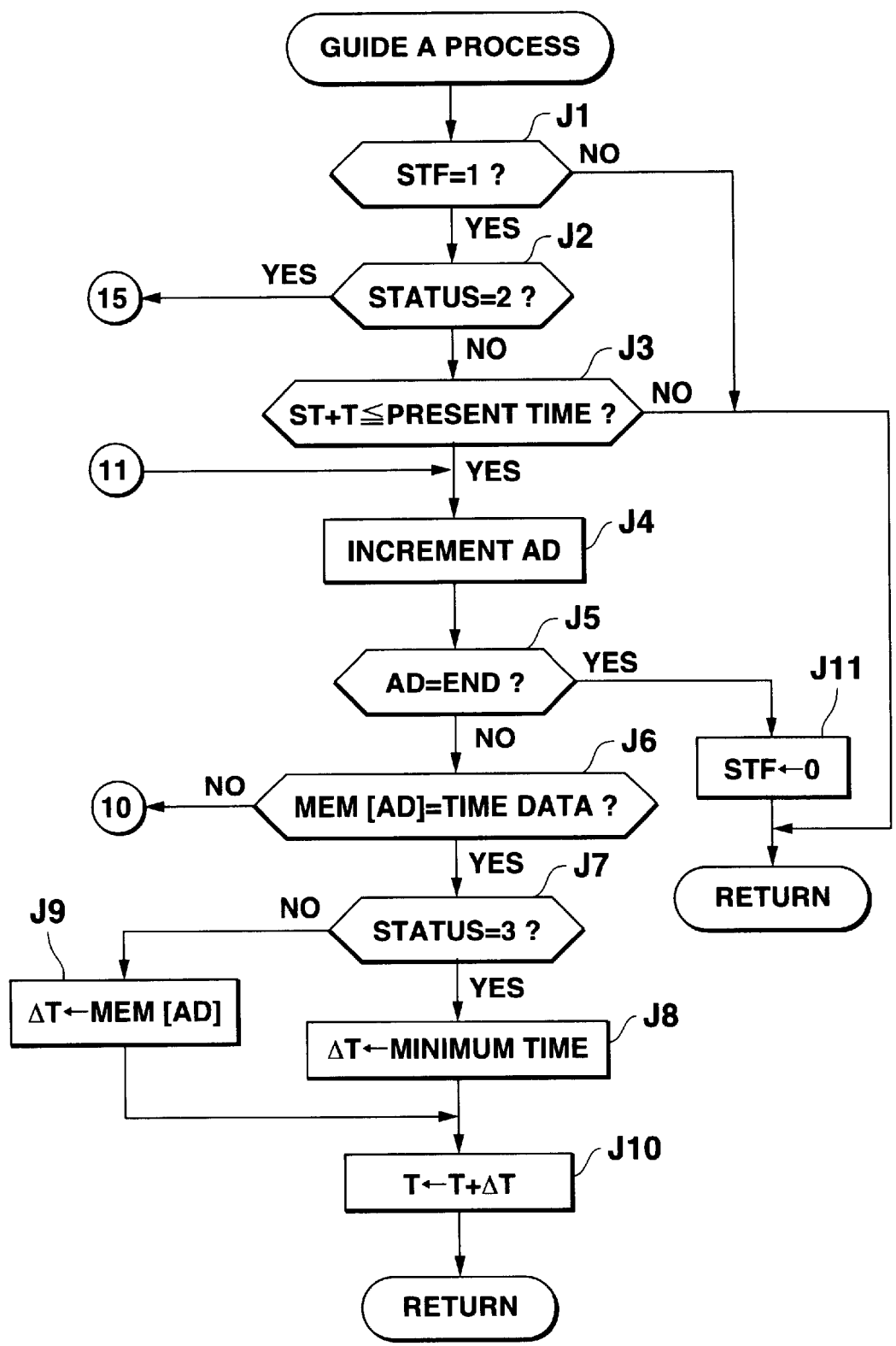
FIG. 13 is a flowchart of a part of a guide A process as a part of the key guiding process of FIG. 12.

When the value in the register STATUS is 2 in step J2 of FIG. 13, or when no key is depressed even after the timing of starting to produce a musical sound based on the read MIDI data has come, the CPU 11 determines whether the present time has exceeded the sum of the time data in the registers STP and P in the flow of FIG. 16 (step J49) or whether a predetermined time (the predetermined value in the register P) has elapsed since the MIDI data was stored in the MIDI OUT buffer area (n) in step J46. Since the LED is turned on or off immediately after the MIDI data was stored, the CPU 11 determines whether the predetermined time has elapsed since the LED was turned on or off.

If otherwise in step J49, the control returns to the flow of the key guide process of FIG. 12. If it is (in step J42), the CPU 11 inverts the CF (step J50). The CPU 11 then determines whether the CF is 0 (step J51). If it is, the CPU 11 fetches the MIDI data whose velocity data is 0 from the register NVOFF (step J52). If the CF is 1, the CPU 11 fetches MIDI data of actual velocity data from the NVON (step J41). Thus, the CPU 11 stores one of musical-sound-producing event data of the actual velocity data and muting event data of "0" velocity data in the MIDI OUT buffer area (n) in step J46.

That is, if no key is depressed even when the timing of starting to produce a musical sound based on the read event data has come, the CPU 11 changes to 0 the velocity data of the event data for producing the musical sound to produce muting event data. Then, the CPU 11 alternately stores the event data for producing the musical sound and the changed muting event data in the MIDI OUT buffer each time the predetermined time stored in the register P elapses.

Figure 17:
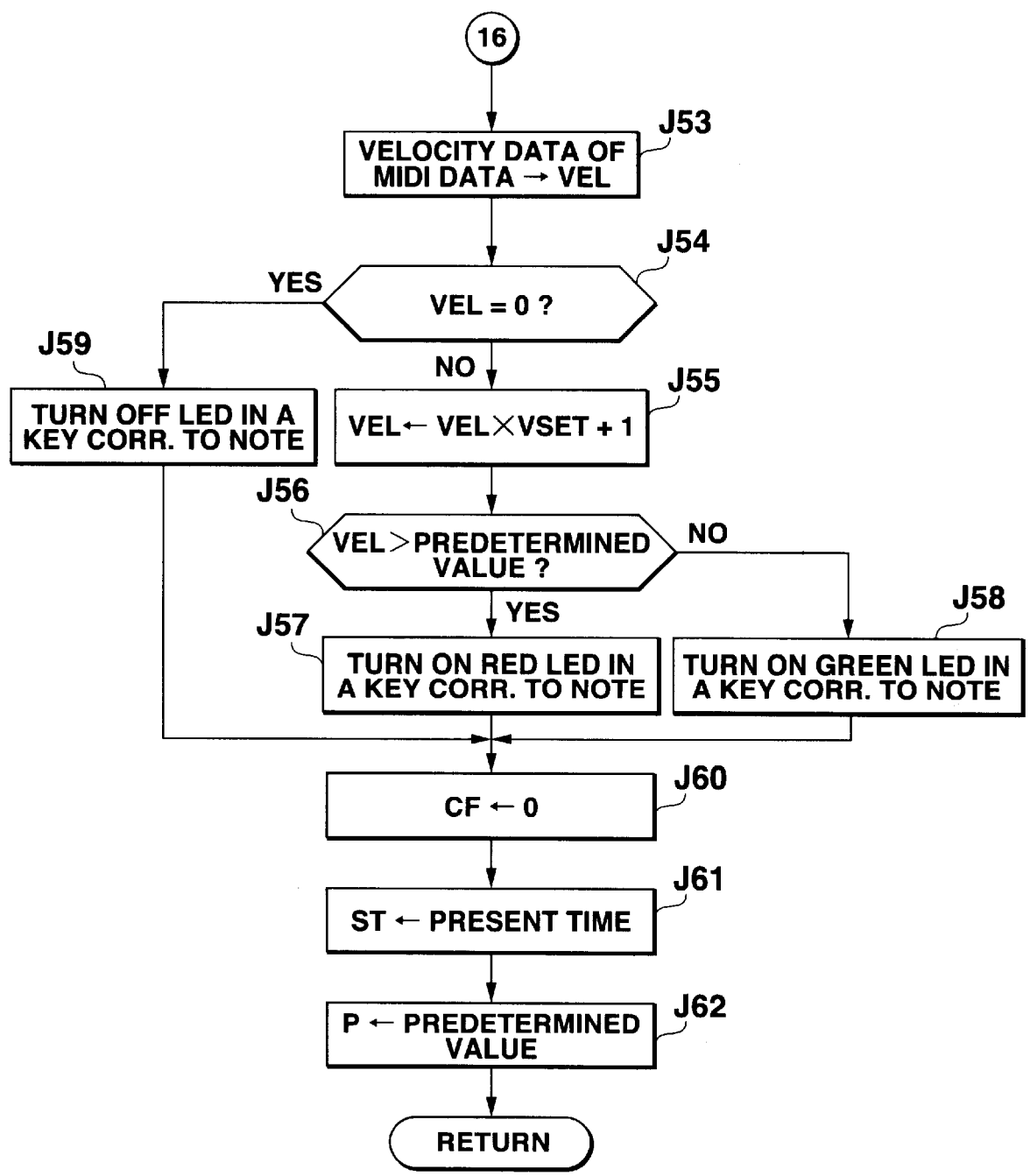
FIG. 17 is a flowchart of the remaining parts of the guide A process continuing from FIG. 14.

Then, the CPU 11 stores the velocity data of the MIDI data in the register VEL in the flow of FIG. 17 (step J53). The CPU 11 then determines whether the data in the register VEL is 0 (step J54). If otherwise or when the note data stored in the register NOTE is note-on data, the CPU 11 multiplies the velocity data in the register VEL by the data in the register VSET, and adds a minimum value "1" to the resulting data of the multiplication (step J55).

Then, the CPU 11 determines whether the velocity data in the register VEL is larger than a predetermined value (step J56). If it is, the CPU 11 turns on a red light emitting LED in a key corresponding to the register NOTE (step J57). If the velocity data in the register VEL is less than the predetermined value, the CPU 11 turns on a green-light emitting LED in a key corresponding to the register NOTE (step J58). If the velocity data in the register VEL is 0 in step J54 or when the note data stored in the register NOTE is muting event data, the CPU 11 turns on the LED in a key corresponding to the register NOTE (step J59).

After turning on or off the LED, the CPU 11 resets a flag CF to 0 (step J60), stores the present time data in the register ST (step J61), and then the predetermined value in the register P (step J62). Then, the CPU 11 terminates this flow and returns its control to the flow of the key guide process of FIG. 12. Thus, after the timing of starting to produce the musical sound has elapsed, the CPU 11 alternately sends the turn-on and turn-off signals corresponding to the event data for producing and muting the musical sound to the LED to turn on and off the LED alternately.

Figure 18:
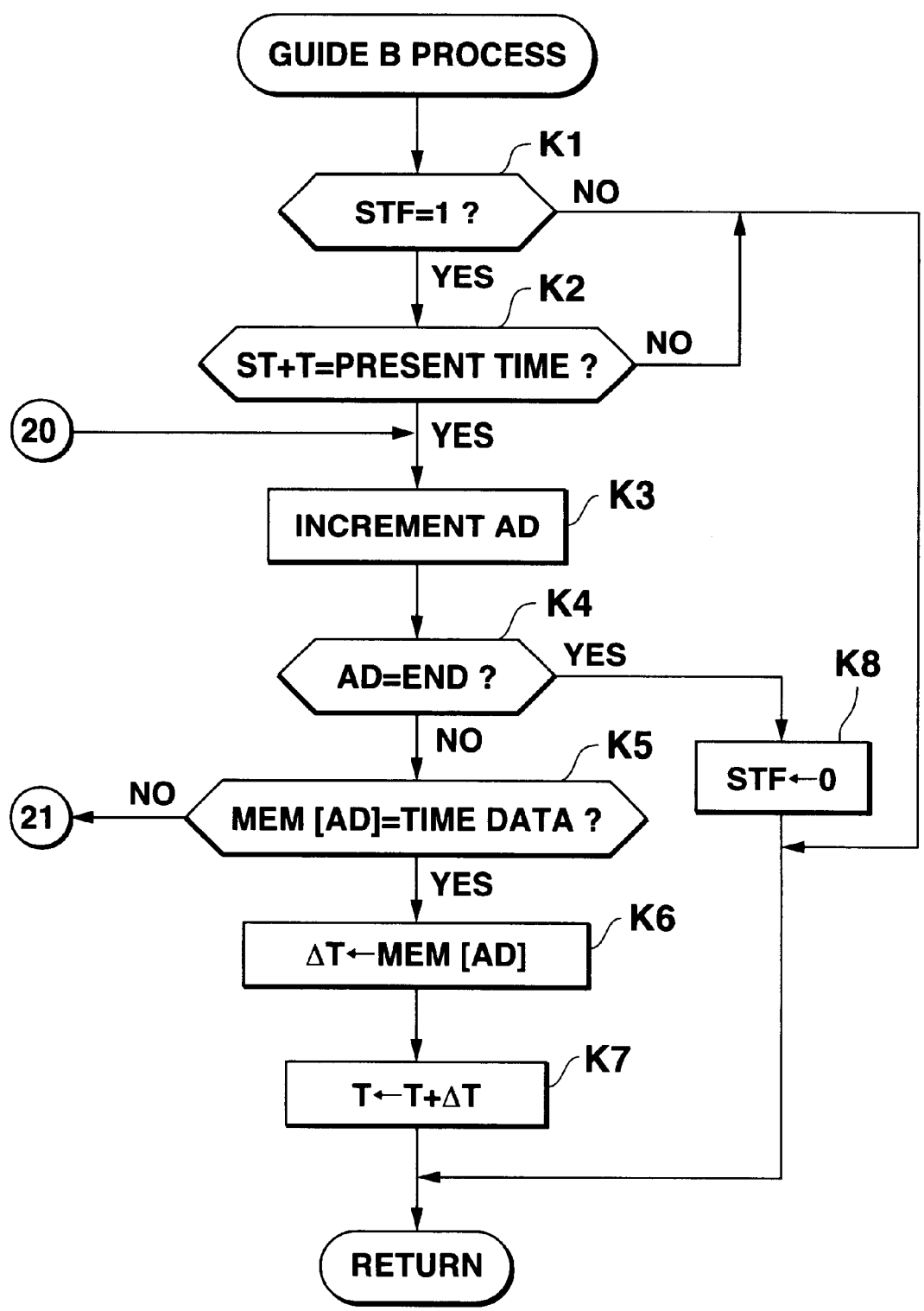
FIG. 18 is a flowchart of a part of a guide B process in the flow of FIG. 12.
Figure 19:
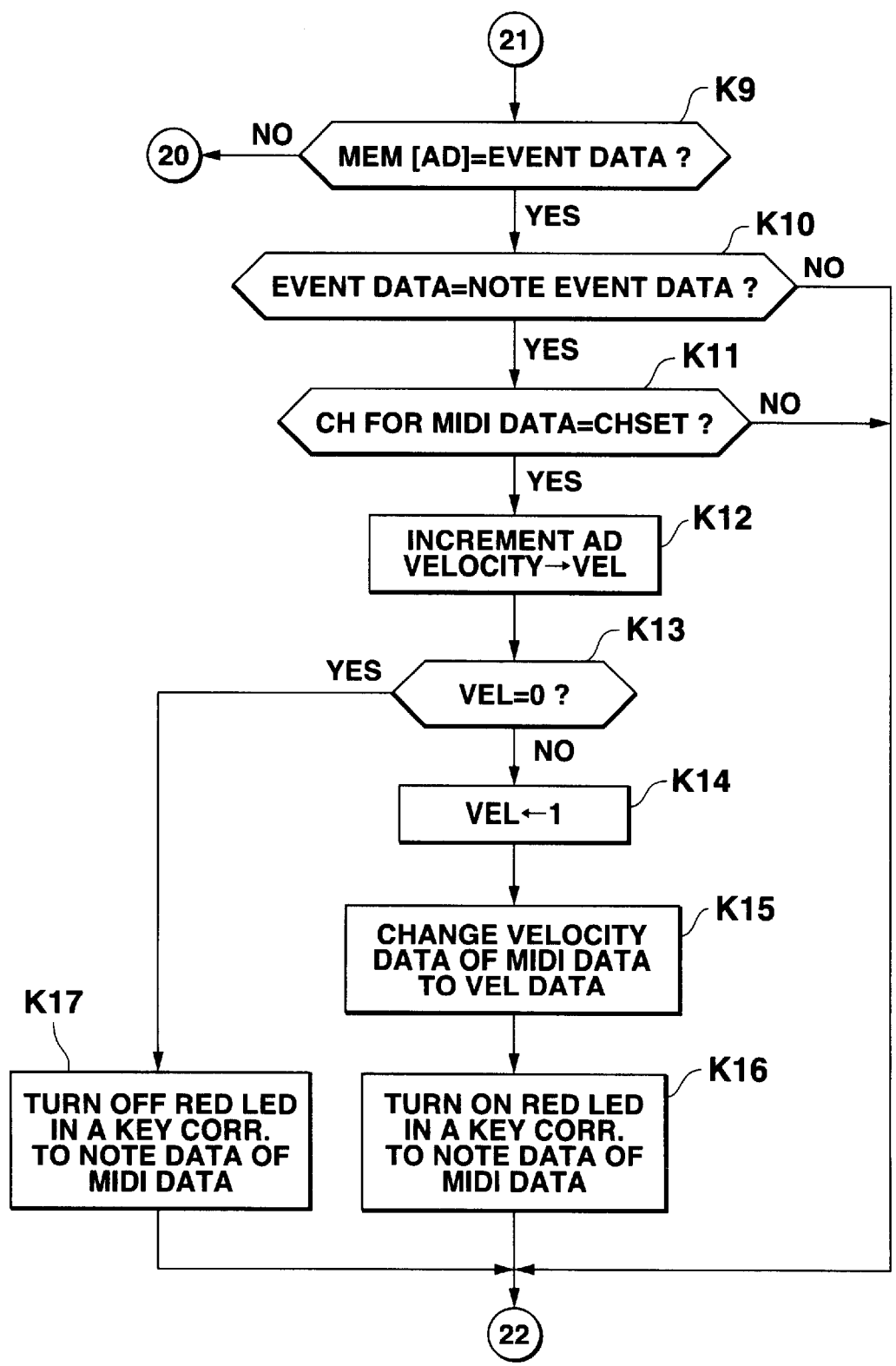
FIG. 19 is a flowchart of another part of the guide B process continuing from FIG. 18.
Figure 20:
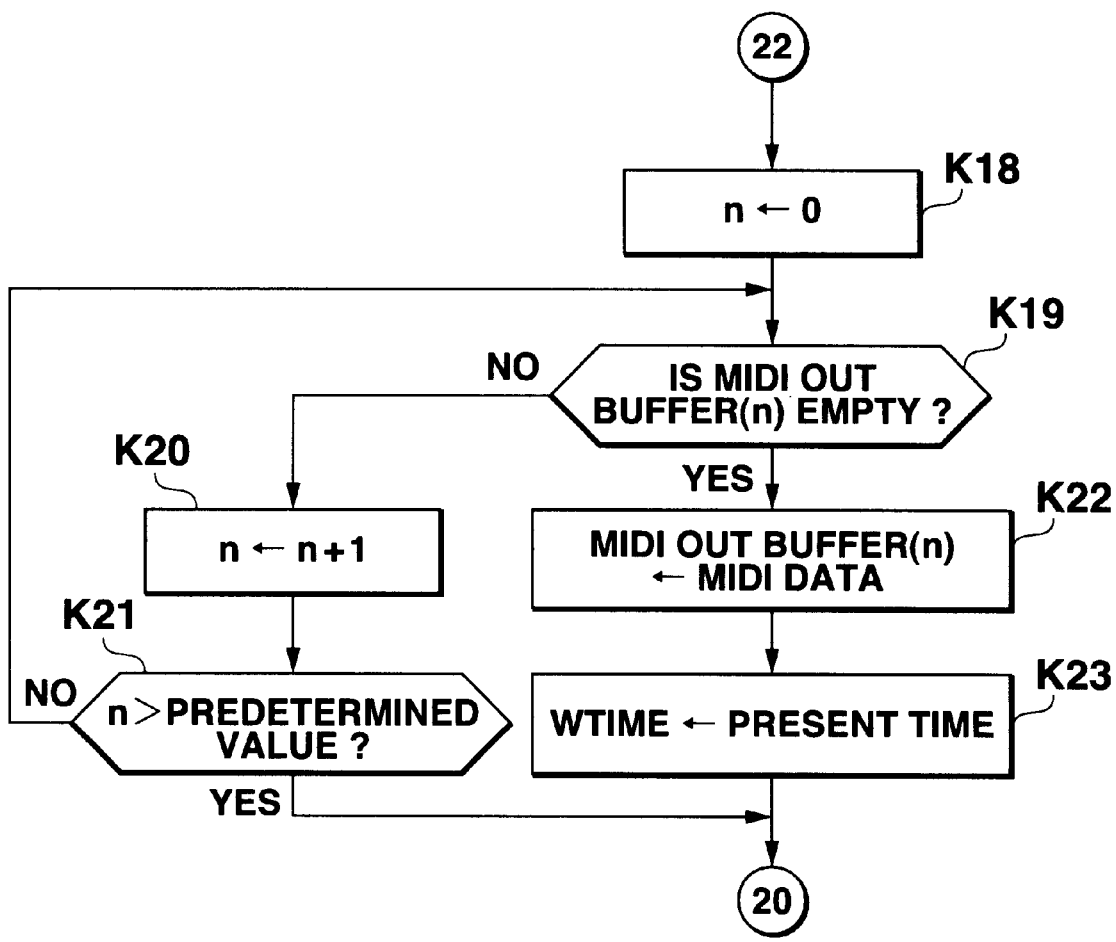
FIG. 20 is a flowchart of the remaining part of the guide B process continuing from FIG. 19.

FIGS. 18–20 together form a flowchart of the guide B process (step H4) as a part of the key guiding process of FIG. 12. In this process, the CPU 11 determines whether the start flag STF is 1 (step K1). If it is 0, which indicates a performance stop state, the CPU 11 terminates this process. If the flag STF is 1, the CPU 11 determines whether the present time coincides with the sum of the time values of the registers ST and T or the timing when the musical sound starts to be produced (step K2). If otherwise, the CPU 11 terminates this process.

When the present time coincides with the timing when the musical sound starts to be produced, the CPU 11 increments the value of the address AD (step K3), and then determines whether the address AD is END (step K4). If otherwise, the CPU 11 determines whether the MEM [AD] data is time data (step K5). If it is time data, the CPU 11 sets in the register ΔT the time data of the MEM [AD] (step K6). The CPU 11 then adds the value of the register ΔT to the value of the register T (step K7), terminates this process, and then returns its control to the key guiding process of FIG. 12. If the AD data is END in step K4, the CPU 11 resets the flag STF to 0 (step K8), terminates this flow and then returns its control to the key guiding process of FIG. 12.

If the MEM [AD] is not time data in step K5, the CPU 11 then determines whether the MEM [AD] is event data in the flow of FIG. 19 (step K9). If otherwise, the CPU 11 shifts its control to step K3 of FIG. 18 to increment the AD. If it is event data, the CPU 11 then determines whether the event data is note event data (step K10). If it is, the CPU 11 then determines whether the channel for the MIDI data and the channel for guiding key depression set in the CHSET are the same (step K11).

If it is, the CPU 11 increments the AD and then stores the velocity data in the register VEL (step K12). The CPU 11 then determines whether the velocity data in the VEL is 0

(step K13). If otherwise, the CPU 11 changes the velocity data in the VEL to 1 (step K14), and the velocity data in the MIDI data to the value of the velocity data in the VEL (step K15). The CPU 11 then turns on a red-light emitting LED in a key corresponding to the note data of the MIDI data (step K16). If the value of the velocity data in the register VEL is 0 in step K13, the CPU 11 turns off the red-light emitting LED in the key corresponding to the note data of the MIDI data (step K17).

After turning on or off the LED or if the event data is not note event data in step K10 or if the channel for the MIDI data and the channel set in CHSET are not the same in step K11, the CPU 11 sets to 0 the pointer n which specifies an area in the MIDI OUT buffer (step K18) and then increments n while effecting the following looping process:

The CPU 11 then determines whether the MIDI OUT buffer area (n) is empty (step K19). If otherwise, the CPU 11 increments n (step K20), and then determines whether n has exceeded the predetermined value (step K21). If otherwise, the CPU 11 searches for an empty MIDI OUT buffer area (n) in step K19. If there is an empty MIDI OUT buffer area (n), the CPU 11 stores the MIDI data in the MIDI OUT buffer area (n) (step K22), the present time data in the register WTIME (step K23), and then shifts its control to step K3 of FIG. 18 to increment the AD.

Figure 21:
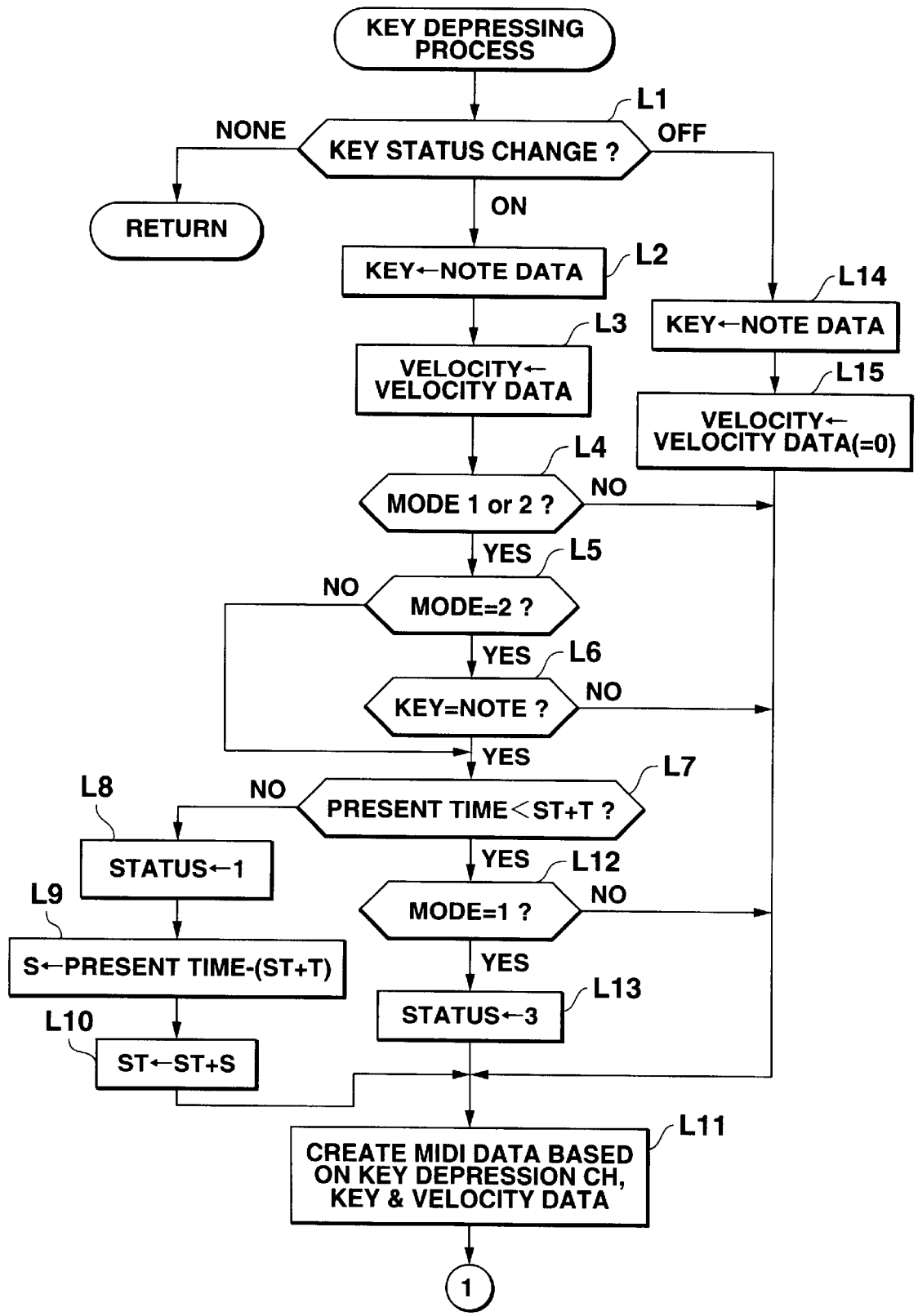
FIG. 21 is a flowchart of a part of a key depressing process of the flowchart of FIG. 5.
Figure 22:
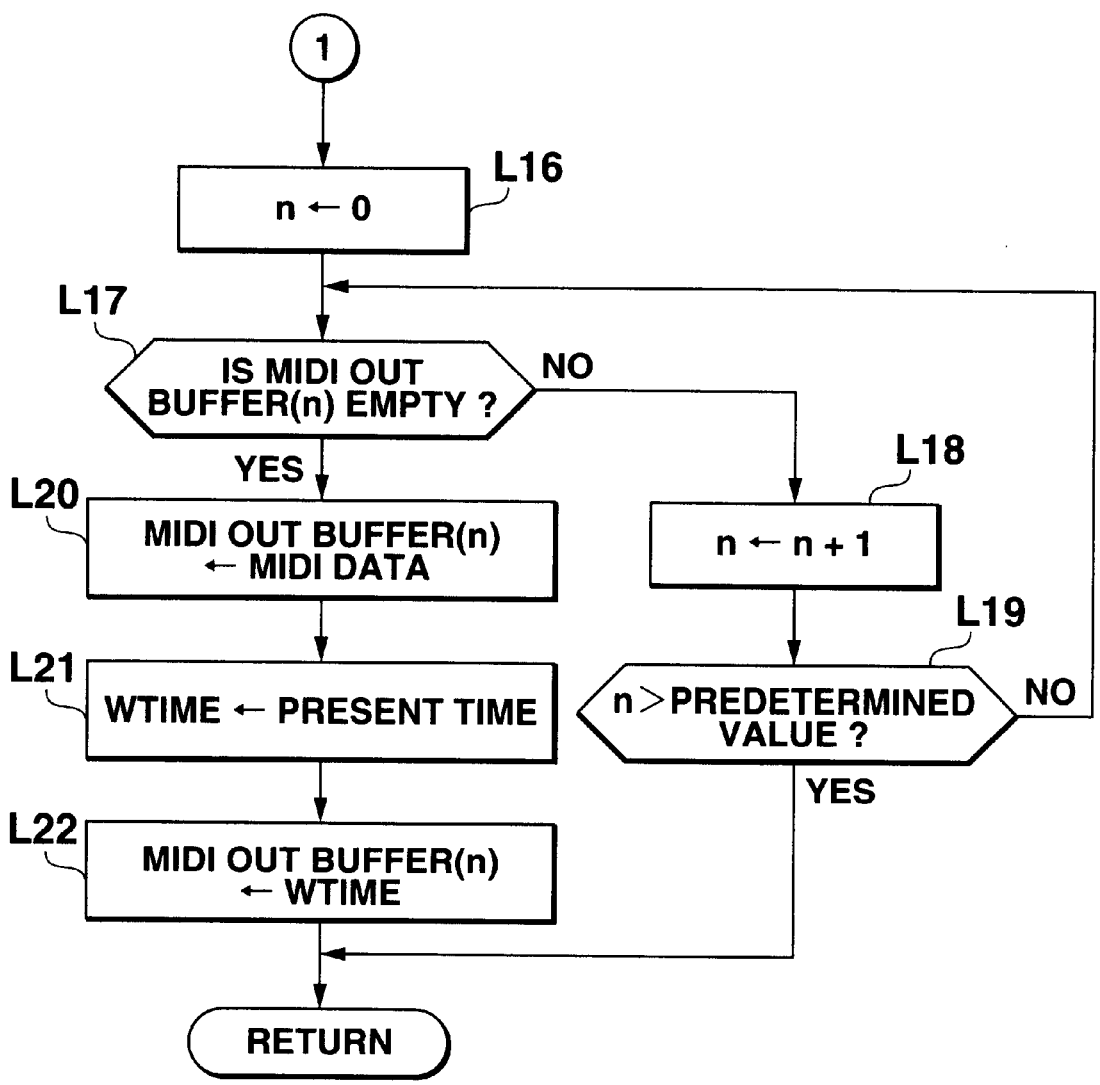
FIG. 22 is a flowchart of the remaining part of the key depressing process continuing from FIG. 21.

FIGS. 21 and 22 together form a flowchart of the key depressing process (step A4) in the main flow of FIG. 5. First, the CPU 11 determines whether the status of any key has changed (step L1). If otherwise, the CPU 11 returns its control to the main flow. If the key has been depressed or if the key status has changed from off to on, the CPU 11 stores note or pitch data on the key in a register KEY (step 12), and also velocity data representing the intensity of depression of the key in a register VELOCITY (step L3).

The CPU 11 then determines whether the value of the mode register MODE is 1 or 2 (step 14) or whether the set mode is a key depression wait mode. When the value of the register MODE is 1 or 2, the CPU 11 then further determines whether the value of the mode register MODE is 2 (step L5). If the value of the mode register MODE is 2, the CPU 11 determines whether the number of the key to be depressed and represented by the value of the register KEY coincides with note data of the MIDI data represented by the value of the register NOTE (step L6).

If the value of the register KEY coincides with the value of the register NOTE or when the value of the register MODE is 1 in step J5, which indicates that an "ANY key" mode is set where a musical sound is produced by depression of any key, the CPU 11 determines whether the present time has reached the sum of the time data of the register ST and T (step L7) or whether the present time has reached the timing when the musical sound starts to be produced.

When the present time has reached the timing, the CPU 11 sets 1 to the value of the register STATUS (step L8), subtracts the sum of the time data of the registers ST and T from the present time, stores the difference in a difference register S (step L9), and adds the time data in the register S to the time data in the register ST (step L10) to update the value of the register ST, and then creates MIDI data based on the CHSET, KEY and VELOCITY data (step L11).

If otherwise in step L7, the CPU 11 determines whether the value of the register MODE is 1 (step L12) or whether the "ANY key" mode is set. When the value of the register MODE is 1, the CPU 11 sets the value of the register STATUS to 3 (step L13). That is, when a key had been depressed before the timing when a corresponding musical sound starts to be produced came, the CPU 11 sets a mode in which the relevant melody data is fed rapidly by the timing when the musical sound starts to be produced s, and then creates MIDI data based on the key depression channel, KEY and VELOCITY data (step L11).

When the key is released from its depression in step L1, the CPU 11 stores a number of the released key in the register KEY (step L14), sets the value of the register VELOCITY to 0 (step J15), and creates MIDI data based on the CHSET, KEY and VELOCITY data (step L11).

When the value of the register MODE is neither 1 or 2, but 3 in step L4, or when the value of the register KEY does not coincide with the value of the register NOTE in step L6, that is, when a key different from the key which the user was guided to depress has been depressed or when the value of the register MODE is not 1 in step J12, the CPU 11 creates MIDI data based on the key depression channel, KEY and VELOCITY data (step L11).

Then, in FIG. 22 the CPU 11 sets to 0 the value of the pointer n which specifies a key depression MIDI OUT buffer area (step L16), increments the value of the pointer n while setting the MIDI data in the MIDI OUT buffer area (n). That is, the CPU 11 determines whether the MIDI OUT buffer area (n) is empty (step L17). If otherwise, the CPU 11 increments the value of the pointer n (step L18), and then determines whether the value of the pointer n has exceeded a predetermined value (step L19). If otherwise, the CPU 11 shifts its control to step J17, where it searches for an empty MIDI OUT buffer area (n).

If the MIDI OUT buffer area (n) is empty, the CPU 11 stores the MIDI data in the MIDI OUT buffer area (n) (step L20). The CPU 11 also stores the present time data in the register WTIME (step J21), and stores the present time data in the register WTIME in the MIDI OUT buffer area (n) (step L22). Then, or when the value of the pointer n has exceeded the predetermined value in step L19, the CPU 11 then terminates this process and returns its control to the main flow of FIG. 5.

Figure 23:
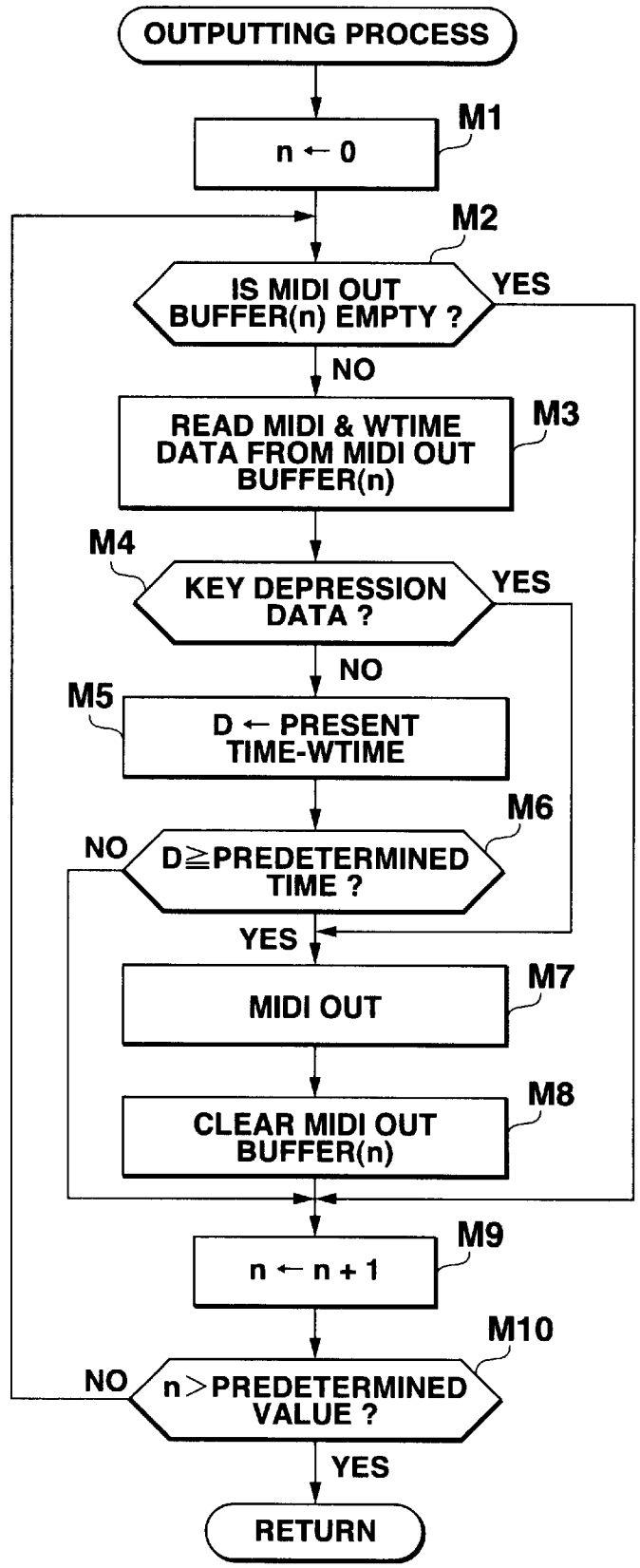
FIG. 23 is a flowchart of an outputting process in the main flowchart of FIG. 5.

FIG. 23 is a flowchart of the outputting process (step A6) in the flow of FIG. 5. In this process, the CPU 11 sets the pointer specifying a MIDI OUT buffer area to 0 representing the head address of the buffer (step M1), and then increments n while effecting the following processes: the CPU 11 determines whether the MIDI OUT buffer area (n) specified by n is empty (step M2). If otherwise, the CPU 11 reads out the MIDI data and the WTIME data from the MIDI OUT buffer area (n) (step M3). The CPU 11 then determines whether the read MIDI data is obtained from the MIDI OUT buffer for the key depression (step M4). That is, the CPU 11 determines whether the data is not the MIDI data created by performance, but the MIDI data read out from the MEM (floppy disk). If the data is the MIDI data from the MEM, the CPU 11 stores in the register D a value representing the present time minus the time data in the WTIME (step M5).

Then, the CPU 11 determines whether the value of the D has exceeded the predetermined time (step M6). If it has, the CPU 11 outputs the MIDI data to the MIDI sound source 13 of FIG. 1 (step M7). If the read data is the MIDI data produced by the performance in step M4, the CPU 11 immediately outputs the read data to the sound source (step M7) and then empties the MIDI OUT buffer area (n) (step M8). Then or if the value in the D is less than the predetermined value in step M6, or if the MIDI OUT buffer area (n) is empty in step M2, the CPU 11 increments n (step M9). The CPU 11 then determines whether n has exceeded the predetermined value (step M10). If otherwise, the CPU 11 shifts its control to step M2 to repeat the looping process in steps M2–M10. If n has exceeded the predetermined value, the CPU 11 terminates this flow and then returns its control to the main flow of FIG. 5.

The reason why the MIDI data output from the keyboard 1 to the MIDI sound source 3 is delayed intentionally by a predetermined time, as described above, is that because the timing of outputting to the MIDI sound source 3 the MIDI data in the channel set in the register CHSET is delayed inevitably compared to the timing of outputting the MIDI data from the keyboard to the MIDI sound source 3 due to the key depression being guided, the MIDI data output from the keyboard 1 to the MIDI sound source 3 is delayed intentionally by the predetermined time such that all the MIDI data are output simultaneously to the MIDI sound source.

Figure 24:
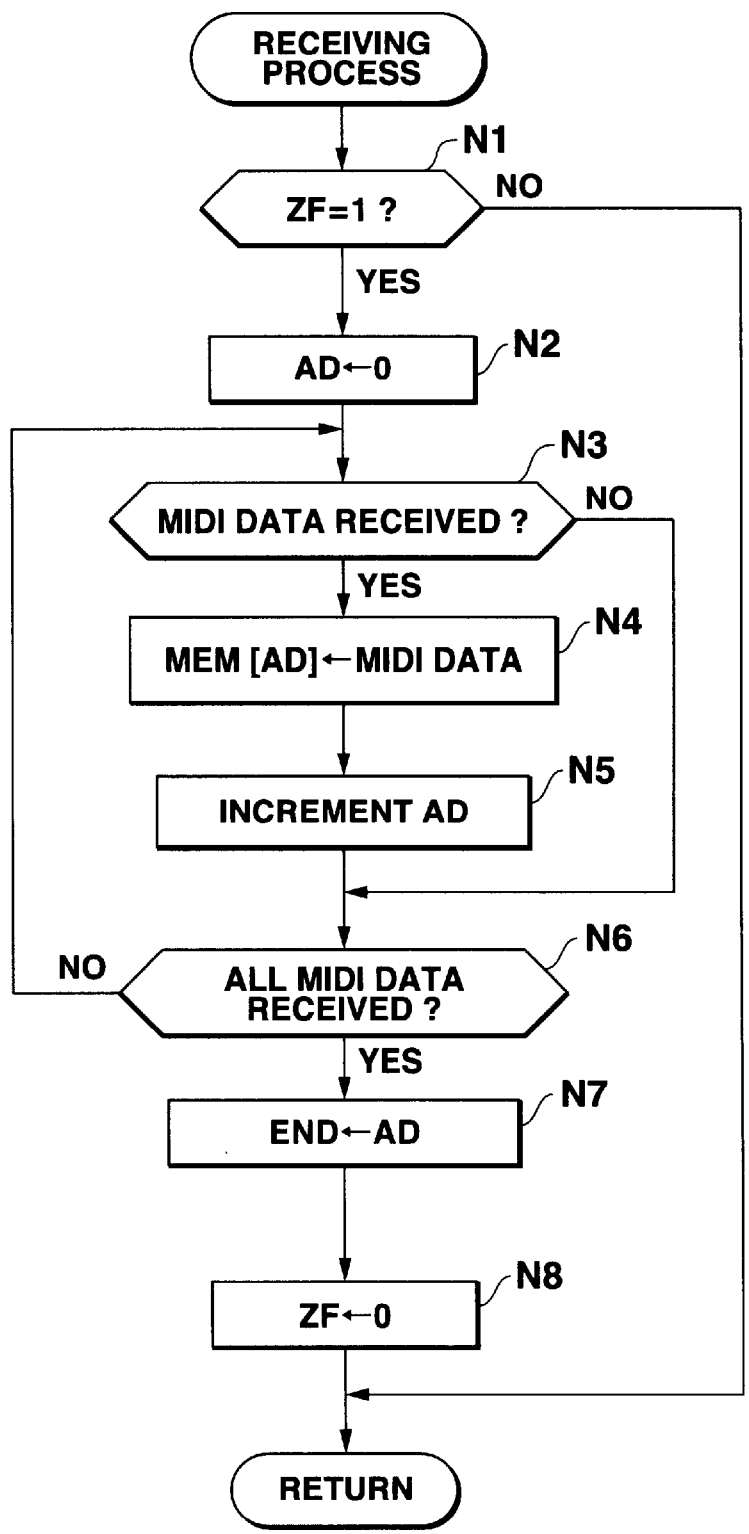
FIG. 24 is a flowchart of a receiving process in the flowchart of FIG. 5.

FIG. 24 is a flowchart of the receiving process (step A7) as a part of the main flow. In this process, the CPU 11 determines whether a reception flag ZF is 1 (step N1). If the flag ZF is 0, the CPU 11 terminates this process. When the flag ZF is 1, which represents a request for an access to the melody data server 5, the CPU 11 sets the value of the address AD to 0 (step N2), and then increments the value of the address AD while effecting the following looping process.

The CPU 11 determines through the modem 17 whether MIDI data has been received (step N3). If it has been received, the CPU 11 stores the MIDI data in an area in the floppy disk specified by the address AD (step N4), increments the value of the address AD, and then specifies a next area (step N5). Then, the CPU 11 determines whether the reception of MIDI data has been terminated (step NG). If otherwise, the CPU 11 shifts its control to step N3, where it determines whether there is received MIDI data. If there is, the CPU 11 stores this data in an area in the floppy disk indicated by the AD. When the reception of the MIDI data is terminated in step N6, the CPU 11 sets the value of the address AD in a register END (step N7), resets the reception flag ZF to 0 (step N8), and then returns its control to the start of the main flow of FIG. 5.

As described above, in the first embodiment the CPU 11 of the keyboard composes data reading means which reads out musical-sound producing or muting event data from the floppy disk 2, and signal generating means for generating a turn-on or off signal depending on the read event data. The CPU 11 also composes data changing means for changing musical-sound producing event data to musical-sound muting event data. The CPU 11 further composes light emission control means in which when a proper key is not depressed even after the timing of producing a musical sound based on the musical-sound producing event data has elapsed, a turn-on signal corresponding to the musical-sound producing event data and a mute signal corresponding to the musical-sound muting event data to which the musical-sound producing event data was changed are output alternately to the LED 20 for turning on and off purposes.

Thus, in the navigation function of guiding the performance, teaching the timing of key depression corresponding to the timing of starting to produce the musical sound is easily realized without editing the melody data concerned.

In this case, the CPU 11 and the modem 17 compose communication control means which is connected to the melody data server 5 as an external device through a telecommunication line (network 4) to receive melody data from the melody data sever 5. Thus, even when melody data received from the external device through the telecommunication line cannot be edited, teaching the timing for key depression corresponding to the timing for starting to produce a musical sound is realized.

A LED 20 provided in each key emits red or green light depending on whether the velocity data of the read event data is higher or lower than the predetermined value. Thus, not only the timing of key depression but also the strength of key depression can be guided.

Figure 25:
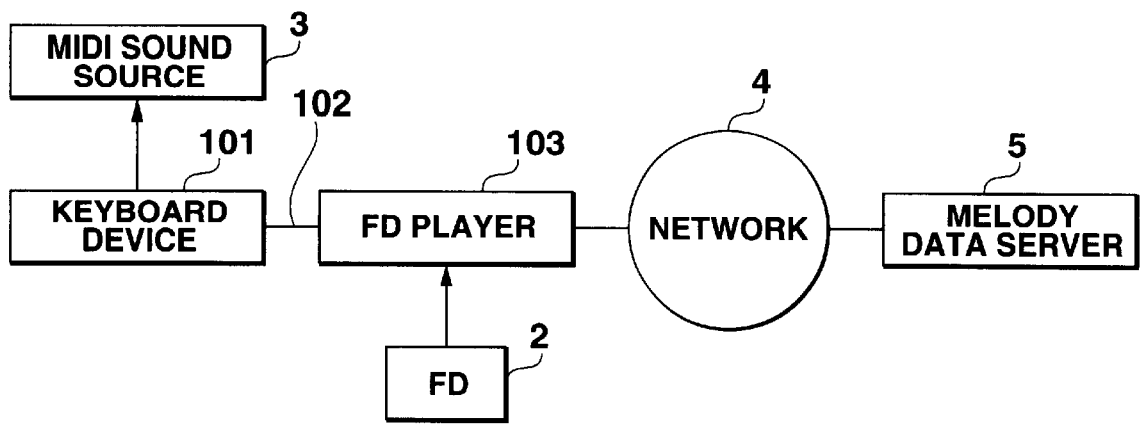
FIG. 25 illustrates the composition of a system using a FD player as a second embodiment.
Figure 26:
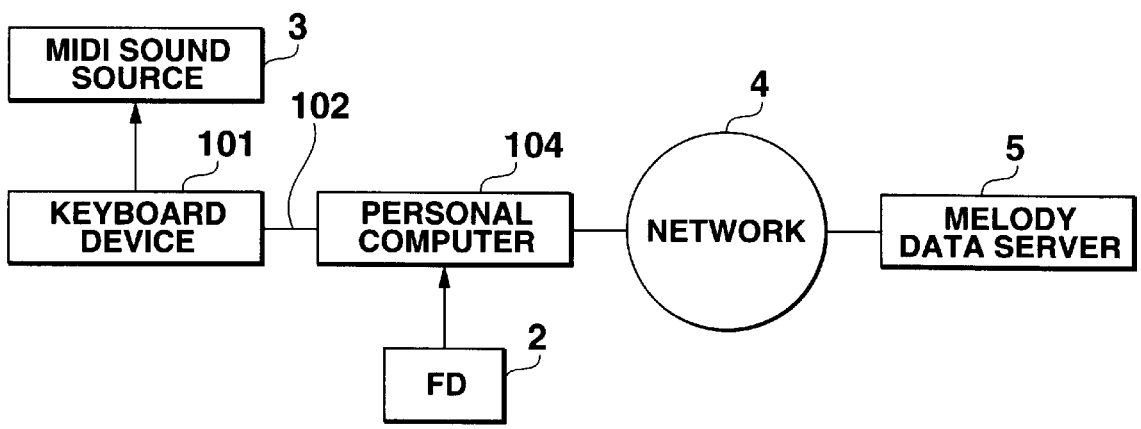
FIG. 26 illustrates the composition of a system using a personal computer as the second embodiment.

A second embodiment of the inventive performance training apparatus will be described next. FIGS. 25 and 26 show the composition of a system of the second embodiment. In FIG. 25, the keyboard device (performance device) 101 is connected through a serial interface such as an RS-232C102 to an FD player (performance control device) 103, which includes a modem as communication control means, which is connected through a network (telecommunication line) 4 such as the internet to a melody data sever 5 to receive melody data from the melody data server 5 and to store the data in a floppy disk (FD 2).

In the performance training apparatus, the keyboard device 101 communicates with the FD player 103 to train the performance. To this end, the keyboard device 101 comprises means (first receiving means) for receiving melody data in an MIDI data form from the ED player 103 and means (first transmitting means) for transmitting in the MIDI data form information indicative of a result of key depression to the FD player 103. The FD player 103 comprises means (second transmitting means) for driving the floppy disk 2 (storage means) which prestores melody data and for transmitting read melody data in the MIDI data form to the keyboard device 101, and means (second receiving means) for receiving from the keyboard device 101 information indicative of the result of key depression in the MIDI data form.

In FIG. 26, the keyboard device performance device) 101 is connected through a serial interface such as an RS-232C102 to a general-purpose personal computer (performance control device) 104, which includes a modem as communication control means, which is connected through a network (telecommunication line) 4 such as the internet to a melody data server 5 to receive melody data from the melody data sever 5 and to store the data in the floppy disk 2.

In the performance training apparatus, the keyboard device 101 communicates with the personal computer 104 to train the performance. To this end, like the composition of FIG. 25, the keyboard device 101 comprises means (first receiving means) for receiving melody data in the MIDI data form from the personal computer 104, and means (first transmitting means) for transmitting in the MIDI data form information indicative of a result of key depression to the personal computer 104. The personal computer 104 comprises means (second transmitting means) for driving the floppy disk 2 which prestores melody data and for transmitting the read melody data in the MIDI data form to the keyboard device 101, and means (second receiving means) for receiving in the MIDI data form information indicative of the result of key depression from the keyboard device 101.

As described above, the FD player 103 of FIG. 25 uses the general purpose personal computer 104 of FIG. 26 as a dedicated performance control device, which comprises a program ROM which prestores a performance training program, switches such as a mode select switch and a start switch, and other components necessary for training the performance. That is, as the performance training apparatus, the composition of FIG. 25 is exactly the same as that of FIG. 26.

The melody data stored in the floppy disk 2 of FIG. 25 has the same MIDI data form as that stored in the floppy disk 2 of FIG. 26, and comprises event data which is composed pitch data indicative of operation elements to be operated or keys to be depressed, and velocity data indicative of the intensities of produced musical sounds or the muting of the musical sounds, and time data indicative of timings of starting to produce the musical sounds. The MIDI data is the same in composition as that of the first embodiment in FIGS. 3 and 4.

Figure 27:
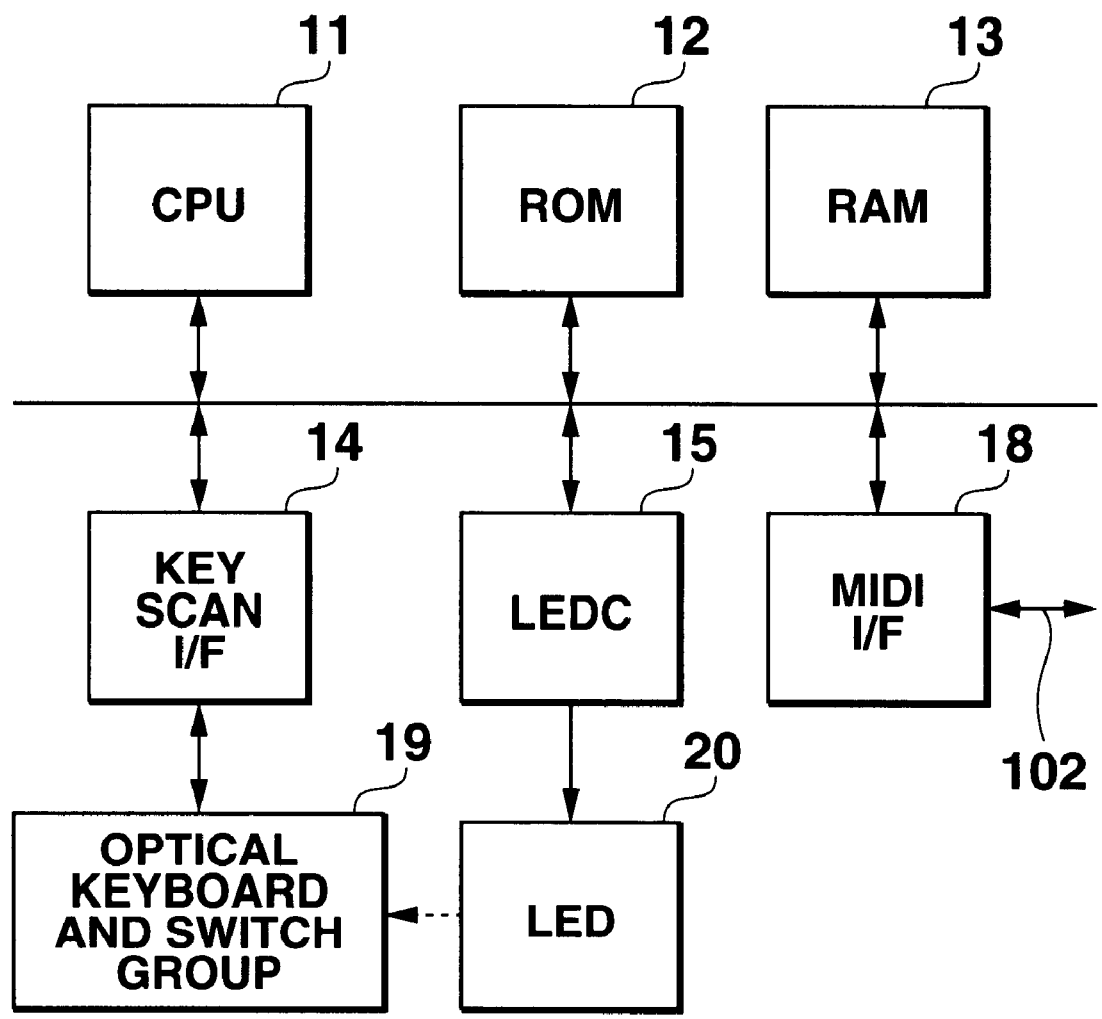
FIG. 27 illustrates the composition of a keyboard of the system of FIGS. 25 and 26 as the second embodiment.

FIG. 27 is a block diagram of the keyboard device 101. The CPU 11 is connected through a system bus to a ROM 12, a RAM 13, a key scan interface 14, a LEDC (LED controller)15, and a MIDI interface 18.

The ROM 12 prestores the performance training program performed by the CPU 11. The RAM 13 temporarily stores various data processed by the CPU 11. The key scan interface 14 is connected to a keyboard 19 which includes an optical keyboard composed of a plurality of operation elements or keys each with a LED 20, and a plurality of switches to scan the depressed key and to input a signal indicative of the depressed key to the CPU 11. The LEDC 15 controls the turning on and off of a respective one of the LEDs 20 provided in each key to control its turning on and off E The LEDs 20 each includes a pair of red and green light emitting elements. The MIDI interface 18 transmits/receives MIDI data to/from the personal computer 104 through the serial interface 102.

The operation of the performance training apparatus of the second embodiment represented by the system composition of FIG. 26 will be described with reference to a flowchart indicative of a program executed by the personal computer 104 and a flowchart indicative of operation of the CPU 11 of the keyboard device 101. The personal computer 104 receives melody data in the MIDI data form from the sever 5, stores it in the floppy disk 2, and then transmits it to the keyboard device 101. The personal computer 104 also receives MIDI data as information indicative of results of depressing the keys of the keyboard device 101 and sequentially outputs from the floppy disk 2 next MIDI data depending on the contents of the received MIDI data.

Figure 28:
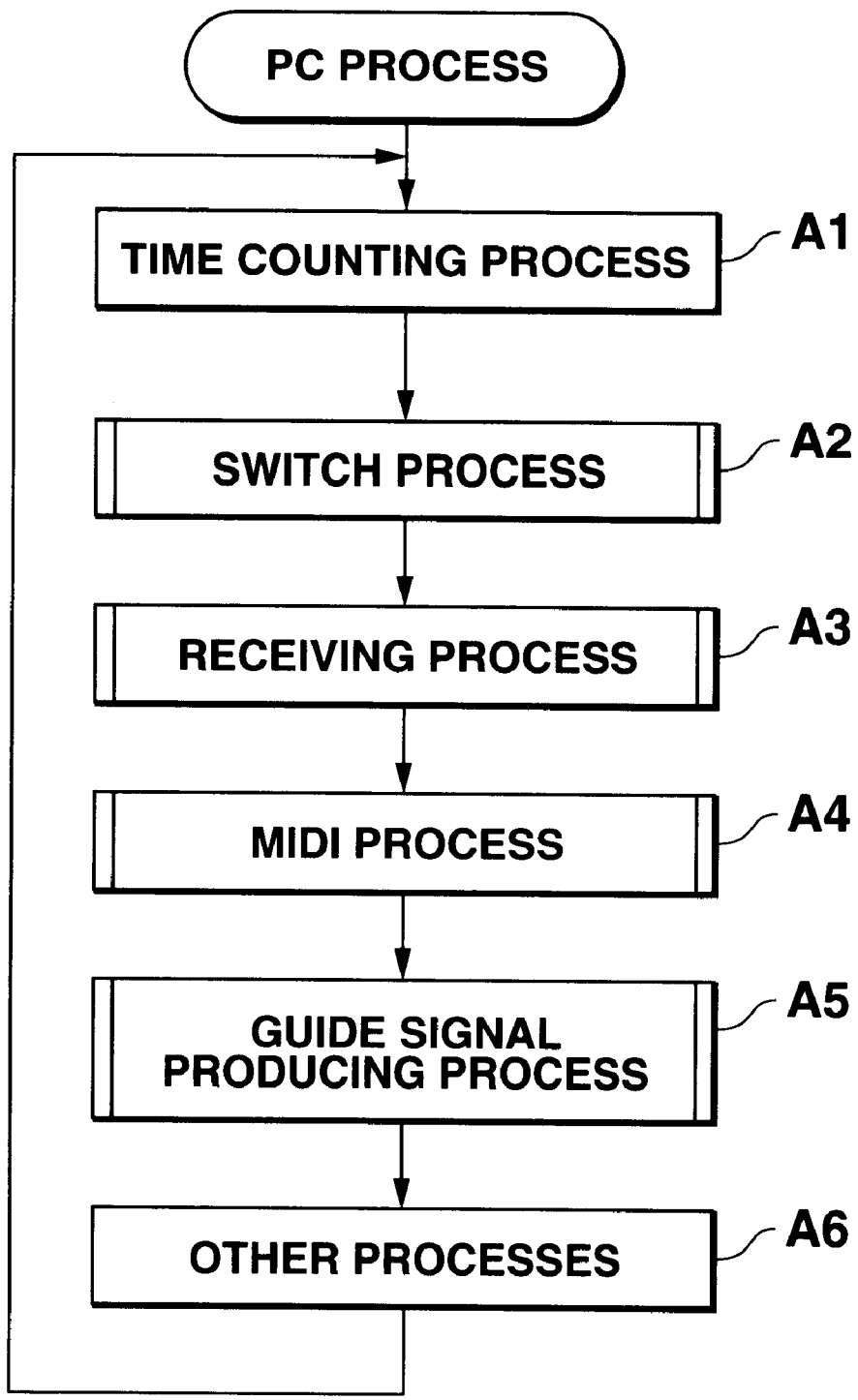
FIG. 28 is a main flowchart of operation of the personal computer of FIG. 26.

FIG. 28 shows a main flow of operation of the personal computer (PC) 104 as the performance control device. The main flow is composed of a time counting process (step A1), a switch process (step A2), a receiving process (step A3), a MIDI process (step A4), a guide signal producing process (step A5), and other processes (step A6), which are repeated in a loop.

Figure 29:
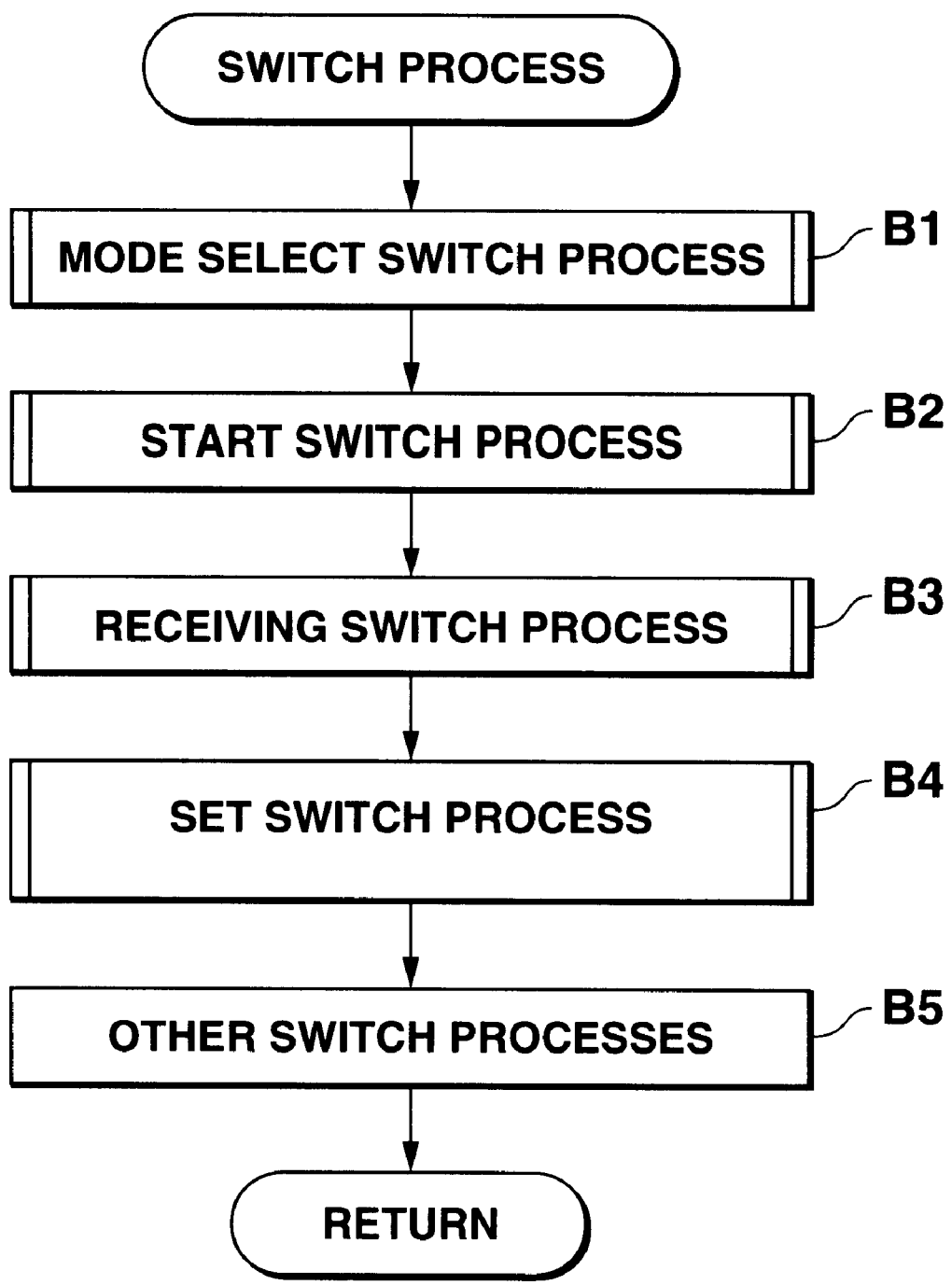
FIG. 29 is a flowchart of a switch process in the flow of FIG. 28.

FIG. 29 shows a flow indicative of the switch process (step A2) of the main flow of FIG. 28. In this process, the personal computer keyboard is scanned and a mode select switch process (step B1), a start switch process (step B2), a receiving switch process (step B3), a setting switch process (step B4), and another switch process (step B5) are effected. The control then returns to the main flow.

Figure 30:
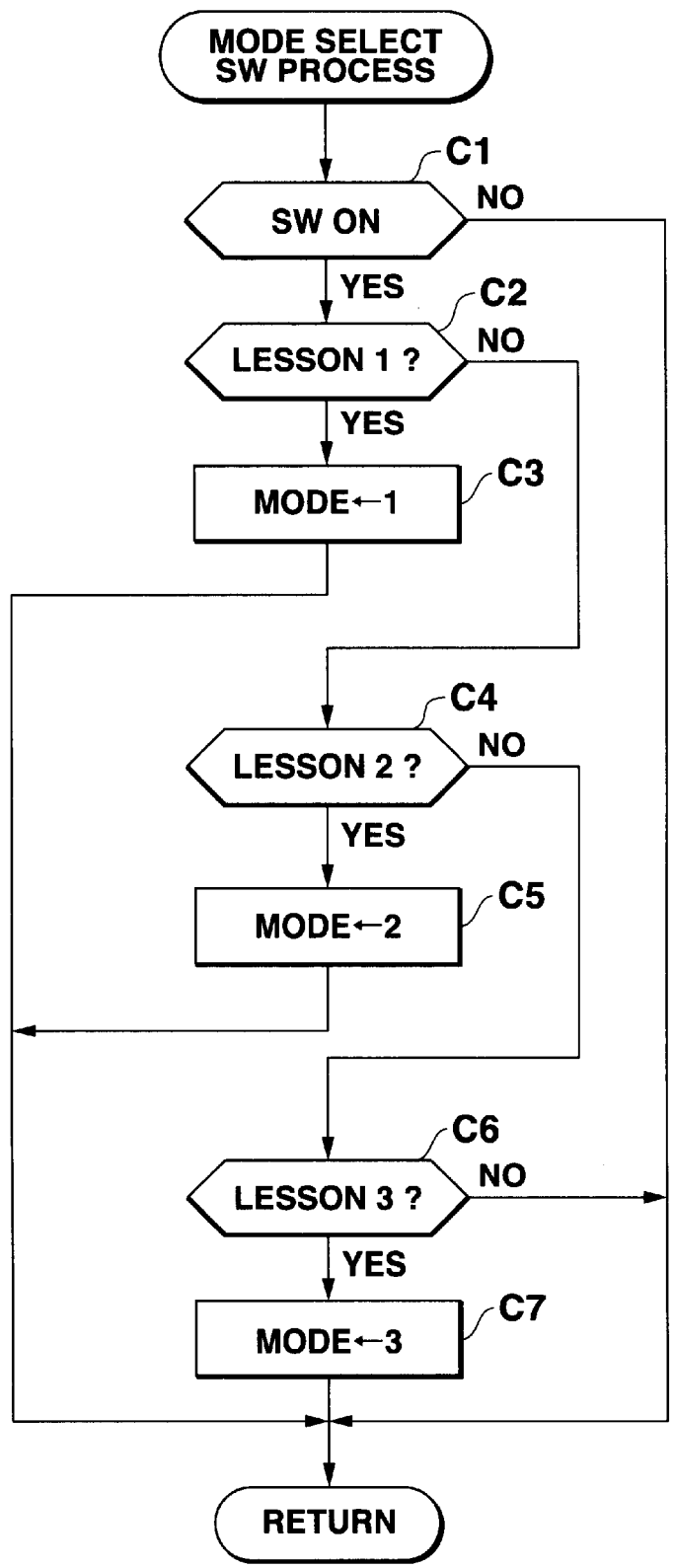
FIG. 30 is a flowchart of a mode select switch process in the flow of FIG. 29.

FIG. 30 shows a flowchart of the mode select switch process (step B1) of FIG. 29. In this process, the CPU 11 determines whether any one of the mode select switches which include a normal switch, a lesson 1 switch, a lesson 2 switch and a lesson 3 switch is turned on (step C1). If otherwise, the CPU 11 terminates this process. If any one of the switches is turned on, the CPU 11 effects a process corresponding to the turning on of the mode select switch.

The CPU 11 then determines whether the lesson 1 switch has been turned on (step C2). If it has, the CPU 11 sets a mode register MODE to "1" (step C3). Then, the CPU 11 determines whether the lesson 2 switch has been turned on (step C4). If it has, the CPU 11 sets the mode register MODE to "2" (step C5). The CPU 11 then determines whether the lesson 3 switch has been turned on (step C6). If it has, the CPU 11 sets the mode register MODE to "3" (step C7).

The value "1" of the mode register MODE indicates an "ANY key" mode in which a musical sound of melody data is produced when any key is depressed irrespective of note data (pitch) of the melody data. The value "2" of the mode register MODE indicates a performance mode in which a musical sound is produced when a (light emitting) key corresponding to the note data of melody data is depressed correctly. The value "3" of the mode register MODE indicates a mode in which melody data is read automatically irrespective of the performance and in which a musical sound of the melody data is produced when a corresponding guided key is depressed. When a numerical value corresponding to each of the mode select switches is set in the mode register MODE, the CPU 11 terminates this process and then returns its control to the switch process of FIG. 29.

Figure 31:
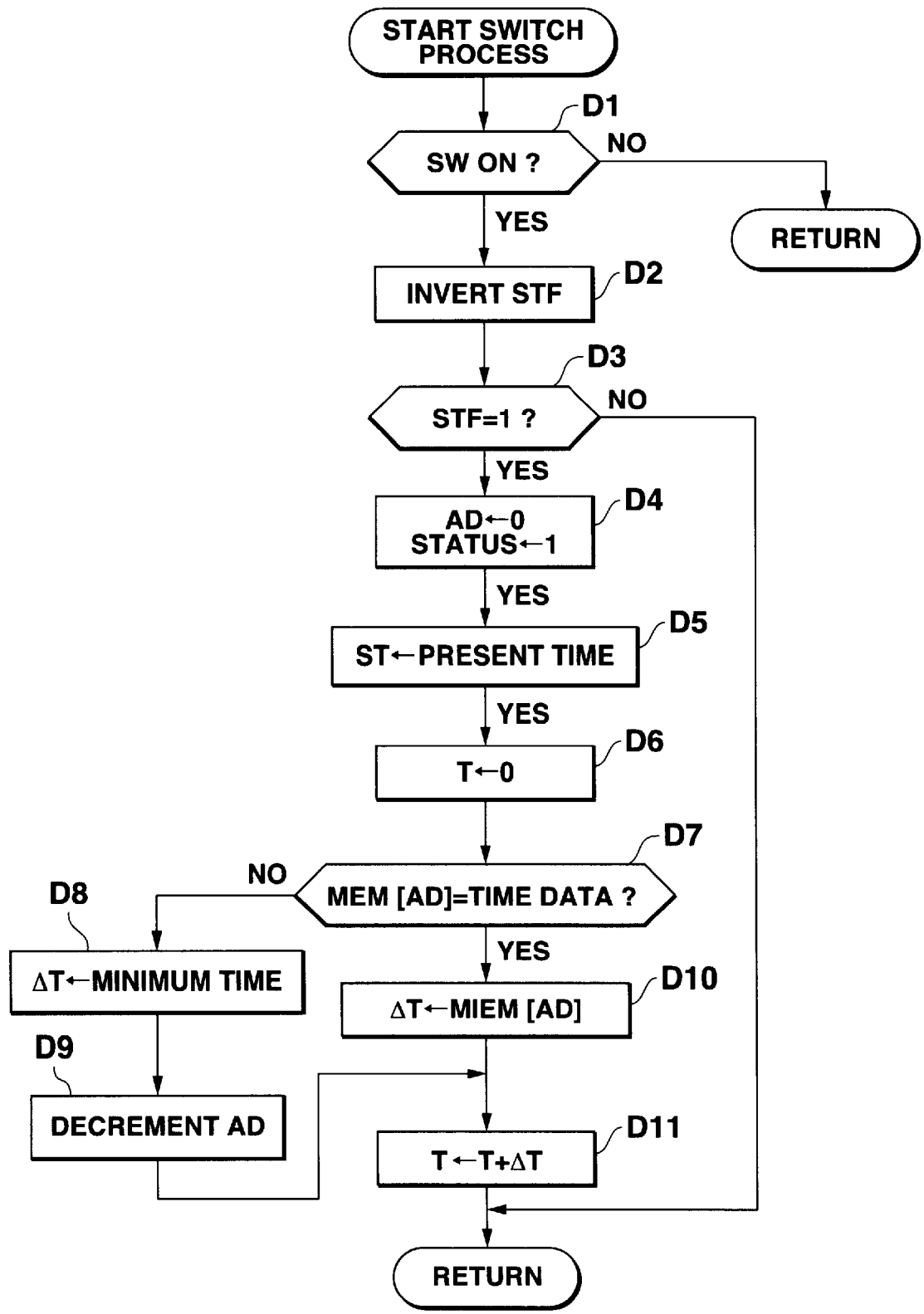
FIG. 31 is a flowchart of a start switch process in the flow of FIG. 29.

FIG. 31 is a flowchart indicative of the start switch process (step B2) as a part of the switch process of FIG. 29. In this process, the CPU 11 determines whether the start switch has been turned on (step D1). If otherwise, the CPU 11 terminates this process. If it has been turned on, the CPU 11 inverts a start flag STF (step D2), and then determines whether the STF is "1" (step D3).

If the start flag STF is "1", the CPU 11 then sets an address register AD to "0" or a head address of the melody data, and a register STATUS to "1" (step D4). The value of the register STATUS is set in a MIDI IN process and a guide A process effected on the keyboard side to be described later. When the value of the register STATUS is "1", it is meant that a timing of depressing a proper key coincides with a timing of starting to produce a musical sound of the melody data concerned. When the value of the register STATUS is "2", it is meant that no key is depressed even after the timing of starting to produce a musical sound of the melody data has passed or that the timing of depressing the key is delayed. When the value of the register STATUS is set to "3", it is meant that the key has been depressed before the timing of starting to produce a musical sound of the melody data comes or that the timing of depressing the key was too early.

After step D4, the CPU 11 stores data representing the present time in a register ST (step D5), and then sets "0" in a time register T (step D6). The CPU 11 then determines whether data MEM [AD] at an address AD (=0) in the melody data storage area is time data (step D7) or whether the head of the melody data is event data or time data. If it is event data, the CPU 11 sets a minimum time contained in the MIDI data in a register ΔT (step D8), decrements the value of the address AD by "1" (step D9) to return the address by one. Thus, the value of the AD becomes "−1". This decrementing step is required in the key guiding process to be described later.

When the head of the melody data is not event data, but time data in step D7, the CPU 11 sets the time data in the register ΔT (step D10). After decrementing the address AD in step D9 or setting time data in the register ΔT in step D10, the CPU 11 adds the value of the register ΔT to the value of the time register T for updating purposes (step D11). Then, the CPU 11 terminates this process and returns its control to the switch process of FIG. 29. When the start flag STF is 0 in step D3, which indicates a performance stop state, the CPU 11 terminates this process, and then returns its control to the switch process of FIG. 29.

Figure 32:
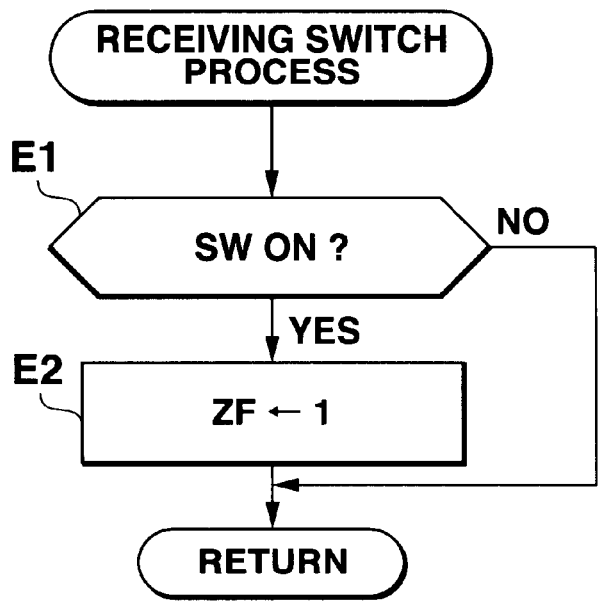
FIG. 32 is a flowchart of a reception switch process in the flow of FIG. 29.

FIG. 32 shows a flowchart of the receiving switch process (step B3) as a part of the switch process, in which the CPU 11 determines whether the receiving switch has been turned on (step E1). If otherwise, the CPU 11 terminates this process. If it has been turned on, the CPU 11 sets a reception flag ZF to "1" (step E2), terminates this process and then returns its control to the switch process of FIG. 29.

Figure 33:
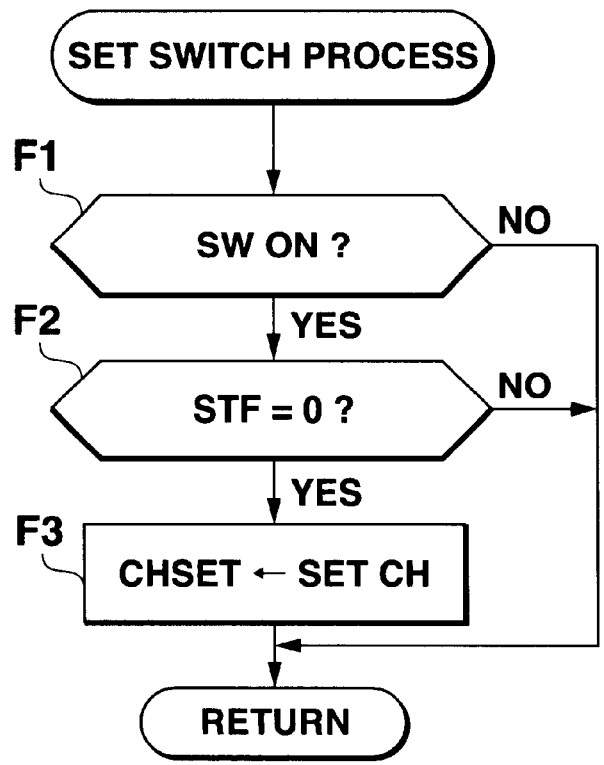
FIG. 33 is a flowchart of a set switch process in the flow of FIG. 29.

FIG. 33 shows a flow of the setting switch process (step B4) as a part of the switch process of FIG. 29. In this process, the CPU 11 sets a channel (for example, a melody channel) specified for guiding key depression. To this end, the CPU 11 determines whether the channel setting switch and the channel number switch have been turned on (step F1). If they have, the CPU 11 determines whether the STF is 0 (step F2). If it is, the CPU stores a number of a channel specified for guiding key depression in the channel setting register CH-SET (step F3). Then or if the switch is not turned on in step F1 or if the STF is 1 in step F2, the CPU 11 terminates this process and then returns its control to the switch process of FIG. 29.

Figure 34:
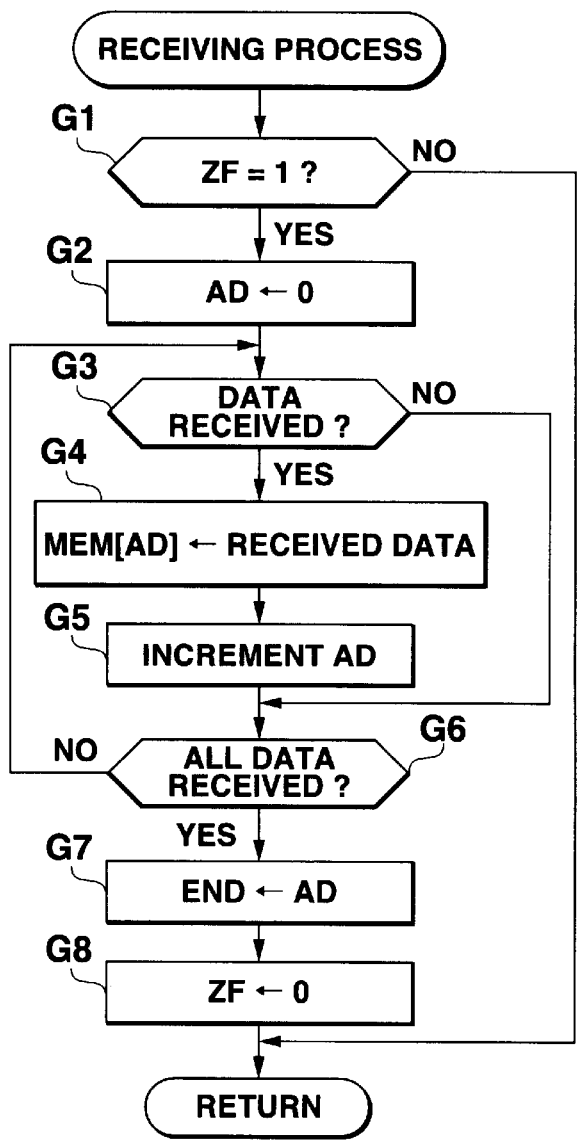
FIG. 34 is a flowchart of a reception switch process in the flow of FIG. 28.

FIG. 34 is a flowchart of the receiving process (step A3) of the main flow of FIG. 28. In this process, the CPU 11 determines whether the reception flag ZF is 1 (step G1). If the flag ZF is 0, the CPU 11 terminates this process. When the flag ZF is 1, the CPU 11 accesses to the server to request MIDI data, and sets the address AD of the storage area in the floppy disk for storing the melody data to 0 (head address) (step G2). The CPU 11 then determines whether the MIDI data has been received (step G3). If it has, the CPU 11 stores the received data at the address (step G4). The CPU 11 then increments the AD (step G5).

Then or when no MIDI data is received in step G3, the CPU 11 determines whether the reception has been completed (step G6). If otherwise, the CPU 11 shifts its control to step G3 to wait reception of MIDI data. Then, each time MIDI data is received, the CPU 11 stores the data at the address AD and then increments the AD. When the reception is terminated in step G6, the CPU 11 stores the value of the AD in the register END (step G7), resets the ZF to 0 (step G8), terminates the process and then returns its control to the main flow of FIG. 28.

Figure 35:
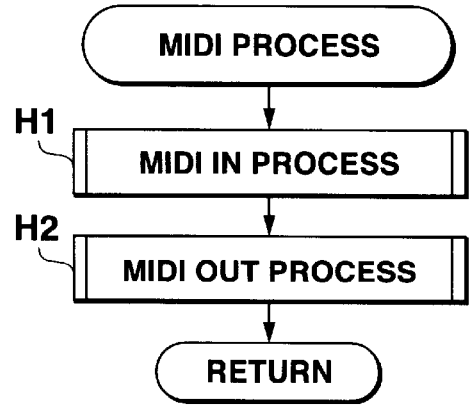
FIG. 35 is a flowchart of a MIDI process in the flow of FIG. 28.

FIG. 35 shows a flow of the MIDI process (step H4) as a part of the main flow. In this flow, a MIDI IN process (step H1) for inputting MIDI data and a MIDI OUT process (step H2) for outputting MIDI data are performed, and the control then returns to the main flow.

Figure 36:
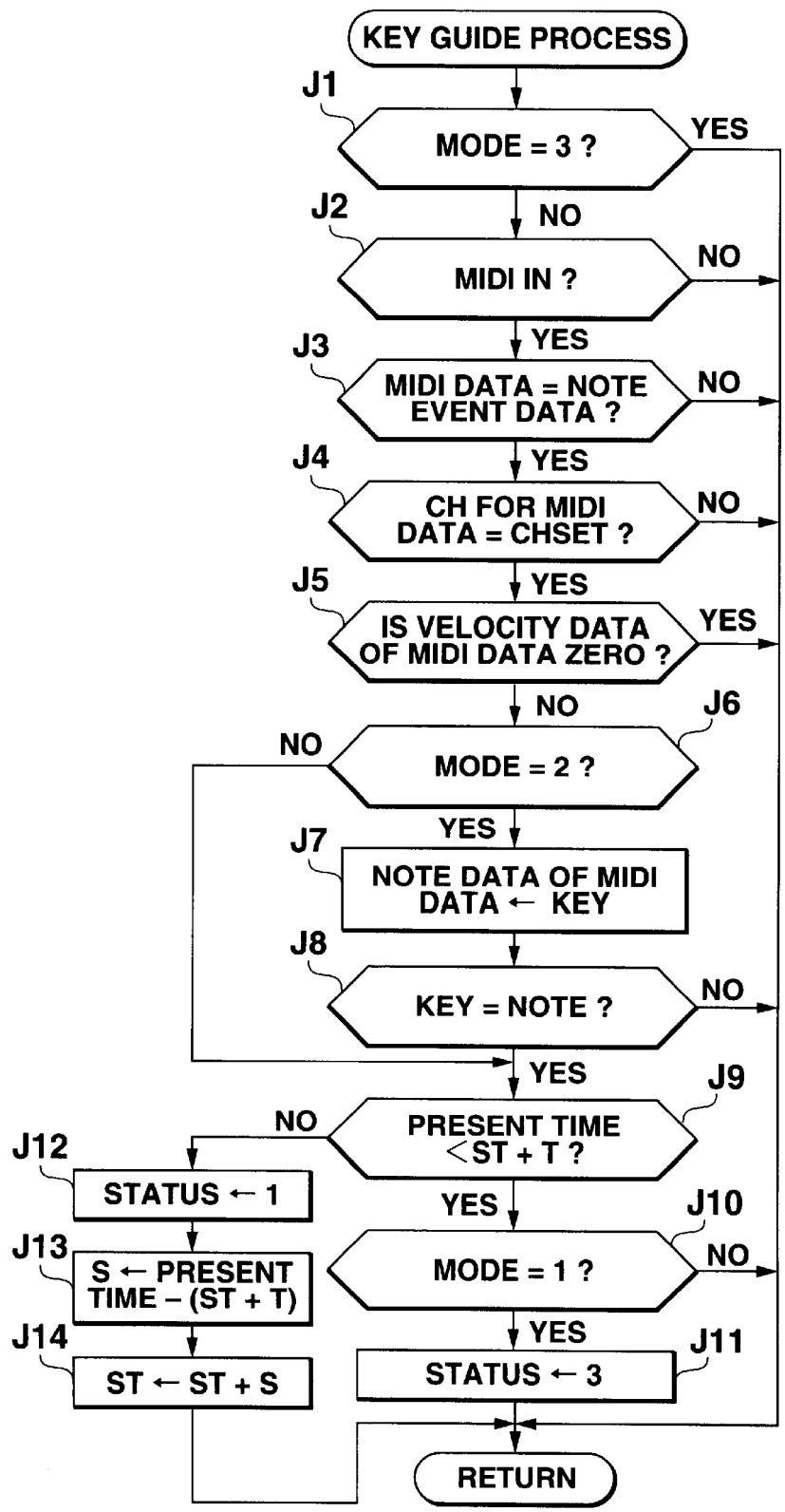
FIG. 36 is a flowchart of a MIDI IN process in the flow of FIG. 35.

FIG. 36 shows a flow of the MIDI IN process which receives MIDI data indicative of the result of operating the keyboard device corresponding to the MIDI data output to the keyboard device in a MIDI OUT process to be described later, and effects a process based on the input MIDI data and the set mode. First, the CPU 11 determines whether the mode is 3 (step J1). If it is, the CPU 11 automatically reads out melody data from the floppy disk irrespective of the result of operating the keyboard, so that the CPU 11 terminates this flow without effecting the MIDI IN process.

If the mode is not 3, the CPU 11 then determines whether MIDI data is input from the keyboard device (step J2). If it is, the CPU 11 determines whether the MIDI data is note-event data (step J3). If it is, the CPU 11 determines whether the channel for the MIDI data and the channel set in the register CHSET for guiding the key depression are the same (step J4).

If they are, the CPU 11 determines whether velocity data of the MIDI data is 0 (step J5). If otherwise, the CPU 11 determines whether the mode is 2 (step J6). If it is or if the mode is a performance mode for producing a musical sound when a correct key is depressed, the CPU 11 stores note data of the MIDI data in a key register KEY (step J7). The CPU 11 then determines whether the note data in the register KEY coincides with note data in the register NOTE for guiding the key depression (step J8) or whether a key which was displayed for depression has been depressed.

If note data in the register KEY is identical to the note data in the register NOTE or if the MODE is 1 in step J6, i.e., if the mode is the performance mode in which the next MIDI data is output even when any key is depressed, the CPU 11 determines whether the present time has reached the sum of the time data in the register ST and the time data in the register T (step J9), i.e., whether the present time has reached the timing of starting to produce a musical sound.

If otherwise, the CPU 11 determines whether the mode is 1 (step J10). If it is or when a key was depressed before the timing of starting to produce a corresponding musical sound has arrived, the CPU 11 sets the STATUS to 3 (step J11). In this state, the CPU 11 rapidly sends the MIDI data present between the time when the key was depressed and the timing of starting to produce the musical sound. After the STATUS is set to 3, the CPU 11 terminates this flow and returns its control to the flow of FIG. 35.

When the present time has reached the sum of the time data in the register ST and the time data in the register T or when the timing of starting to producing the musical sound has come, the CPU 11 sets the STATUS to 1 (step J12). Then, the CPU 11 subtracts the value of the sum of the time data in the register ST and the time data in the register T from the present time, and stores the time data indicative of the difference in the register S (step J13). The CPU 11 then adds the time data in the register S to the time data in the register ST (step J14) to update the time data in the register ST. Then, the CPU 11 terminates this flow and returns its control to the flow of FIG. 35.

If (1) the mode is not the MIDI IN mode in step J2, (2) the MIDI data is not note event data in step J3, (3) the channel for the MIDI data is different from the channel set in the CHSET for guiding the key depression in step J4, (4) velocity data of the MIDI data is 0 in step J5, (5) note data in the register KEY is different from that in the register NOTE in step J8, or (6) the register MODE is 2 in step J10, the CPU 11 terminates this flow and returns its control to the flow of FIG. 35.

Figure 37:
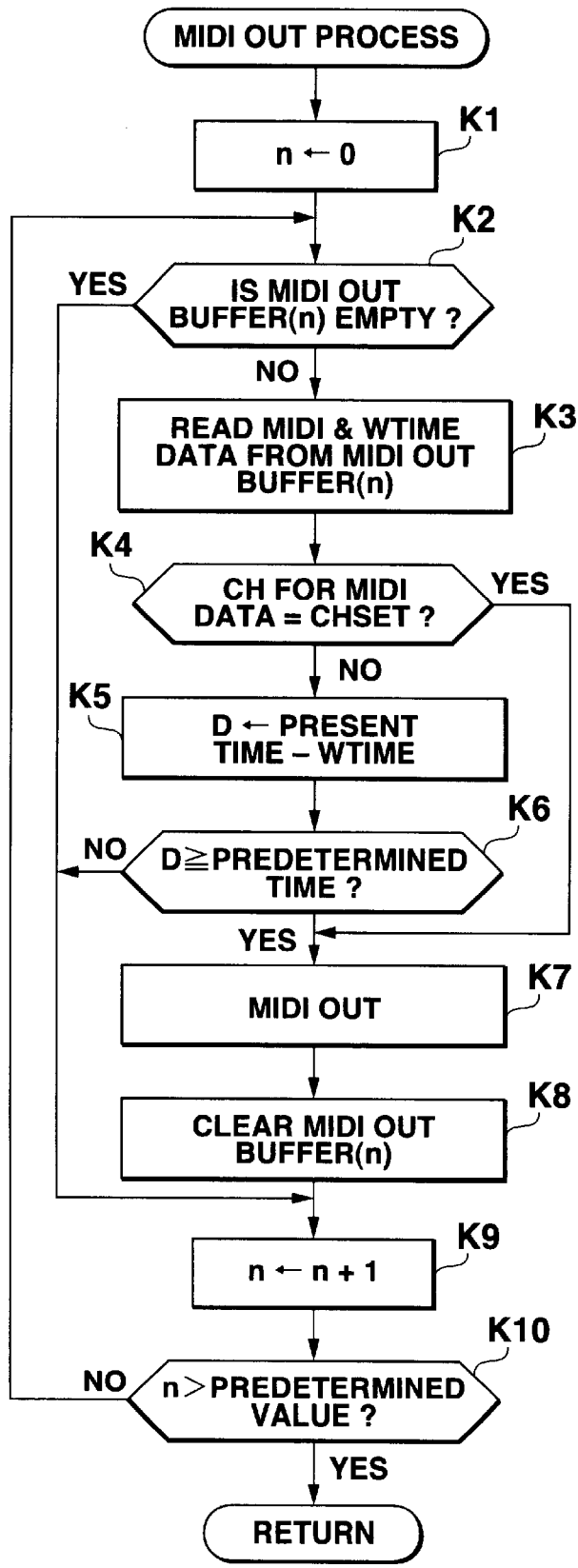
FIG. 37 is a flowchart of a MIDI OUT process in the flow of FIG. 35.

FIG. 37 shows a flow of the MIDI OUT process (step H2) as a part of the flow of FIG. 35. In this process, the CPU 11 sets to 0 the pointer n which specifies a MIDI OUT buffer area (step K1), then increments n while effecting the following looping process: The CPU 11 determines whether the MIDI OUT buffer area (n) is empty (step K2). If otherwise, the CPU 11 reads out MIDI data and WTIME time data from the MIDI OUT buffer area (n) (step K3).

Then, the CPU 11 determines whether the channel for the read MIDI data and the channel set in the register CHSET for guiding the key depression are the same (step K4). If otherwise, the CPU 11 subtracts the time data in the register WTIM from the present time, and stores time data indicative of the difference in the register D (step K5). Then, the CPU 11 determines whether the time data in the register D has reached a predetermined time (step K6).

If it has, the CPU 11 outputs the MIDI data to the keyboard device (step K7). If the channel for the read MIDI data and the channel set in the register CHSET for guiding the key depression are the same in step K4, the CPU 11 immediately outputs the MIDI data to the keyboard device. The predetermined time referred to in step K6 is a one required for causing an LED in a key of the keyboard device to emit light with the MIDI data in the channel for guiding the key depression before the timing of starting to produce a corresponding musical sound to thereby guide the key depression. Thus, the MIDI data in the channel for guiding the key depression is required to be output earlier by a predetermined time than the MIDI data in other channels.

Since the CPU 11 cannot originally output MIDI data in a particular channel earlier than actually, the MIDI data in the other channels are delayed by the predetermined time instead to thereby relatively earlier output the MIDI data in the channel for guiding the key depression in steps K4–K7. Thus, the timing of producing a musical sound in the channel for guiding the key depression is advantageously prevented from being delayed compared to the timings of producing musical sounds in the other channels.

After outputting the MIDI data in step K7, the CPU 11 clears an area of the MIDI OUT buffer area (n) (step KB), and then, increments n to specify the next MIDI OUT buffer area (step K9). If the area of the MIDI OUT buffer area (n) specified in step K2 is empty and no MIDI data is stored in the area or if a time represented by the time data in the register D has not reached the predetermined time in step K6, the CPU 11 increments n and then specifies the next MIDI OUT buffer area in step K9.

The CPU 11 then determines whether n has exceeded the predetermined value representing all the areas of the MIDI OUT buffer (step K10). If otherwise, the control passes to step K2, where the CPU 11 determines whether the MIDI OUT buffer area (n) is empty. As long as there is MIDI data in the MIDI OUT buffer area (n), the CPU 11 reads out the MIDI data, processes the MIDI data so as to be suitable for a channel for the MDI) data, and output the resulting data to the keyboard device. When n has exceeded the predetermined value, the CPU 11 terminates this flow and then returns its control to the flow of FIG. 35.

Figure 38:
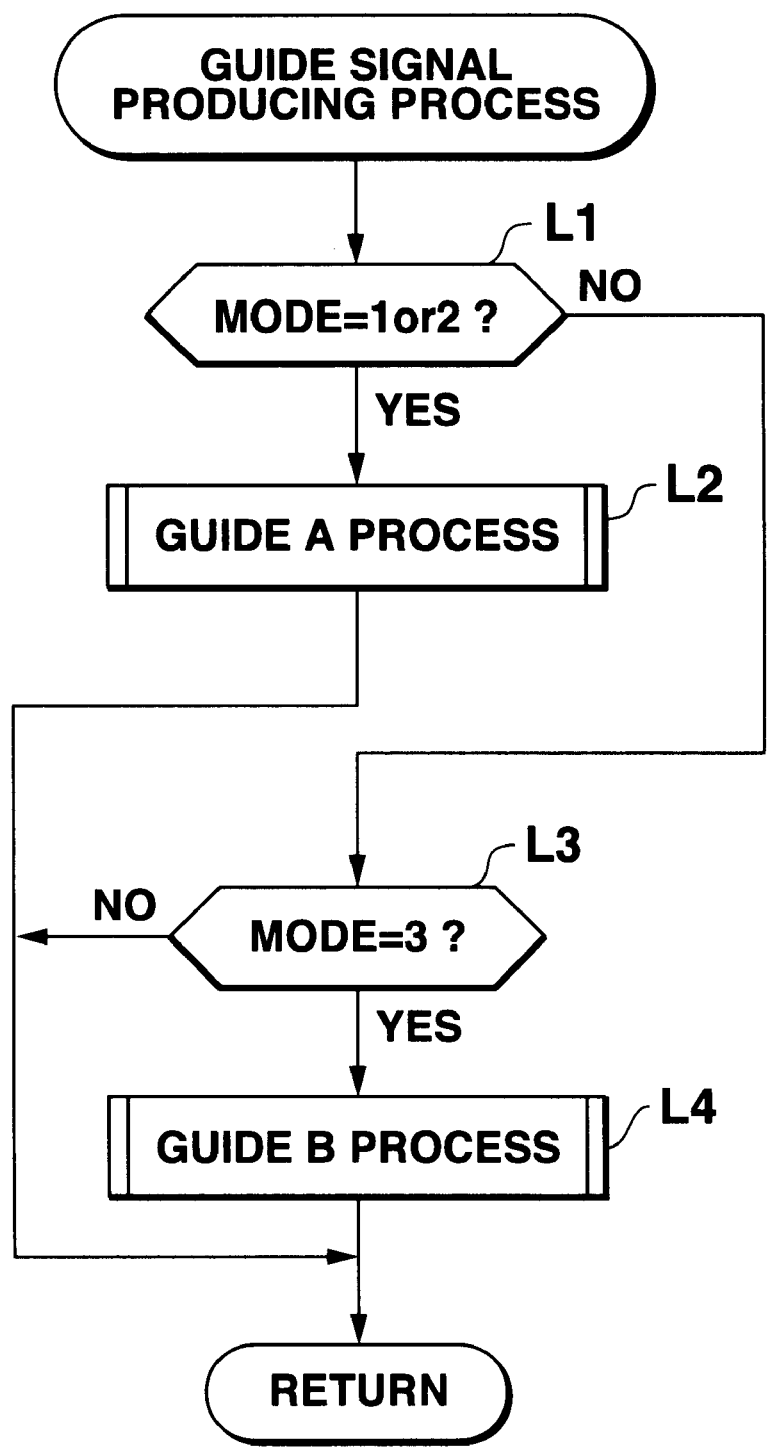
FIG. 38 is a flowchart of a guide signal producing process in the flow of FIG. 28.

FIG. 38 shows a flowchart of the guide signal producing process (step A5) as a part of the main flow of FIG. 28. In this process, the CPU 11 effects the key guiding process depending on a value of the mode register MODE. In this process, the CPU 11 determines whether the value of the mode register MODE is 1 or 2 (step L1). If it is, the CPU 11 executes a guide A process (step L2). If the value of the mode register MODE is neither 1 nor 2, the CPU 11 determines whether the value of the mode register MODE is 3 (step L3). If it is, the CPU 11 executes a guide B process (step L4). After the guide process A or B, the CPU 11 terminates this process and returns its control to the main flow of FIG. 28.

FIGS. 39–43 show a flowchart of the guide A process (step L2) of FIG. 38. In this process, the CPU 11 determines whether the start flag STF is 1 (step M1). If it is 0, which indicates that the performance is at a stop, the CPU 11 terminates this process. If the start flag STF is 1, which indicates starting the performance, the CPU 11 determines whether the value of the register STATUS is 2 (step M2).

When the value of the register STATUS is not 2 in step M2, the CPU 11 compares the present time and the sum of the time values in the registers ST and T or the timing when the musical sound is started to be produced (step M3). If the present time has not reached the timing when the musical sound is started to be produced, the CPU 11 then terminates this process and returns its control to the main flow of FIG. 28.

When the present time has reached the timing when the musical sound is started to be produced, the CPU 11 increments the value of the address register AD (step M4). Then, the CPU 11 determines whether the value of the address register AD is END (step M5). If otherwise, the CPU 11 determines whether MIDI data at the address AD is time data (step M6). If it is time data, the CPU 11 determines whether the value of the register STATUS is 3, which means that the timing when the key was depressed too early compared to the timing when a related musical sound starts to be produced (step M7).

If the value of the register STATUS is 3, the CPU 11 sets in the register ΔT a minimum time contained in the MIDI data (step M8). If the value of the register STATUS is 1, or if the timing when the key is depressed coincides with the timing when the musical sound starts to be produced, the CPU 11 sets proper time data (stored at the address AD) in the register ΔT (step M9). After step M8 or M9, the CPU 11 adds the value of the time register T to the value of the register ΔT, terminates this process and then returns its control to the key guiding process of FIG. 28.

When the MEM [AD] is END in step M5 which indicates the end of the melody data, the CPU 11 resets the start flag STF to 0 (step M11), terminates this process, and then returns its control to the main flow of FIG. 28.

Figure 40:
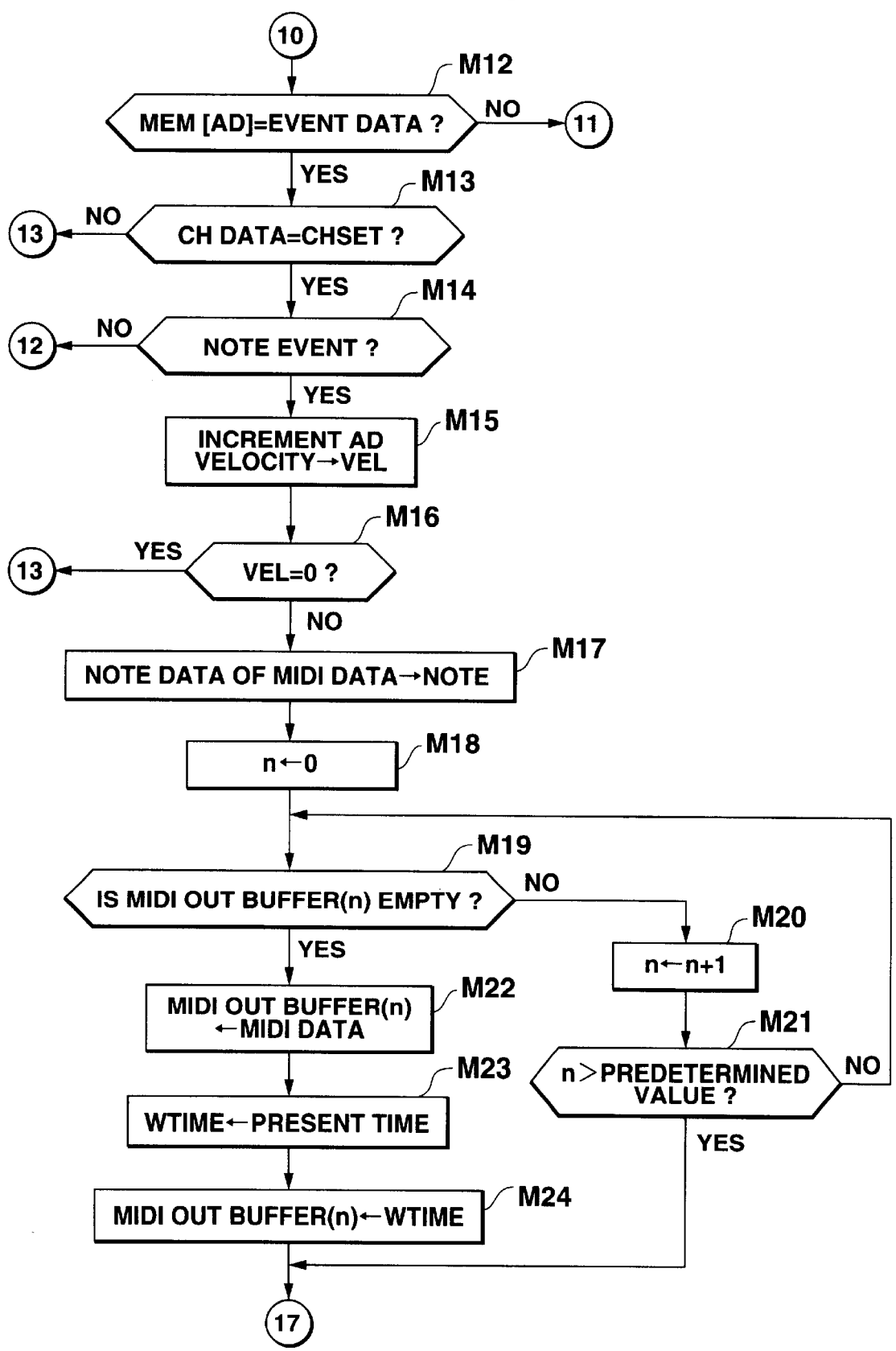
FIG. 40 is a flowchart of another parts of the guide A process continuing from FIG. 39.

When data at the address AD is not time data in step M6, the CPU 11 determines whether the MEM [AD] is event data in the flow of FIG. 40 (step M12). If it is, the CPU 11 determines whether the channel for the event data and the channel in the CHSET for key depression are the same (step M13). If they are, the CPU 11 determines whether the event data is note even data (step M14).

If it is, the CPU increments the address AD to store the velocity data in a register VEL (step MiS). Then, the CPU 11 determines whether the data in the register VEL is 0 (step M16). If otherwise, or when the note data is note-on data, the CPU 11 stores note data of the MIDI data in the register NOTE (M17). The CPU 11 then sets to 0 the pointer n for specifying a MIDI OUT buffer area (step M18), and then increments n while storing the MIDI data in the MIDI OUT buffer area (n). In this case, the CPU 11 determines whether the MIDI OUT buffer area (n) is empty (step M19). If otherwise, the CPU 11 increments n (step M20) and then determines whether n has exceeded a predetermined value (step M21). If otherwise, the CPU 11 searches for an empty MIDI OUT buffer area (n) in step M19.

If an empty MIDI OUT buffer area (n) is obtained, the CPU 11 stores the MIDI data in the empty MIDI OUT buffer area (n) (step M22). Then, the CPU 11 also stores the present time data in the register WTIME (step M23), and then the present time data (stored in the WTIME) in the MIDI OUT buffer area (n) (step M24). Then or when n has exceeded the predetermined value in step M21, the CPU 11 determines whether the STATUS is 3 in the flow of FIG. 41 (step M25). If the STATUS is 3, the CPU 11 changes the STATUS to 1 (step M26), and creates MIDI data representing a volume event based on the data in the registers CHSET and VOLUME (step M27).

Figure 41:
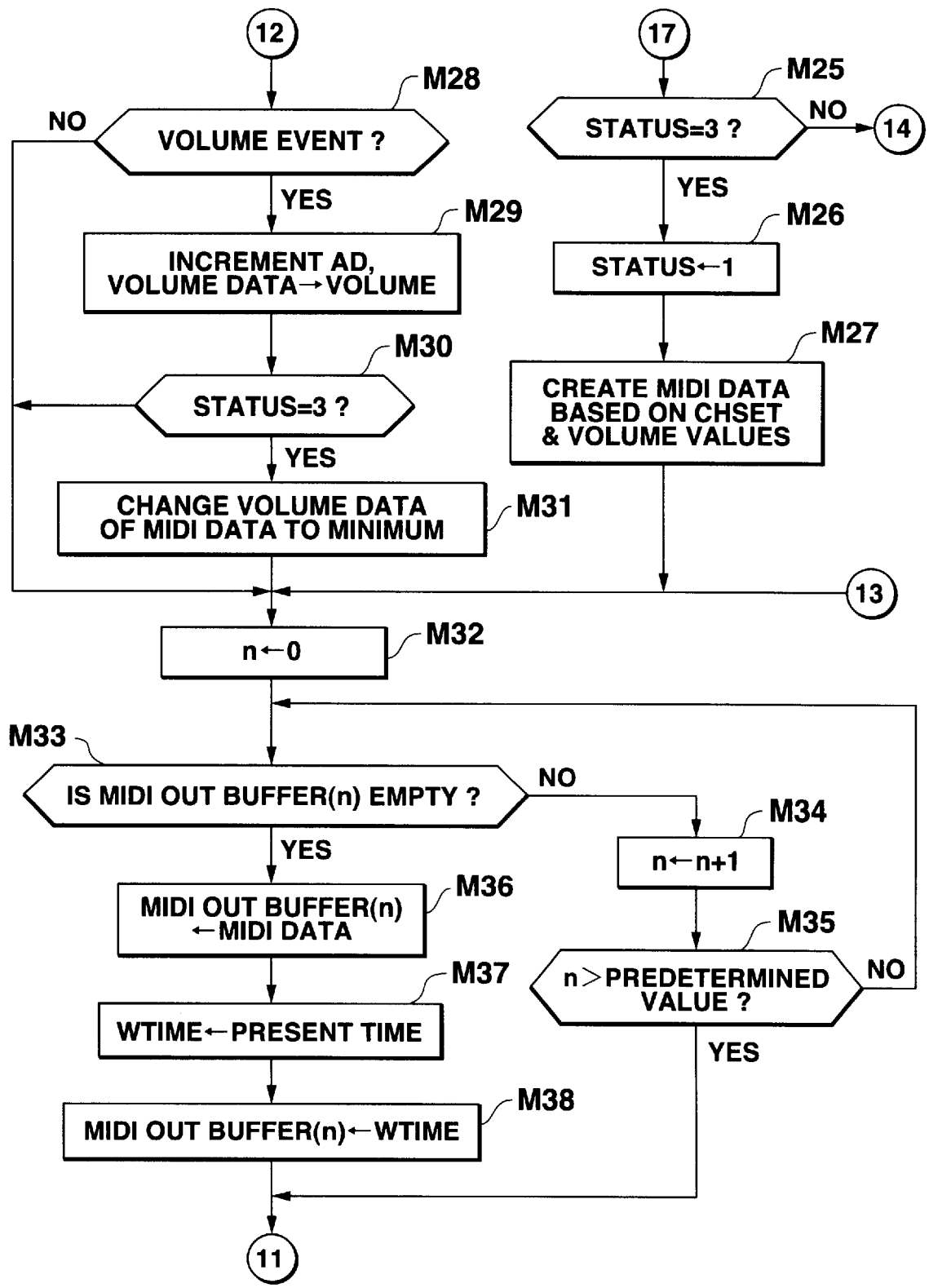
FIG. 41 is a flowchart of still another parts of the guide A process continuing from FIG. 40.

When the MIDI data is not note event data in step M14 of FIG. 40, the CPU 11 determines whether the MIDI data is volume event data in the flow of FIG. 41 (step M28). If it is, the CPU 11 increments the AD and stores the volume data in the register VOLUME (step M29). The CPU 11 then determines whether the STATUS is 3 (step M30). If it is and the MIDI data should be sent rapidly, the CPU 11 changes the volume value of the MIDI data to a minimum value (step M31) to thereby mute the musical sound during the rapid sending of the MIDI data.

After the volume value is changed to the minimum value in step M31 or after MIDI data of the volume event data is created in step M27 or if the MIDI data is not volume event data in step M28 or if the STATUS is not 3 in step M30 or if the channel for the MIDI data is not the channel for guiding the key depression in step M13 of FIG. 40 or if the MIDI data in the register VEL is 0, i.e., note-off event data in step M16, the CPU 11 sets to 0 n which specifies a MIDI OUT buffer area in step M32 of FIG. 41, and increments n while storing the MIDI data in the MIDI OUT buffer area (n).

The CPU 11 determines whether the MIDI OUT buffer area (n) is empty (step M33). If otherwise, the CPU 11 increment n (step M34) and then determines whether n has exceeded the predetermined value (step M35). If otherwise, the CPU 11 searches for an empty MIDI OUT buffer area (n) in step M33. If an empty MIDI OUT buffer area (n) is obtained, the CPU 11 stores the MIDI data in the empty MIDI OUT buffer area (n) (step M36). Then, the CPU 11 stores the present time data in the register WTIME (step M37) and then the present time data (stored in the WTIME) in the MIDI OUT buffer area (n) (step M38). The CPU 11 then shifts its control to step M4 of FIG. 39 to increment the AD.

Figure 42:
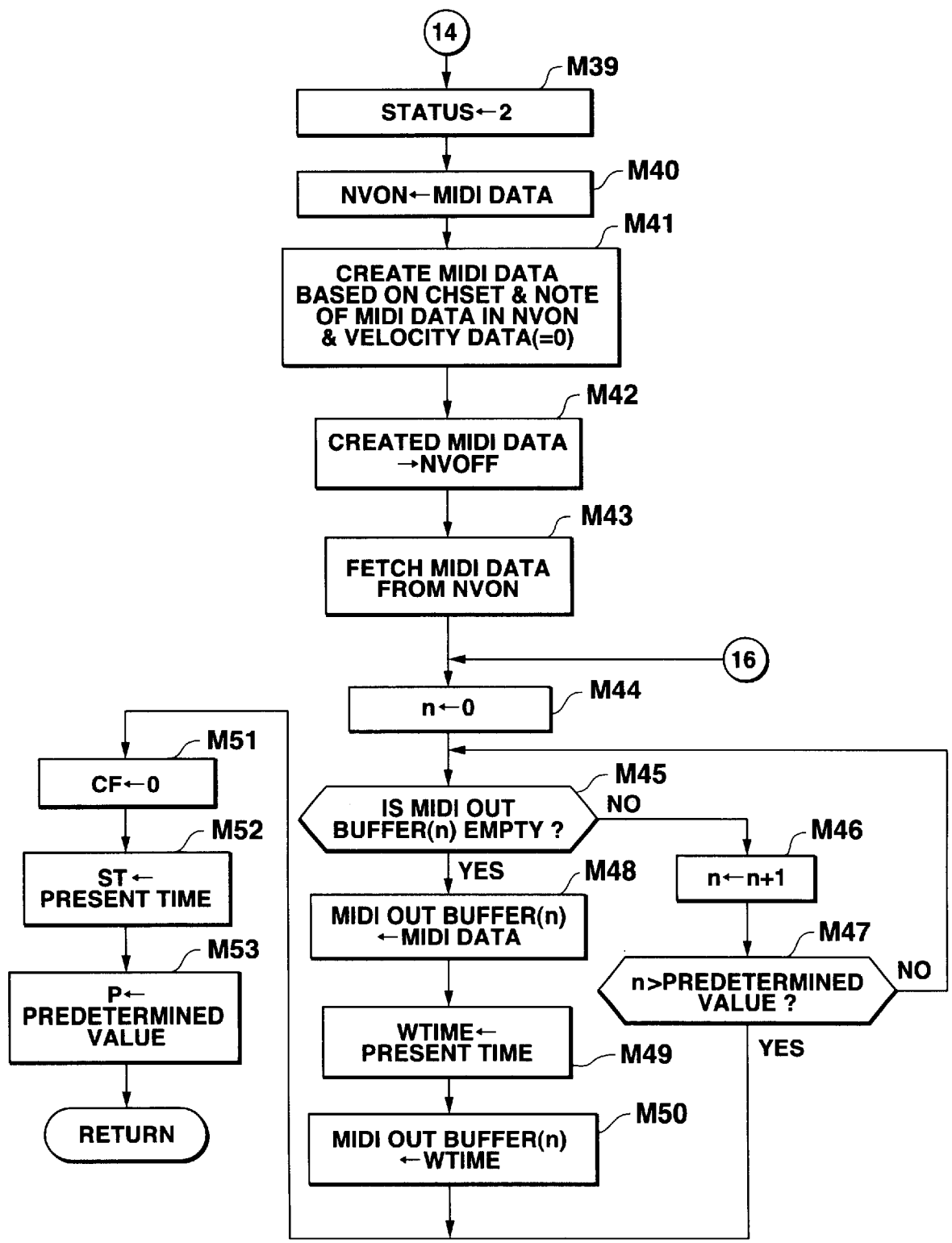
FIG. 42 is a flowchart of the remaining parts of the guide A process continuing from FIGS. 41 and 43.

When the value in the register STATUS is not 3 but 1 in step M25 of FIG. 41, the CPU 11 changes the value in the register STATUS to 2 in the flow of FIG. 42 (step M39). That is, after storing the MIDI data for guiding the key depression in the MIDI OUT buffer in step M22 of FIG. 40, the CPU 11 changes the STATUS from 1 to 2 to thereby shift its control to a state where the reading of the melody data is stopped until the key is depressed.

Then, the CPU 11 stores the MIDI data in a register NVON (step M40), and then creates MIDI data based on the CHSET and NOTE data of the MIDI data and its velocity data whose value is changed 0 (step M41). Then, the CPU 11 stores the obtained MIDI data in the register NVOFF (step JM42). Then, the CPU 11 fetches the MIDI data from the register NVON (step M43), sets to 0 the pointer n representing the MIDI OUT buffer area (step M44) and then increments n while performing the following looping process:

The CPU 11 then determines whether the MIDI OUT buffer area (n) is empty (step JM45). If otherwise, the CPU 11 increments n (step M46). It then determines whether n has exceeded the predetermined value (step M47). If otherwise, the CPU 11 searches for an empty MIDI OUT buffer area (n) in step M45. If an empty MIDI OUT buffer area (n) is obtained, the CPU 11 stores the MIDI data in the empty MIDI OUT buffer area (n) (step M48). Then, the CPU 11 stores the present time data in the register WTIME (step M49), and then the present time data in the WTIME in the MIDI OUT buffer area (n) (step M50).

Then or if n has exceed the predetermined value in step M47, the CPU 11 resets the flag CF to 0 (step M51), stores the present time in the register STP (step M52), and then a predetermined value in the register P (step M53). Then, the CPU 11 terminates this flow and returns its control to the main flow of FIG. 28.

Figure 39:
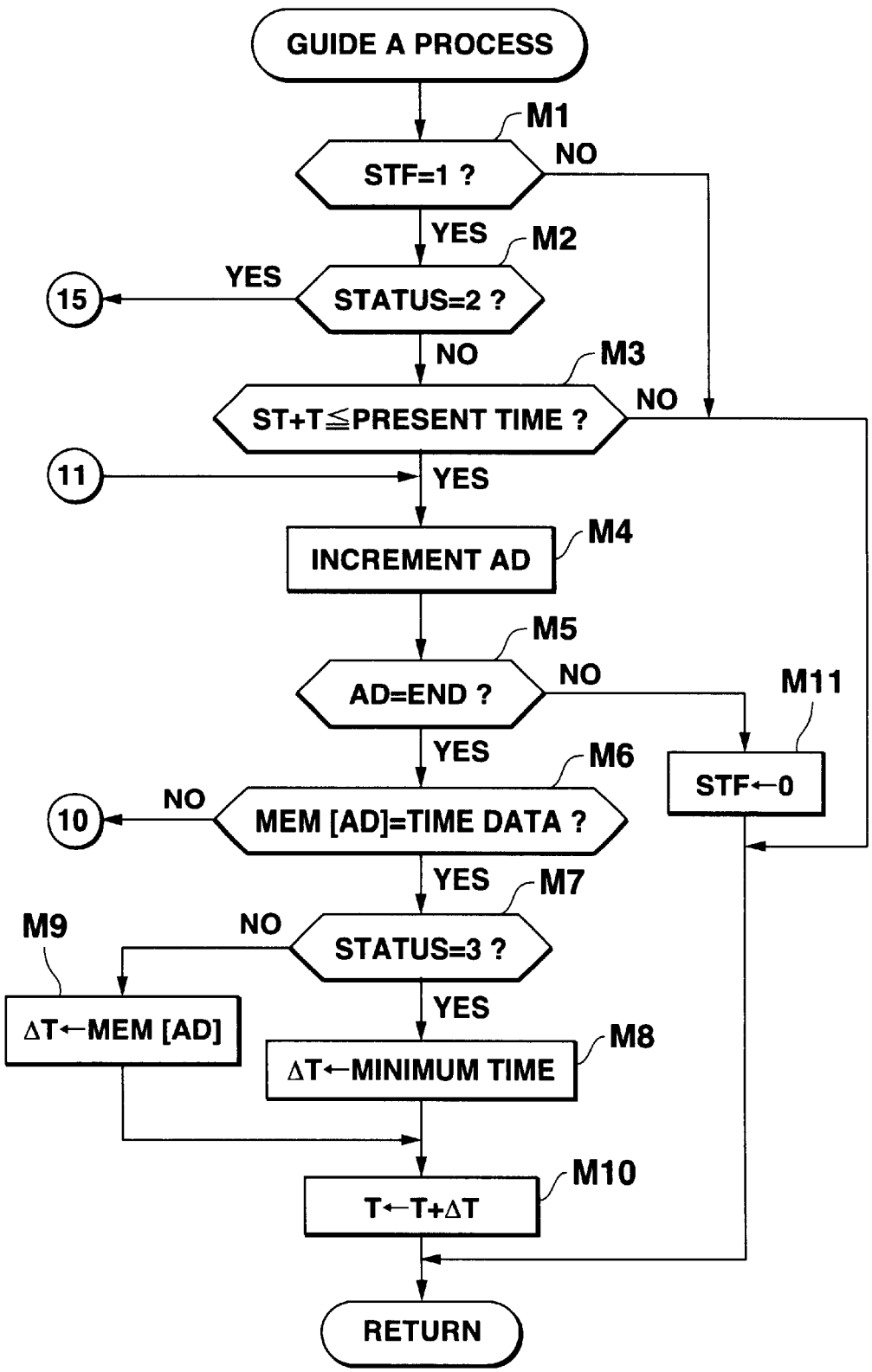
FIG. 39 is a flowchart of a part of a guide A process in the flow of FIG. 38.
Figure 43:
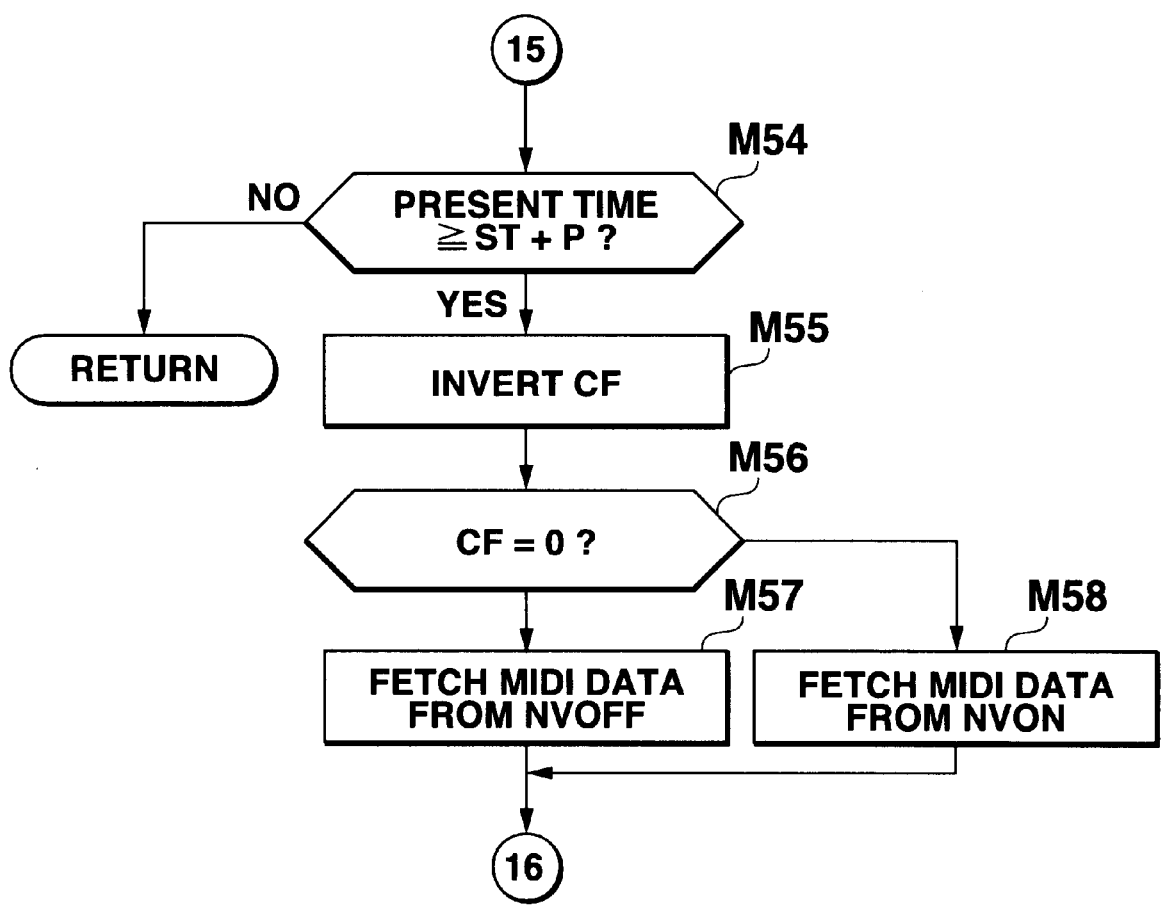
FIG. 43 is a flowchart of a part of the guide A process continuing from FIG. 39.

If the STATUS is 2 in step M2 of FIG. 39, which indicates that even when the timing of starting to produce a musical sound has elapsed, no keys of the keyboard are depressed, a LED in a key of the keyboard to be depressed is repeatedly turned on and off In this case, the CPU 11 determines whether the present time has reached the sum of the time data in the register STP and the time data in the register P in the flow of FIG. 43 (step M54). If otherwise, the CPU 11 terminates this flow. If the present time has reached the sum of those times, the CPU 11 inverts the value of the flag CF (step M55), and then determines whether the CF is 0 or 1 (step M56).

If the flag CF is 0, the CPU 11 fetches MIDI data whose velocity data is 0 from the register NVOFF (step M57). If the CF is 1, the CPU 11 fetches MIDI data whose velocity data is not 0 from the register NVON (step M58). After step M57 or 58, the control passes to step M44 of FIG. 42 to store the fetched MIDI data in an empty area of the MIDI OUT buffer.

That is, if the STATUS is 2 and no key is depressed at the keyboard even when the timing of starting to produce a proper musical sound based on the read event data has passed, the CPU 11 changes the musical-sound producing event data to musical-sound muting event data whose velocity is 0, stores it in the NVOFF, and each time the predetermined time in the P has passed, stores in the MIDI OUT buffer an alternate one of the musical-sound producing event data stored in the NVON and the musical-sound muting event data stored in the NVOFF.

Figure 44:
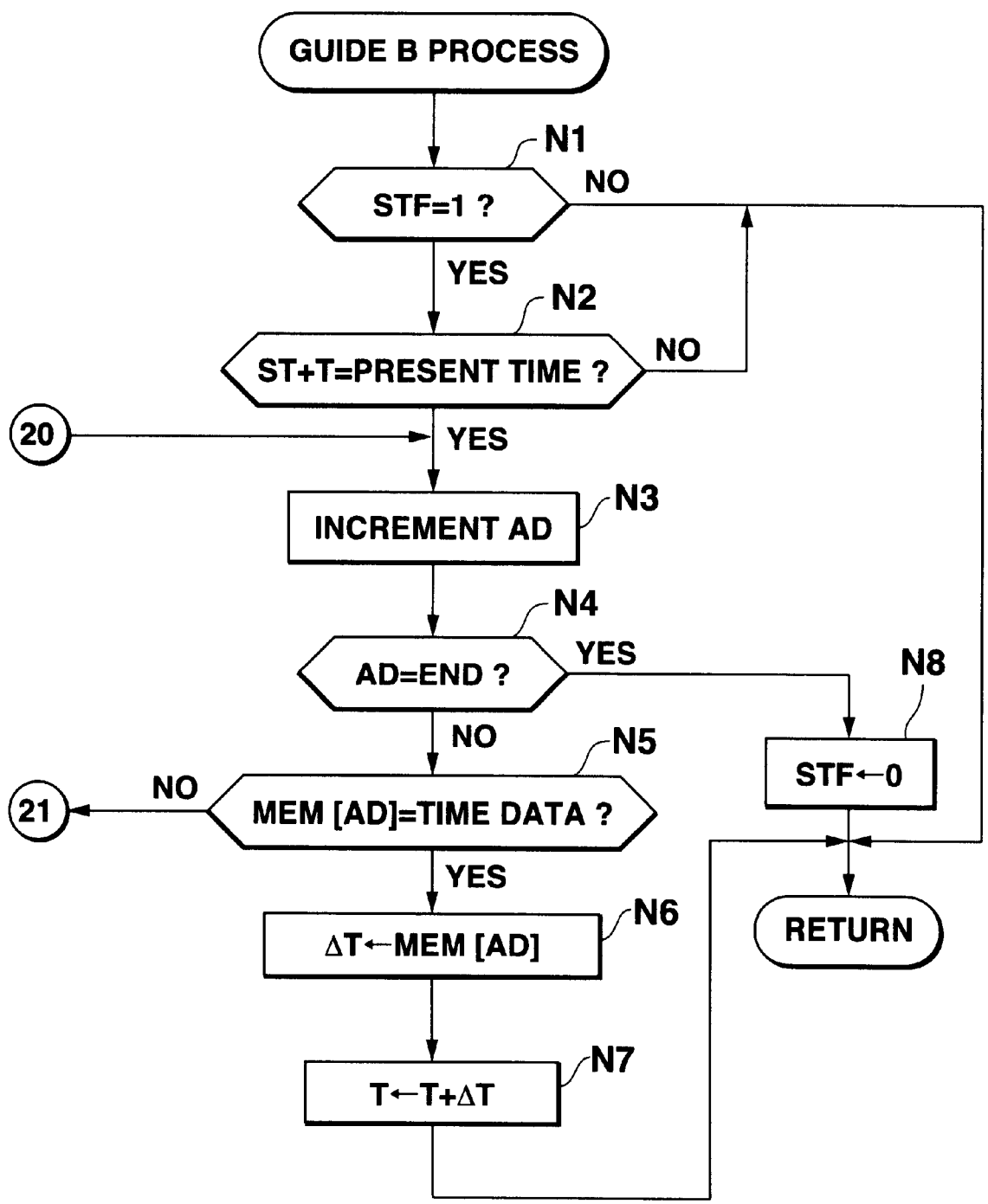
FIG. 44 is a flowchart of a part of a guide B process in the flow of FIG. 38.
Figure 45:
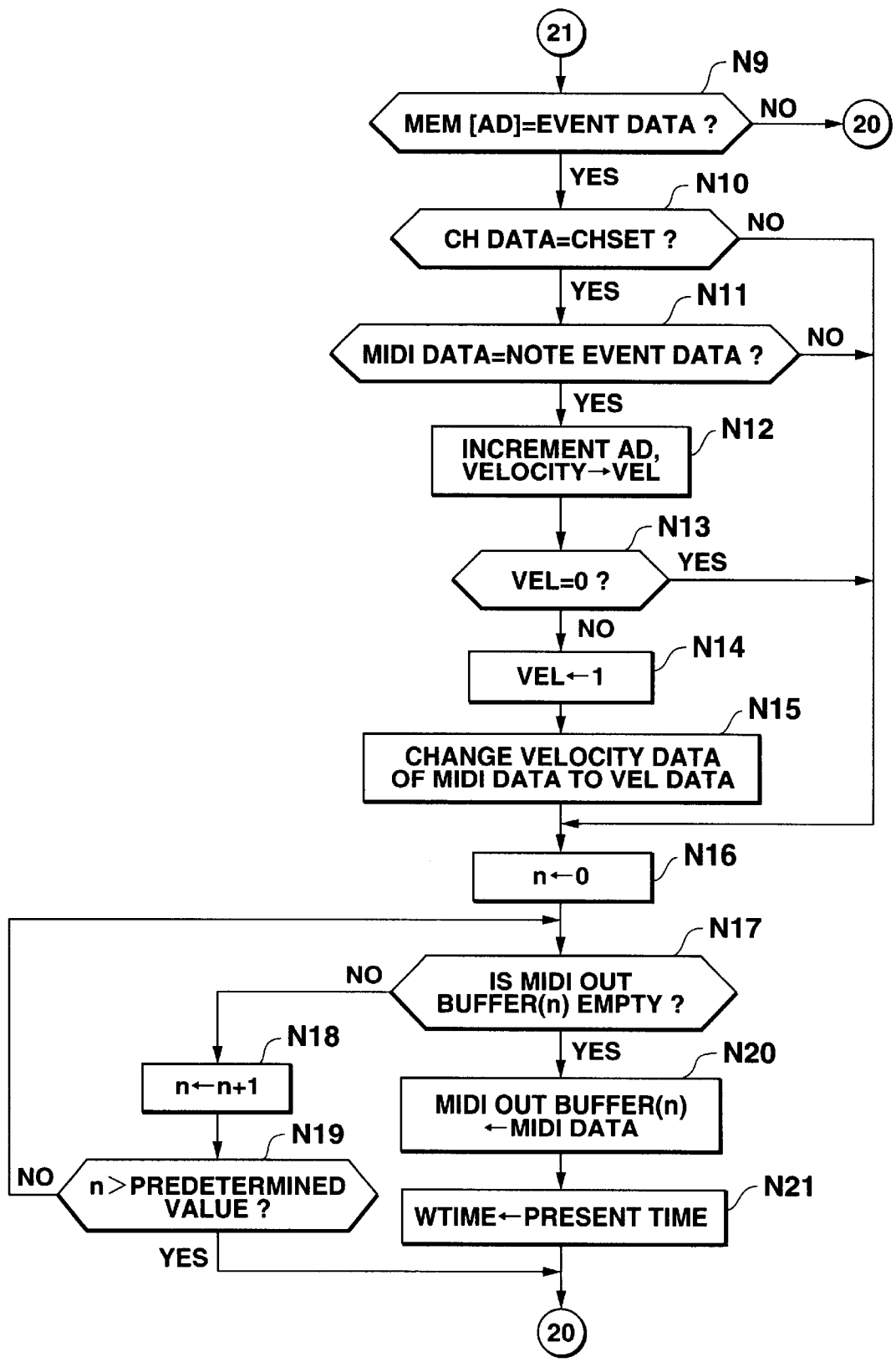
FIG. 45 is a flowchart of the remaining part of a guide B process continuing from FIG. 44.

FIGS. 44–45 together form a flowchart of the guide B process (step L4) as a part of the guiding signal creating process of FIG. 38. In this process, the CPU 11 determines whether the start flag STF is 1 (step Ni). If it is 0, which indicates a performance stop state, the CPU 11 terminates this process. If the flag STF is 1, the CPU 11 determines whether the present time coincides with the sum of the time values of the registers ST and T or the timing when a proper musical sound starts to be produced (step N2). If otherwise, the CPU 11 terminates this process.

When the present time coincides with the timing when the musical sound starts to be produced, the CPU 11 increments the value of the address register AD (step N3), and then determines whether the value of the address register AD is END (step N4). If otherwise, the CPU 11 determines whether MEM [AD] is time data (step N5). If it is time data, the CPU 11 sets the time data in the register A T (step N6). The CPU 11 then adds the value of the register ΔT to the value of the register T (step N7), terminates this process, and then returns its control to the key guiding process of FIG. 28. If the AD data is END in step N4, which indicates the termination of the melody data, the CPU 11 resets the flag STF to 0 (step N8), terminates this process and then returns its control to the main process.

If the MEM [AD] is not time data in step N5, the CPU 11 then determines whether the MEM [AD] is event data in the flow of FIG. 45 (step N9). If otherwise, the CPU 11 shifts its control to step L3 of FIG. 44 to increment the AD. If it is event data, the CPU 11 then determines whether the channel for the event data and the channel in the CHSET for key depression are the same (step N10). If they are, the CPU 11 then determines whether the event data is note event data (step N11).

If it is, the CPU 11 increments the AD and stores the velocity data in the register VEL (step N12). The CPU 11 then determines whether the velocity data in the VEL is 0 (step N13). If otherwise, the CPU changes the velocity data in the VEL to a minimum value "1" (step N14), and changes the value of the velocity data of the MIDI data to the value of the velocity data in the VEL (step N15). The CPU 11 then sets to 0 the pointer n for the MIDI OUT buffer (step N16), increments n while effecting the following looping process:

The CPU 11 then determines whether a MIDI OUT buffer area (n) is empty (step N17). If otherwise, the CPU 11 increments n (step N18), and then determines whether n has exceeded the predetermined value (step N19). If otherwise, the CPU 11 searches for an empty MIDI OUT buffer area (n) in step N17. If an empty MIDI OUT buffer area (n) is searched for, the CPU 11 stores the MIDI data in the MIDI OUT buffer area (n) (step N20). The CPU 11 then stores the present time data in the register WTIME (step N21). The CPU 11 then shifts its control to step N3 of FIG. 44 to increment the AD.

Figure 46:
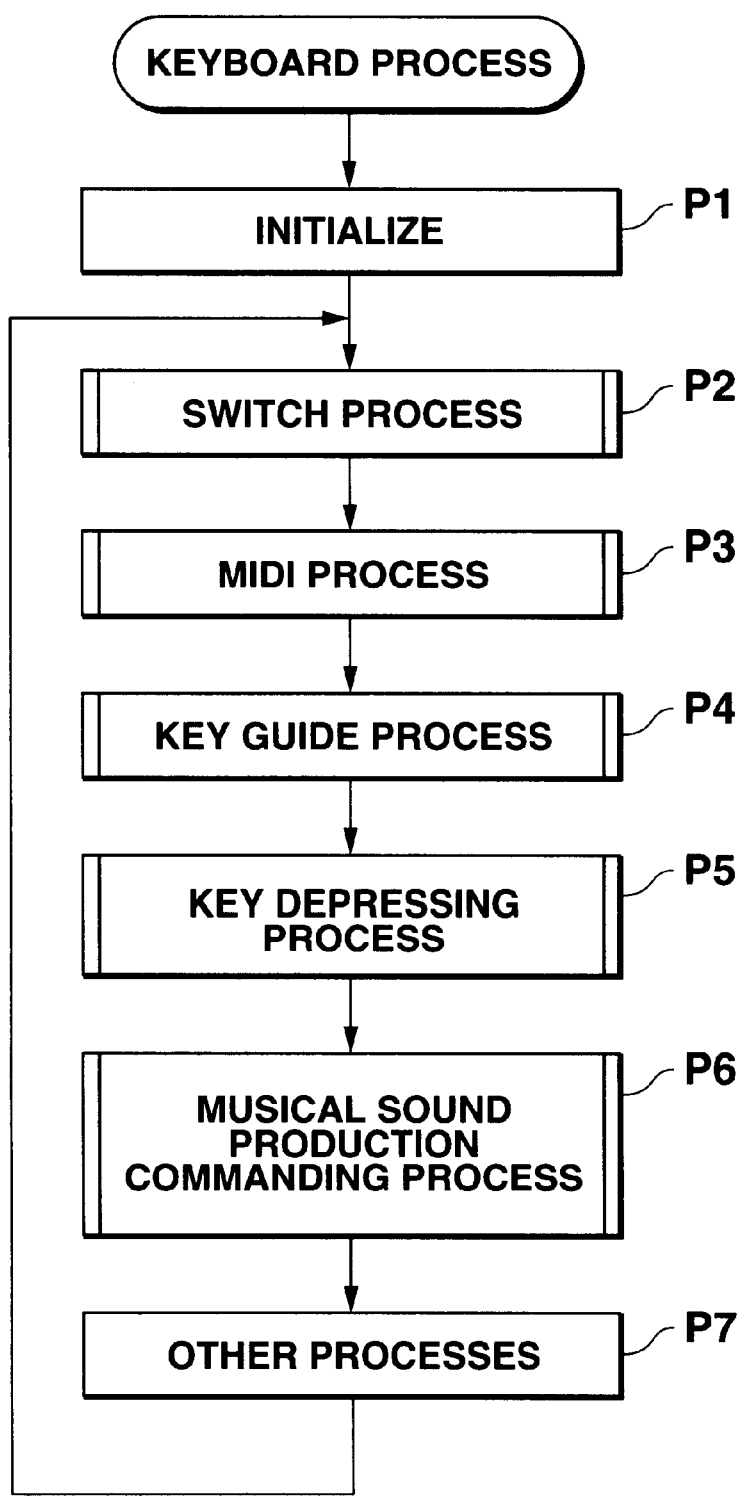
FIG. 46 is a flowchart of operation of a keyboard device of the second embodiment.

FIG. 46 shows a main flow of operation of the keyboard device (performance device 101). After a predetermined initializing process (step P1), a looping process which comprises repeating a switch process (step P2), a MIDI process (step P3), a key guide process (step P4), a key depressing process (step P5), a musical sound production commanding process (step P6) and other processes (step P7).

Figure 47:
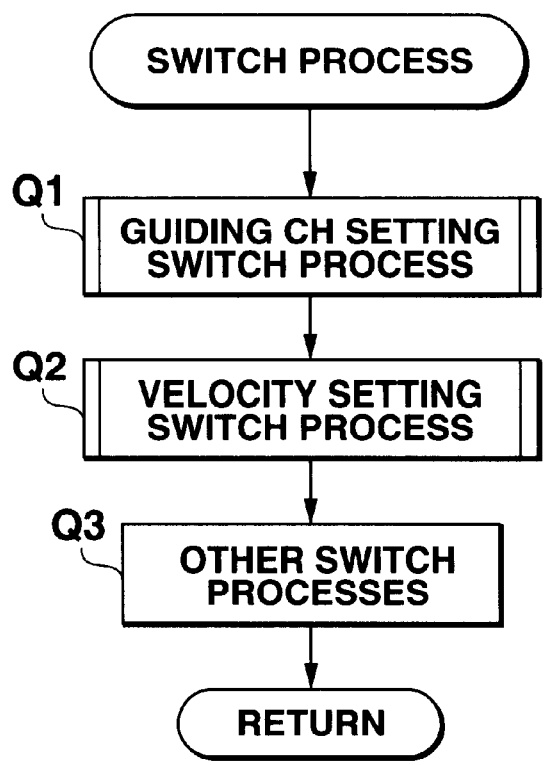
FIG. 47 is a flowchart of a switch process in the flow of FIG. 46.

FIG. 47 shows a flow of the switch process (step P2) as a part of the main flow of FIG. 46. In this process, a guide channel setting switch process (step Q1), a velocity setting switch process (step Q2), and another switch process (step Q3) are effected and the control returns to the main flow of FIG. 46.

Figure 48:
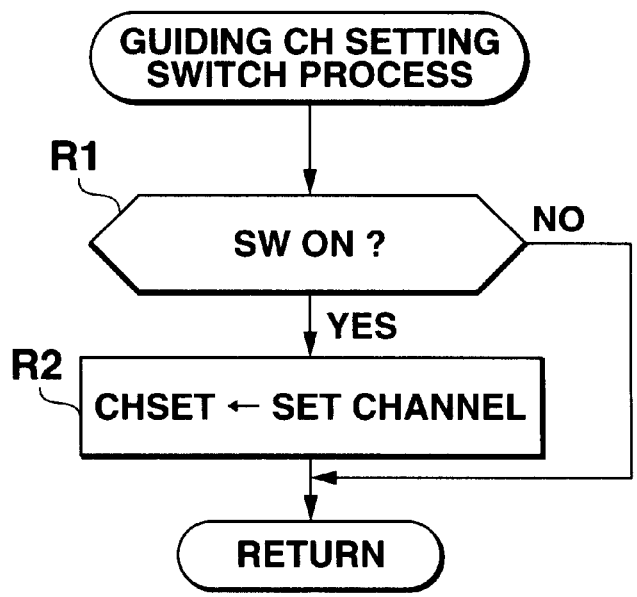
FIG. 48 is a flowchart of a guide channel setting switch process in the flow of FIG. 47.

FIG. 48 is a flow of the guide channel setting switch process (step Q1) as a part of the switch process of FIG. 47. The CPU 11 determines whether a guide channel setting switch and a channel number switch are turned on (step R1). If they are, the CPU 11 stores the channel number in a channel register CHSET (step R2). Then or if the switches are not turned on in step R1, the CPU 11 terminates this flow and then returns its control to the flow of FIG. 47.

Figure 49:
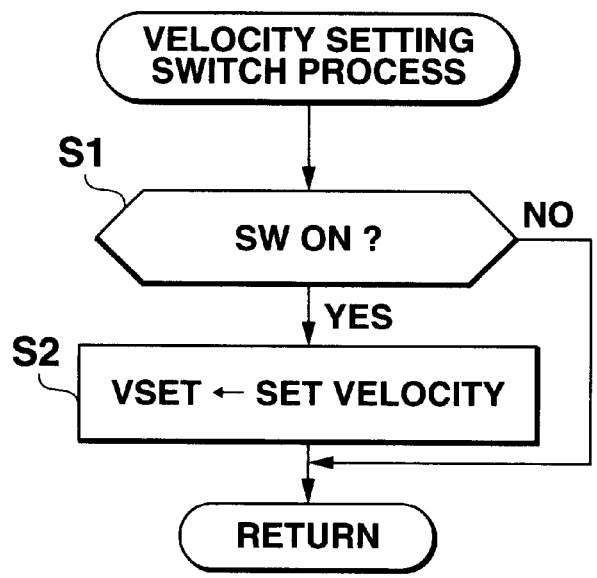
FIG. 49 is a flowchart of a velocity setting switch process in the flow of FIG. 47.

FIG. 49 shows a flow of the velocity setting switch process (step Q2) as a part of the switch process of FIG. 47. The CPU 11 determines whether a velocity setting switch and a velocity value switch are turned on (step S1). If they are, the CPU 11 stores data indicative of the velocity value in a register VSET (step S2). Then or if the switch is not turned on in step S1, the CPU 11 terminates this flow and then returns its control to the flow of FIG. 47.

Figure 50:
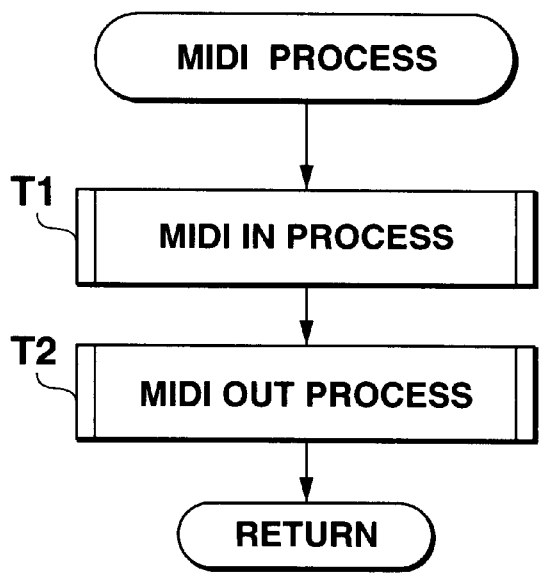
FIG. 50 is a flowchart of a MIDI process in the flow of FIG. 46.

FIG. 50 shows a flow of the MIDI process (step P3) in the main flow of FIG. 46. In this process, the keyboard communicates through the serial interface with the personal computer to effect a MIDI IN process for receiving MIDI data from the personal computer (step T1) and to effect a MIDI OUT process for transmitting to the personal computer MIDI data indicative of a result of the performance on the keyboard (step T2). The control then returns to the main flow.

Figure 51:
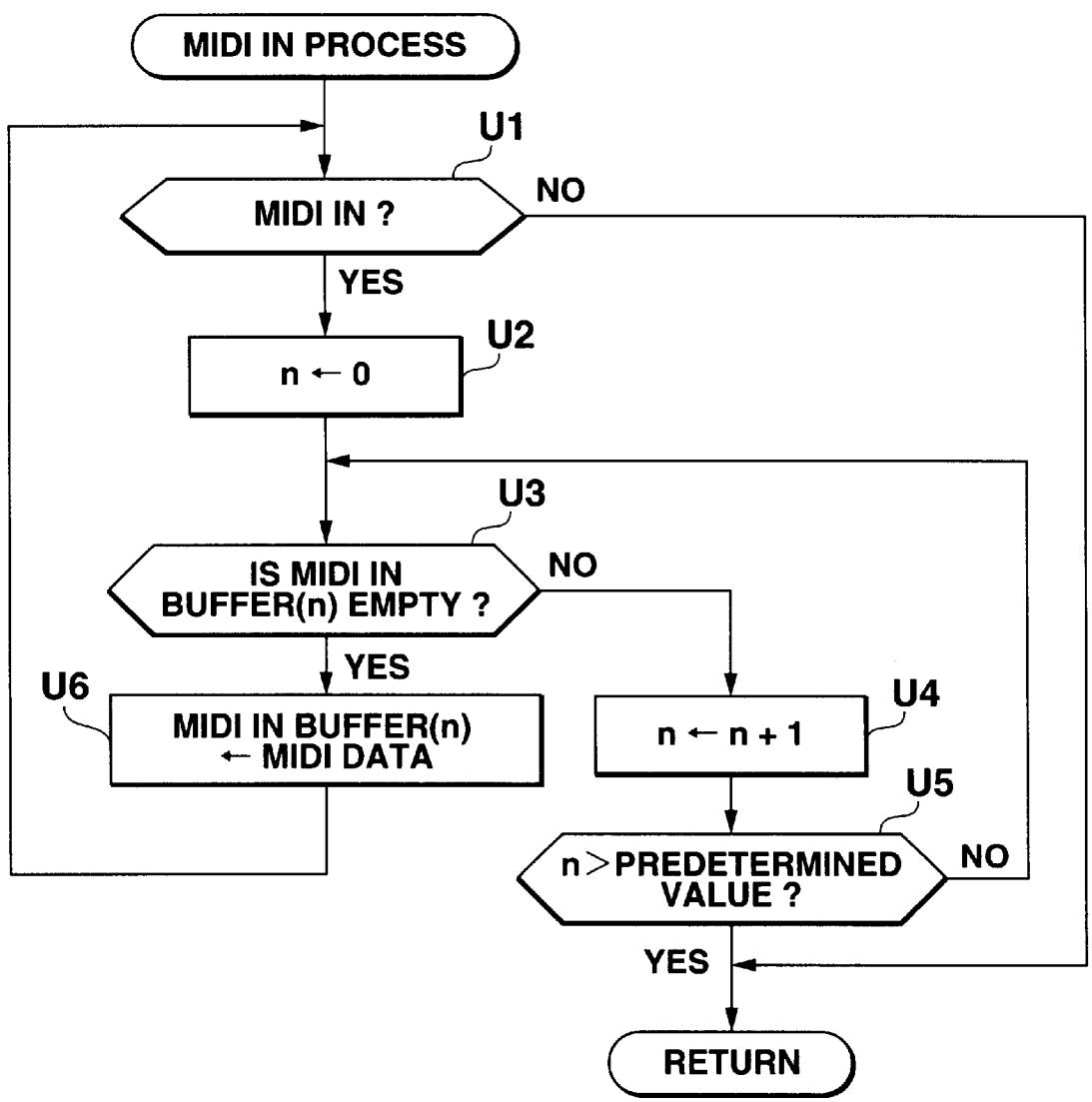
FIG. 51 is a flowchart of a MIDI IN process in the flow of FIG. 50.

FIG. 51 shows a flow of the MIDI IN process in step Ti of FIG. 50. In this process, the CPU 11 determines whether the mode is a MIDI IN mode (MIDI data reception) (step U1). If it is, the CPU 11 sets to 0 the pointer n which specifies a MIDI IN buffer area (step U2), and then increments n while effecting the following process:

The CPU 11 determines whether a MIDI IN buffer area (n) is empty (step U3). If otherwise, the CPU 11 increments n (step U4). Then, the CPU 11 determines whether n has exceeded a predetermined value which represents the number of areas of the MIDI IN buffer (step U5). If n is less than the predetermined value, the control passes to step U3 to search for an empty MIDI IN buffer area (n). If an empty AUDI IN buffer area is obtained, the CPU 11 stores the MIDI data (received in step U1) in the MIDI buffer area (n) (step U6). The control then passes to step U1 to determine whether the mode is the MIDI IN one. If it is, the CPU 11 repeats the above steps U2–U6. If otherwise or if n has exceeded the predetermined value in step U5, the CPU 11 terminates this flow and then returns its control to the flow of FIG. 50.

Figure 52:
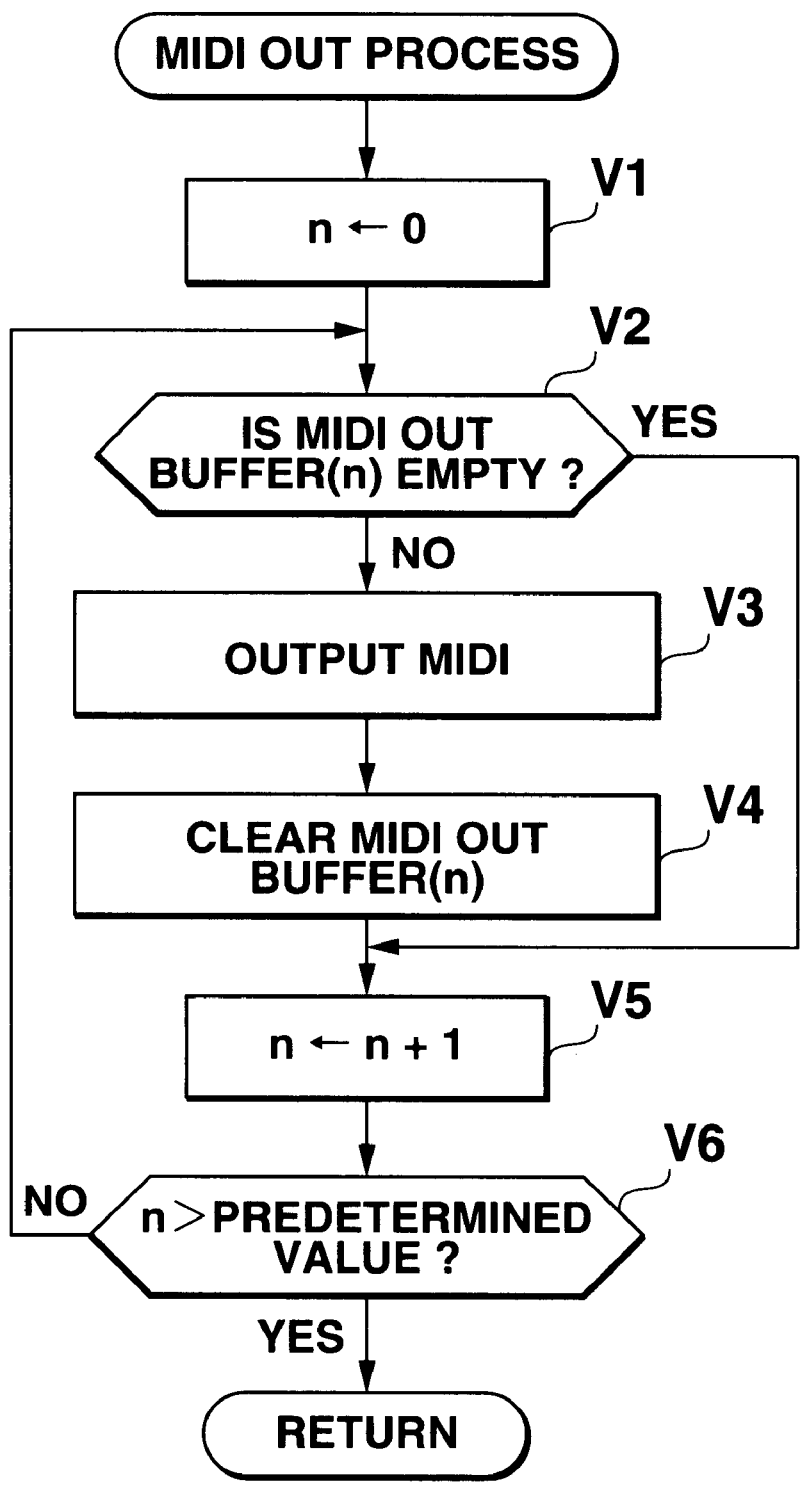
FIG. 52 is a flowchart of a MIDI OUT process in the flow of FIG. 50.

FIG. 52 shows a flow of the MIDI OUT process (step T2) as a part of the MIDI process of FIG. 50. In this process, the CPU 11 sets to 0 the pointer n which specifies a MIDI OUT buffer area (n) (step Vi), and increments n while effecting the following process: The CPU 11 determines whether a MIDI OUT buffer area (n) is empty (step V2). If otherwise, the CPU 11 outputs MIDI data in the MIDI OUT buffer area (n) to the personal computer (step V3), and then clears the area of the MIDI OUT buffer area (n) (step V4).

Then or if there is an empty MIDI OUT buffer area (n) in step V2, the CPU 11 increments n (step V5). The CPU 11 then determines whether n has exceeded the predetermined value, which represents the number of areas of the MIDI OUT, buffer (step V6). If otherwise, the CPU 11 determines in step V2 whether there is an empty MIDI OUT buffer area (n). If n has exceeded the predetermined value in step V6, the CPU 11 terminates this flow and returns its control to the main flow of FIG. 46.

Figure 53:
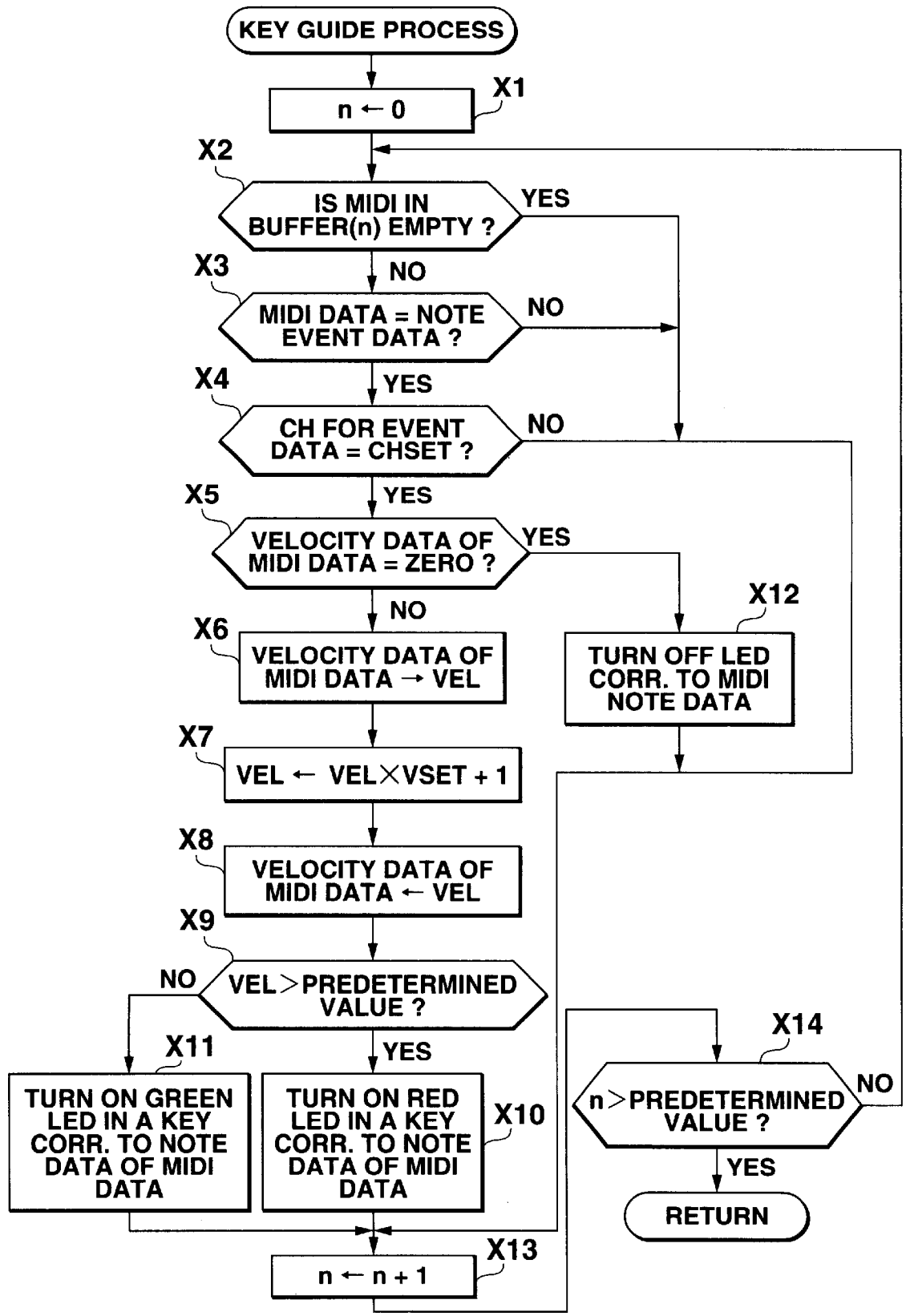
FIG. 53 is a flowchart of a key guide process in the flow of FIG. 46.

FIG. 53 shows a flow of the key guide process (step P4) as a part of the main flow of FIG. 46. In this process, the CPU 11 sets to 0 the pointer n which specifies a MIDI IN buffer area (n) (step X1) and then increments n while effecting the following process: The CPU 11 determines whether a MIDI IN buffer area (n) is empty (step X2). If otherwise, the CPU 11 determines whether the MIDI data in the MIDI IN buffer area (n) is note-event data (step X3). If it is, the CPU 11 determines whether a channel for the event data and a channel specified for guiding the key depression in the register CHSET are the same (step X4).

If they are, the CPU 11 then determines whether velocity data of the MIDI data is 0 (step X5). If otherwise, the CPU 11 stores the velocity data in the register VEL (step X6). Then, the CPU 11 multiplies the velocity data in the register VEL by the data in the register VSET and adds 1 to data representing the result of the multiplication (step X7). The data in the register VSET is set to a predetermined value by the user in the VEL setting switch process of FIG. 49 or to a default value. The user may by himself or herself add a minimum value "1" to the register VSET in order to avoid that the data in the VSET is set to 0 by mistake to become note-off event data.

The CPU 11 then changes the value of the velocity data of the MIDI data to the value of the data in the register VEL (step X8). The CPU 11 then determines whether the value of the data in the register VEL is larger than a predetermined value (step X9). If it is, the CPU 11 turns on a red light emitting LED in a key for the note data of the MIDI data (step X10). If the value of the data in the register VEL is less than the predetermined value, the CPU 11 turns on a green light emitting LED in a key for the note data of the MIDI data (step X1). If the value of the data in the register VEL is 0 in step X5, the CPU 11 turns off the LED in a key for the note data of the MIDI data (step X12).

After turning on the LED in step X10 or X11 or after turning off the LED in step X12, the CPU 11 increments n to specify the next area in the MIDI IN buffer. If the MIDI IN buffer area (n) is empty in step X2 or if the MIDI data is not note event data in step X3 or if a channel for the MIDI data is not a channel for guiding key depression in step X4, the CPU 11 increments n to specify the next area in the MIDI IN buffer.

The CPU 11 then determines whether n has exceeded the predetermined value, which represents the number of areas in the MIDI IN, buffer (step X14). If otherwise, the control passes to step X2 to repeat steps X2–X14. When n has exceeded the predetermined value, the CPU 11 terminates this flow and then returns its control to the main flow of FIG. 46.

Figure 54:
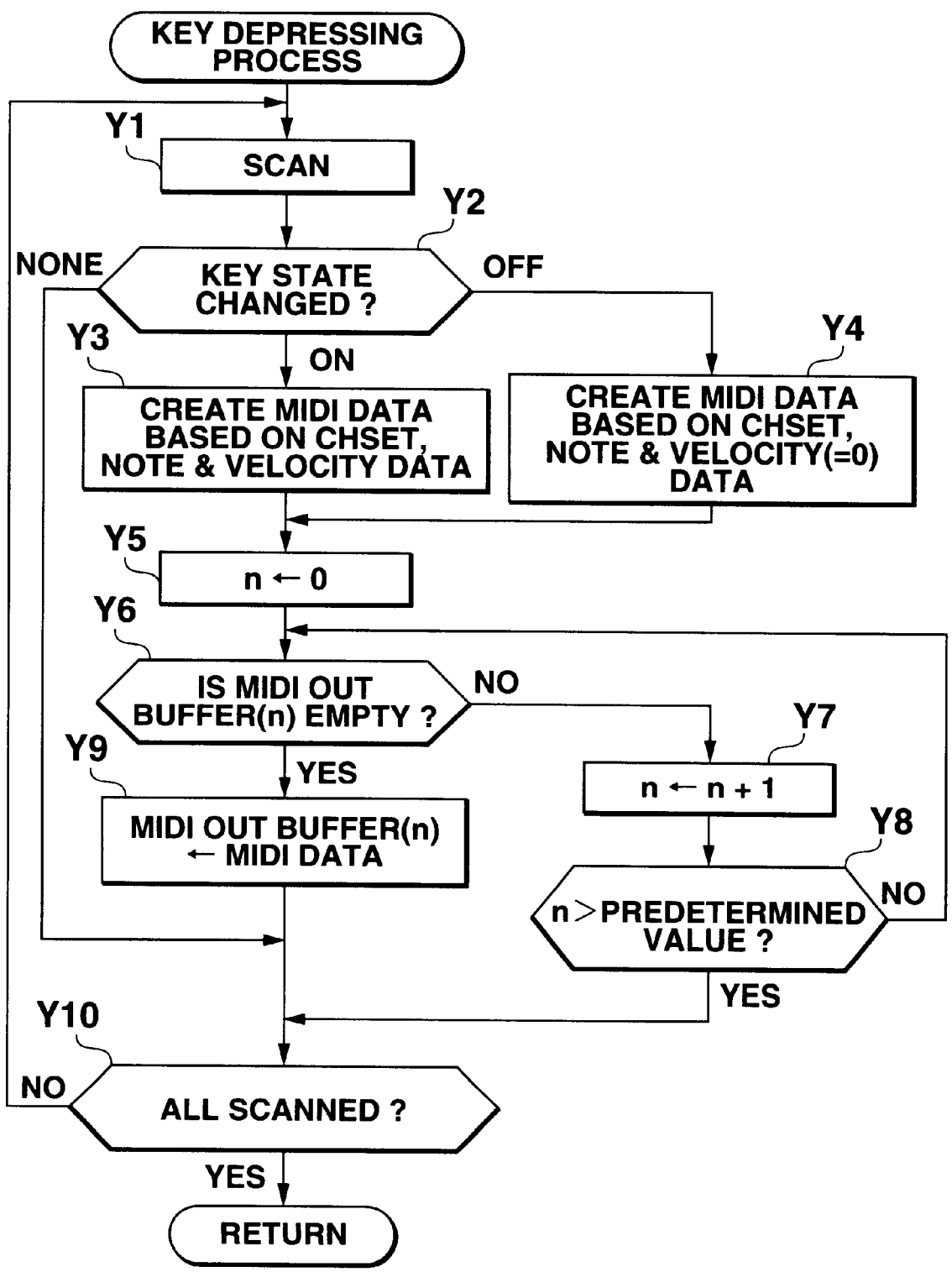
FIG. 54 is a flowchart of a key depression process in the flow of FIG. 46.

FIG. 54 shows a flow of the key depressing process (step P5) as a part of the main flow of FIG. 46. In this process, the CPU 11 scans the keyboard (step Y1), determines whether there is a change in the key status (step Y2), and if otherwise, returns its control to the main flow. If there is a change from key release to key depression or when a key is depressed, the CPU 11 creates MIDI data based on the CHSET data, note data for the key depression, and velocity data (step Y3). If the key status is changed from on to off or when the key is released, the CPU 11 creates MIDI data based on the CHSET data, note data for the key release, and velocity data whose value is 0 (step Y4).

After creating MIDI data in step Y3 or Y4, the CPU 11 sets to 0 n which specifies a MIDI OUT buffer area (n) (step Y5), and increments n while storing the MIDI data in the MIDI OUT buffer area (n). In this case, the CPU 11 determines whether the MIDI OUT buffer area (n) is empty (step Y6). If otherwise, the CPU 11 increments n (step Y7), and then determines whether n has exceeded the predetermined value (step Y8), and if otherwise, shifts its control to step Y6 to search for an empty MIDI OUT buffer area (n).

If an empty MIDI OUT buffer area (n) is obtained, the CPU 11 stores the MIDI data in the MIDI OUT buffer area (n) (step Y9). The CPU 11 then determines whether the scan has been completed (step Y10). If otherwise, the control passes to step Y1 to continue to scan the keyboard. When the scan has been completed, the CPU 11 terminates this flow and returns its control to the main flow of FIG. 46.

Figure 55:
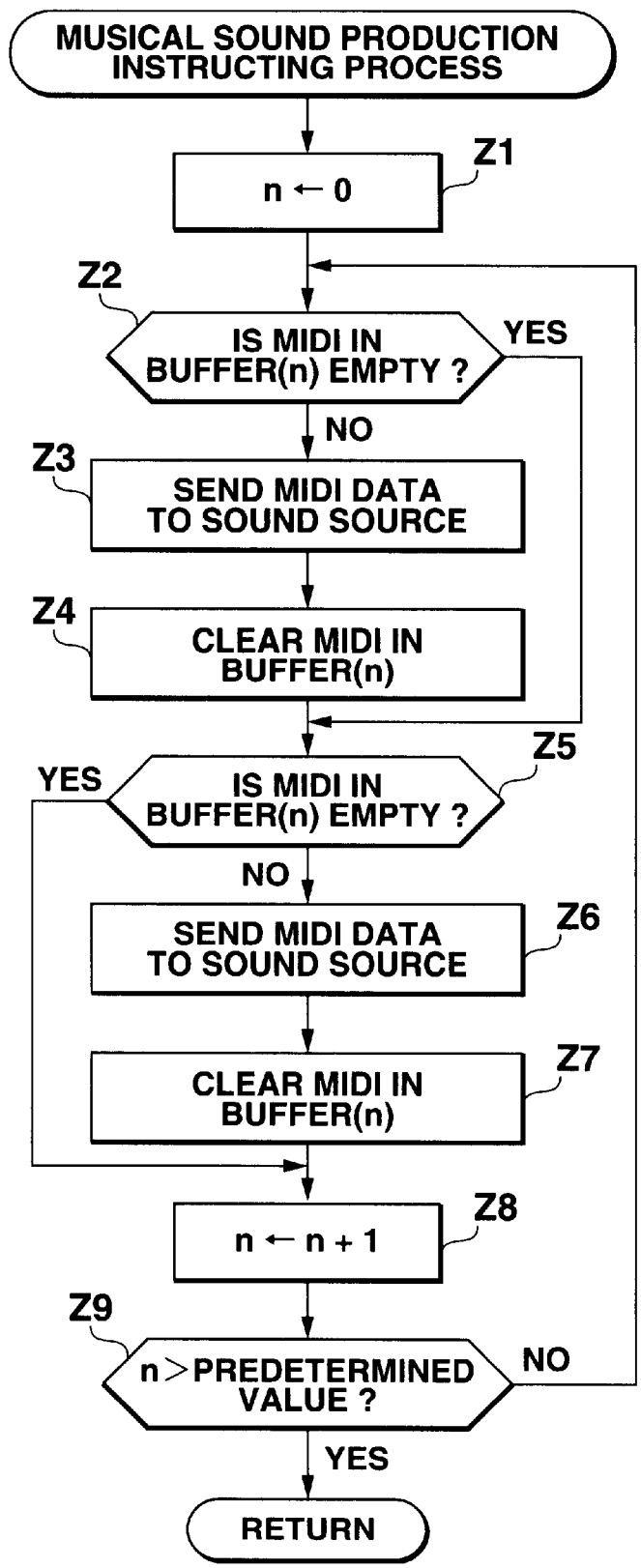
FIG. 55 is a flowchart of a musical sound production commanding process in the flow of FIG. 46.

FIG. 55 shows a flow of the musical-sound production commanding process (step P6) as a part of the main flow of FIG. 46. In this process, the CPU 11 sets to 0 a pointer n which specifies a respective one of the MIDI IN buffer areas (n) and a pointer n which specifies a respective one of the MIDI OUT buffer areas (n)(step Z1), and then increments n while sending the sound source MIDI data in a MIDI IN buffer area for a channel other than the channel for guiding key depression, and MIDI data representing a result of operation of the channel in the MIDI OUT buffer area for guiding key depression.

In this case, the CPU 11 determines whether a MIDI IN buffer area (n) is empty (step Z2). If otherwise, the CPU 11 sends the MIDI data in the buffer area (n) to the sound source (step Z3), and then clears the MIDI IN buffer area (n) (step Z4). Then or when the MIDI IN buffer area (n) is empty in step Z2, the CPU 11 determines whether a MIDI OUT buffer area (n) is empty (step Z5). If otherwise, the CPU 11 sends the MIDI data in the MIDI OUT buffer area (n) to the sound source (step Z6),and then clears the MIDI OUT buffer area (n) (step Z7).

Then or when the area of the MIDI OUT buffer area (n) is empty in step Z5, the CPU 11 increments n (step Z8). The CPU 11 then determines whether n has exceeded the predetermined value (step Z9). If otherwise, the control passes to step Z2 to repeat the steps Z2–Z9 to send the MIDI data to the sound source. If n has exceeded the predetermined value, the CPU 11 terminates this flow and returns its control to the main flow of FIG. 46.

As described above, in the performance training apparatus of the second embodiment, the personal computer 104 and the FD player 103 constitute data reading means for reading event data from the floppy disk 2, and sends the read musical sound producing or muting event data to the keyboard device 101, which composes signal generating means for generating a signal which turns on or off the LED 20 depending on the musical-sound producing or muting event data.

The personal computer 104 also constitutes data changing means which changes the musical-sound producing event data to musical-sound muting event data. The personal computer 104 also constitutes light emitting control means in which when no information is received which represents that no proper key is depressed is received even when the timing of starting to produce a musical sound based on the musical-sound producing event data sent to the keyboard device 101 has passed, the musical-sound producing event data and the musical-sound muting event data to which the musical-sound producing event data is changed are alternately sent to the keyboard 101 to thereby turn on/off the corresponding LED 20 of the keyboard device 101.

Thus, when the keyboard device having the navigation function of guiding the performance is controlled, teaching the timing of key depression corresponding to the timing of starting to produce a musical sound is easily realized without editing the melody data concerned.

Also, in this case the personal computer 104 constitutes communication control means which connects through the telecommunication line (network 4) to the melody data server 5 as the external device to receive melody data from the melody data server 5. Thus, even when melody data received from the external device through the telecommunication line cannot be edited, teaching the timing of key depression corresponding to the timing of starting to produce a musical sound is realized.

Since the LEDs 20 each provided in a respective one of the keys of the keyboard device 101 emit light in red and green, the personal computer 104 determines whether velocity data of the event data read out from the floppy disk 2 is higher than the predetermined value, and causes a corresponding one of the LEDs 20 of the keyboard 101 to emit light whose color depends on the result of the determination. Thus, the timing of key depression as well as the intensity of the key depression are taught.

While in the first and second embodiments the performance training apparatus which executes the performance training program stored in the memory (for example, ROW) has been described, the performance training programs shown by the flowcharts of operation of the respective embodiments may be stored in a recording medium such as a floppy disk or a CD, read out from the recording medium and executed.

For example, the performance training program may be stored beforehand in the floppy disk 2 which stores melody data performed by the keyboard device 1 of the first embodiment, read out by the keyboard 1 and then executed. In the second embodiment, the performance training program may be beforehand stored in the floppy disk 2 which stores melody data, and read out and executed by the FD player 103 or the personal computer 104.

What is claimed is:

1. A performance training apparatus comprising:
   a plurality of operation elements for performance each operated for specifying a different pitch;
   a plurality of light emitting means each provided for a respective one of said plurality of operation elements;
   melody data feeding means for sequentially feeding a plurality of items of event data each comprising a melody part and a note-on/off command for production/muting of a musical sound of a pitch;

delay means for delaying all the plurality of items of event data fed by said melody data feeding means excluding one of the plurality of items of event data including a particular melody part by a predetermined time compared to the item of event data including the particular part;

light emission control means for controlling the turning on/off of a one of said plurality of light emitting means provided for that of said plurality of operation elements which specifies the same pitch as the event data including the particular melody part fed by said melody data feeding means does, in accordance with the production/muting of the musical sound based on the item of event data including the particular melody part;

event data producing means for producing an item of event data including the particular melody part for performance which commands the production and muting of the musical sound of the pitch based on operation of the operation element; and output means for outputting the item of event data including the particular melody part produced by said event data producing means and all the plurality of items of event data delayed by the predetermined time by said delay means excluding the item of event data including the particular melody part.

2. The performance training apparatus according to claim 1, wherein said delay means comprises part specifying means for specifying the particular melody part externally.

3. The performance training apparatus according to claim 1, wherein said melody data feeding means comprises reading means for reading from storage means which prestores the plurality of items of event data and a corresponding plurality of items of timing data each indicative of a timing of starting to process a respective one of the plurality of items of event data, one of the plurality of items of event data based on a corresponding one of the plurality of items of time data.

4. The performance training apparatus according to claim 3, wherein said reading means comprises read control means, responsive to said reading means reading the item of event data including the particular part, for stopping the reading operation of said reading means, and responsive to operation of any one of said plurality of operation elements, for reopening the reading operation of said reading means.

5. The performance training apparatus according to claim 4, wherein said read control means comprises comparing means for comparing a pitch specified by the operated operation element and a pitch represented by pitch data included by the read item of event data, and causes said reading means to reopen to read an item of event data only when those pitches coincides with each other.

6. The performance training apparatus according to claim 4, wherein said reading means comprises musical-sound muting commanding event data producing means, responsive to the read item of event data including the particular part commanding production of a musical sound, for producing a musical-sound muting commanding item of event data of the same pitch as the musical sound based on the read item of event data, determining means for determining whether said operation element was operated in a predetermined time after the reading operation of said reading means stopped, and feed control means, responsive to said determining means failing to determine that the operation element was operated in the predetermined time, for alternately feeding the read item of event data which commands production of the musical sound and the musical-sound muting commanding item of event data produced by said musical-sound muting commanding event data producing means.

7. A performance training system comprising:

a) a performance control device which comprises:

melody data feeding means for sequentially feeding a plurality of items of event data each including a melody part and a specific item for commanding generation/muting of a musical sound of a pitch;

first transmitting means for transmitting a respective one of the plurality of items of event data fed by said melody data feeding means; and delay means for delaying timings of transmitting all the plurality of items of event data other than an item of event data including a particular melody part by said first transmitting means by a predetermined time compared to the timing of transmitting the item of event data including a particular melody part; and b) a performance device comprising:

first receiving means for receiving an item of event data from said first transmitting means;

a plurality of operation elements for performance each operated for specifying a different pitch;

a plurality of light emitting means each provided for a respective one of said plurality of operation elements;

light emission control means for controlling the turning on/off of a one of said plurality of light emitting means provided for that of said plurality of operation elements which specifies the same pitch as the event data including the particular melody part received and fed by said first receiving means does, in accordance with the production/muting of the musical sound based on the item of event data including the particular melody part;

event data producing means for producing an item of event data including the particular melody part for performance which commands the production and muting of the musical sound of the pitch based on operation of the operation element; and output means for outputting the item of event data including the particular melody part produced by said event data producing means and all the plurality of items of event data received by said first receiving means excluding the item of event data including the particular melody part.

8. The performance training system according to claim 7, wherein said delay means comprises part specifying means for specifying the particular melody part externally.

9. The performance training system according to claim 7, wherein said melody data feeding means comprises reading means for reading from storage means, which prestores the plurality of items of event data and a corresponding plurality of items of timing data each indicative of a timing of starting to process a respective one of the plurality of items of event data, one of the plurality of items of event data based on a corresponding one of the plurality of items of time data.

10. The performance training system according to claim 7, wherein said performance device further comprises second transmitting means for transmitting the event data produced by said data producing means, and wherein said performance control device further comprises second receiving means for receiving the item of event data from said second transmitting means.

11. The performance training system according to claim 10, wherein said reading means comprises read control means, responsive to said reading means reading the item of event data including the particular part, for stopping the reading operation of said reading means, and responsive to said second receiving means receiving an item of event data which commands production of a musical sound, for reopening the reading operation of said reading means.

12. The performance training system according to claim 11, wherein said read control means comprises comparing means for comparing a pitch of an item of event data which commands production of a musical sound received by said second receiving means and a pitch represented by a pitch represented by pitch data included by the read item of event data, and for causing said reading means to reopen to read an item of event data only when those pitches coincides with each other.

13. The performance training system according to claim 10, wherein said reading means comprises musical-sound muting commanding event data producing means, responsive to the read item of event data including the particular part commanding production of a musical sound, for producing a musical-sound muting commanding item of event data of the same pitch as the musical sound based on the read item of event data, determining means for determining whether said second receiving means has received an item of event data, which commands production of a musical sound, in a predetermined time after the reading operation of said reading means stopped, and feed control means, responsive to said determining means failing to determine that said second receiving means has received an item of event data, which commands production of a musical sound, in the predetermined time, for alternately feeding the read item of event data which commands production of the musical sound and the musical-sound muting commanding item of event data produced by said musical-sound muting commanding event data producing means.

14. A performance control apparatus comprising:
    means for reading from storage means, which prestores a plurality of items of event data each including a melody part and a command to produce/mute a musical sound, and a corresponding plurality of items of timing data each indicative of a timing of starting to process a respective one of the plurality of items of event data, one of the plurality of items of event data based on a corresponding one of the plurality of items of time data;
    transmitting means for transmitting an item of event data including a melody part read by said reading means; and
    delay means for delaying timings of transmitting all the plurality of items of event data other than an item of event data including a particular melody part by said transmitting means by a predetermined time compared to the timing of transmitting the item of event data including a particular melody part.

15. A performance control apparatus comprising:
    means for reading from storage means, which prestores a plurality of items of event data each including a melody part and a command to produce/mute a musical sound, and a corresponding plurality of items of timing data each indicative of a timing of starting to process a respective one of the plurality of items of event data, one of the plurality of items of event data based on a corresponding one of the plurality of items of time data;
    transmitting means for transmitting an item of event data including a melody part read by said reading means;
    delay means for delaying timings of transmitting all the plurality of items of event data other than an item of event data including a particular melody part by said transmitting means by a predetermined time compared to the timing of transmitting the item of event data including a particular melody part;
    receiving means for receiving the event data externally;
    determining means for determining whether the item of event data received by said receiving means is event data for commanding production of a musical sound, and read control means, responsive to said reading means reading the item of event data including the particular part, for stopping the reading operation of said reading means, and responsive to said determining means determining that the item of event data received by said receiving means is event data for commanding production of a musical sound, for reopening the reading operation of said reading means.

16. The performance control apparatus according to claim 15, wherein the item of event data comprises pitch data specifying a pitch of a musical sound to be produced/muted.

17. The performance control apparatus according to claim 16, wherein said read control means comprises comparing means for comparing a pitch represented by the item of event data which includes a particular melody part read by said reading means and a pitch of a musical sound specified by the event data which was determined by said determining means as commanding production of the musical sound, and for causing said reading means to reopen to read an item of event data only when those pitches coincides with each other.

18. The performance control apparatus according to claim 15, wherein said delay means comprises part specifying means for specifying a particular melody part externally.

19. The performance control apparatus according to claim 16, wherein said reading means comprises musical-sound muting commanding event data producing means, responsive to the read item of event data including the particular part commanding production of a musical sound, for producing a musical-sound muting commanding item of event data of the same pitch as the musical sound based on the read item of event data, determining means for determining whether said second receiving means has received an item of event data, which commands production of a musical sound, in a predetermined time after the reading operation of said reading means stopped, and feed control means, responsive to said determining means failing to determine that said second receiving means has received an item of event data, which commands production of a musical sound, in the predetermined time, for alternately feeding the read item of event data which commands production of the musical sound and the musical-sound muting commanding item of event data produced by said musical-sound muting commanding event data producing means.

20. A recording medium which contains a computer processable performance training program for effecting the steps of:
    sequentially feeding a plurality of items of event data each comprising a melody part and a note-on/off command for production/muting of a musical sound of a pitch;
    delaying all the plurality of items of event data fed in said melody data feeding step excluding one of the plurality of items of event data including a particular melody part by a predetermined time compared to the item of event data including the particular part;
    controlling the turning on/off of a one of a plurality of light emitting means provided for that of a plurality of operation elements which specifies the same pitch as the event data including the particular melody part in by said melody data feeding step specifies, in accordance with the production/muting of the musical sound based on the item of event data including the particular melody part;

producing an item of event data including the particular melody part for performance which commands the production and muting of the musical sound of the pitch based on operation of the operation element; and outputting all the plurality of items of event data delayed by the predetermined time in said delaying step excluding the item of event data including the particular melody part, and the item of event data including the particular melody part produced in said event data producing step.

21. A recording medium which contains a computer processable performance control program for effecting the steps of:

reading from storage means which prestores a plurality of items of event data each including a melody part and a command to produce/mute a musical sound, and a corresponding plurality of items of timing data each indicative of a timing of starting to process a respective one of the plurality of items of event data one of the plurality of items of event data based on a corresponding one of the plurality of items of time data;

transmitting an item of event data including a melody part read by said reading step; and delaying timings of transmitting all the plurality of items of event data other than an item of event data including a particular melody part in said transmitting step by a predetermined time compared to the timing of transmitting the item of event data including a particular melody part.

22. A recording medium which contains a computer processable performance control program for effecting the steps of:

reading from storage means which prestores a plurality of items of event data each a melody part, a command to produce/mute a musical sound and a corresponding plurality of items of timing data each indicative of a timing of starting to process a respective one of the plurality of items of event data one of the plurality of items of event data based on a corresponding one of the plurality of items of time data;

transmitting a item of event data including a melody part read by said reading step;

delaying timings of transmitting all the plurality of items of event data other than an item of event data including a particular melody part in said transmitting step by a predetermined time compared to the timing of transmitting the item of event data including a particular melody part;

receiving the event data externally;

determining whether the item of event data received in said receiving step is event data for commanding production of a musical sound; and in response to said reading step reading the item of event data including the particular part, stopping the reading operation, and in response to said determining step determining that the item of event data received in said receiving step is event data for commanding production of a musical sound, reopening the reading operation.

* * * * *